(12) United States Patent
Fischer et al.

(10) Patent No.: US 11,087,336 B2
(45) Date of Patent: *Aug. 10, 2021

(54) RANKING MERCHANTS BASED ON A NORMALIZED POPULARITY SCORE

(71) Applicant: American Express Travel Related Services Company, Inc., New York, NY (US)

(72) Inventors: Terrence Fischer, New York, NY (US); Alex Lun, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 15/494,940

(22) Filed: Apr. 24, 2017

(65) Prior Publication Data

US 2017/0228777 A1 Aug. 10, 2017

Related U.S. Application Data

(63) Continuation of application No. 13/794,226, filed on Mar. 11, 2013, now Pat. No. 9,672,526.
(Continued)

(51) Int. Cl.
*G06Q 30/02* (2012.01)
*G06Q 30/06* (2012.01)
(Continued)

(52) U.S. Cl.
CPC ....... *G06Q 30/0201* (2013.01); *G06Q 20/209* (2013.01); *G06Q 30/0204* (2013.01);
(Continued)

(58) Field of Classification Search
None
See application file for complete search history.

(56) References Cited

U.S. PATENT DOCUMENTS 4,833,308 A 5/1989 Humble
4,882,675 A 11/1989 Nichtberger et al.
(Continued)

FOREIGN PATENT DOCUMENTS

WO 2001086378 11/2001
WO 2012024109 2/2012
(Continued)

OTHER PUBLICATIONS

Deshpande, Mukund, "Item based top N recommendation algorithms" University of Minnesota p. 148 (https://dl.acm.org/doi/pdf/10.1145/963770.963776) (2004) as Deshpande (Year: 2004).*
(Continued)

*Primary Examiner* — Abhishek Vyas
*Assistant Examiner* — Alfred H Tsui
(74) *Attorney, Agent, or Firm* — Sterne, Kessler, Goldstein & Fox P.L.L.C.

(57) ABSTRACT

The systems and methods may be used to recommend an item to a consumer. The methods may comprise determining, based on a collaborative filtering algorithm, a consumer relevance value associated with an item, and transmitting, based on the consumer relevance value, information associated with the item to a consumer. A collaborative filtering algorithm may receive as an input a transaction history associated with the consumer, a demographic of the consumer, a consumer profile, a type of transaction account, a transaction account associated with the consumer, a period of time that the consumer has held a transaction account, a size of wallet, and/or a share of wallet. The method may further comprise generating a ranked list of items based upon consumer relevance values, transmitting a ranked list of items to a consumer, and/or re-ranking a ranked list of items based upon a merchant goal.

20 Claims, 65 Drawing Sheets

Related U.S. Application Data

(60) Provisional application No. 61/610,981, filed on Mar. 14, 2012, provisional application No. 61/610,983, filed on Mar. 14, 2012, provisional application No. 61/610,461, filed on Mar. 13, 2012, provisional application No. 61/646,778, filed on May 14, 2012.

(51) Int. Cl.
  *G06Q 20/20* (2012.01)
  *G06F 21/62* (2013.01)
  *G06Q 50/00* (2012.01)

(52) U.S. Cl.
  CPC ..... *G06Q 30/0206* (2013.01); *G06Q 30/0222* (2013.01); *G06Q 30/0236* (2013.01); *G06Q 30/0246* (2013.01); *G06Q 30/0251* (2013.01); *G06Q 30/0254* (2013.01); *G06Q 30/0255* (2013.01); *G06Q 30/0261* (2013.01); *G06Q 30/0267* (2013.01); *G06Q 30/0269* (2013.01); *G06Q 30/0282* (2013.01); *G06Q 30/0631* (2013.01); *G06F 21/6218* (2013.01); *G06Q 50/01* (2013.01)

(56) References Cited

U.S. PATENT DOCUMENTS

| | | |
|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | McMullin |
| 6,266,649 B1 | 7/2001 | Linden et al. |
| 6,298,330 B1 | 10/2001 | Gardensqwartz |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,847,935 B1 | 1/2005 | Solomon |
| 6,865,544 B1 | 3/2005 | Austin |
| 6,882,290 B2 | 4/2005 | French et al. |
| 6,883,708 B1 | 4/2005 | Fiedler et al. |
| 6,904,408 B1 | 6/2005 | McCarthy et al. |
| 6,915,265 B1 | 7/2005 | Johnson |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,856 B1 | 3/2006 | Wiggins |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 | 11/2007 | Wanker |
| 7,392,224 B1 | 6/2008 | Bauer et al. |
| 7,406,436 B1 | 7/2008 | Reisman |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Landel et al. |
| 7,499,889 B2 | 3/2009 | Golan et al. |
| 7,506,805 B1 | 3/2009 | Thakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,636,689 B2 | 12/2009 | Dent |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,702,540 B1 | 4/2010 | Woolston |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,765,119 B2 | 6/2010 | Messa et al. |
| 7,751,805 B2 | 7/2010 | Neven |
| 7,752,328 B2 | 7/2010 | Mortimore, Jr. et al. |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,844,490 B2 | 11/2010 | Patterson |
| 7,865,513 B2 | 1/2011 | Welch et al. |
| 7,870,022 B2 | 1/2011 | Bous et al. |
| 7,885,862 B1 | 2/2011 | Vincent |
| 7,899,704 B1 | 3/2011 | Thompson |
| 7,925,540 B1 | 4/2011 | Orttung et al. |
| 7,933,810 B2 | 4/2011 | Morgenstern |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,070,056 B2 | 12/2011 | Feldman et al. |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B1 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,213,423 B1 | 7/2012 | Breau |
| 8,249,934 B2 | 8/2012 | Agarwal et al. |

(56) References Cited

U.S. PATENT DOCUMENTS

| | | |
|---|---|---|
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs |
| 8,484,088 B1 | 7/2013 | Orttung et al. |
| 8,484,093 B2 | 7/2013 | Bennett et al. |
| 8,489,452 B1 | 7/2013 | Warner et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,411 B1 | 8/2013 | Subasic |
| 8,504,423 B2 | 8/2013 | Rotbard et al. |
| 8,515,810 B2 | 8/2013 | Grimes |
| 8,517,258 B2 | 8/2013 | Taylor et al. |
| 8,543,470 B2 | 9/2013 | Grady et al. |
| 8,554,670 B1 | 10/2013 | Blank |
| 8,560,389 B2 | 10/2013 | Burgess et al. |
| 8,573,477 B2 | 11/2013 | Bennett et al. |
| 8,573,491 B2 | 11/2013 | Bennett et al. |
| 8,606,630 B2 | 12/2013 | Fordyce, III et al. |
| 8,615,426 B2 | 12/2013 | Carlson |
| 8,621,068 B2 | 12/2013 | Zohar et al. |
| 8,621,215 B1 | 12/2013 | Iyer |
| 8,626,579 B2 | 1/2014 | Fordyce, III et al. |
| 8,639,567 B2 | 1/2014 | Winters |
| 8,650,071 B2 | 2/2014 | Pointer et al. |
| 8,655,695 B1 | 2/2014 | Qu |
| 8,725,635 B2 | 5/2014 | Klein et al. |
| 8,874,674 B2 | 10/2014 | Allison et al. |
| 9,009,082 B1 | 4/2015 | Marshall et al. |
| 9,031,866 B1 * | 5/2015 | Ng .................... G06Q 30/0629 705/26.1 |
| 9,301,866 B2 * | 4/2016 | Spahn ................... A61F 5/0127 |
| 9,430,773 B2 | 8/2016 | Aloni et al. |
| 9,443,262 B1 | 9/2016 | Mamgain |
| 2001/0014868 A1 | 8/2001 | Herz et al. |
| 2001/0020242 A1 | 9/2001 | Gupta et al. |
| 2001/0037254 A1 | 11/2001 | Glikman |
| 2001/0054003 A1 | 12/2001 | Chien et al. |
| 2002/0052841 A1 | 5/2002 | Guthrie |
| 2002/0069079 A1 | 6/2002 | Vega |
| 2002/0069312 A1 | 6/2002 | Jones |
| 2002/0082920 A1 | 6/2002 | Austin et al. |
| 2002/0095357 A1 | 7/2002 | Hunter et al. |
| 2002/0099824 A1 | 7/2002 | Bender |
| 2002/0138343 A1 | 9/2002 | Weatherford et al. |
| 2002/0178056 A1 | 11/2002 | Lim |
| 2002/0194069 A1 | 12/2002 | Thakur |
| 2003/0004802 A1 | 1/2003 | Callegari |
| 2003/0027630 A1 | 2/2003 | Kelly et al. |
| 2003/0028426 A1 | 2/2003 | Banerjee |
| 2003/0028518 A1 | 2/2003 | Mankoff |
| 2003/0033211 A1 | 2/2003 | Haines et al. |
| 2003/0061093 A1 | 3/2003 | Todd |
| 2003/0078832 A1 | 4/2003 | Alvarez et al. |
| 2003/0208442 A1 | 11/2003 | Cockrill et al. |
| 2003/0233278 A1 | 12/2003 | Marshall |
| 2004/0006509 A1 | 1/2004 | Mannik et al. |
| 2004/0039686 A1 | 2/2004 | Klebenoff |
| 2004/0098326 A1 | 5/2004 | James |
| 2004/0098332 A1 | 5/2004 | Dvir |
| 2004/0122736 A1 | 6/2004 | Strock et al. |
| 2004/0153389 A1 | 8/2004 | Lortscher |
| 2004/0215517 A1 | 10/2004 | Chen |
| 2004/0225509 A1 | 11/2004 | Andre et al. |
| 2004/0225573 A1 | 11/2004 | Ling |
| 2004/0243468 A1 | 12/2004 | Cohagan et al. |
| 2005/0010394 A1 | 1/2005 | Bergeron |
| 2005/0010428 A1 | 1/2005 | Bergeron |
| 2005/0010472 A1 | 1/2005 | Quatse et al. |
| 2005/0021401 A1 | 1/2005 | Postrel |
| 2005/0033583 A1 | 2/2005 | Bergeron |
| 2005/0033605 A1 | 2/2005 | Bergeron |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1 | 3/2005 | Bortolin et al. |
| 2005/0071230 A1 | 3/2005 | Mankoff |
| 2005/0075932 A1 | 4/2005 | Mankoff |
| 2005/0096976 A1 | 5/2005 | Nelms |
| 2005/0149394 A1 | 7/2005 | Postrel |
| 2005/0159996 A1 | 7/2005 | Lazarus |
| 2005/0165684 A1 | 7/2005 | Jensen |
| 2005/0192863 A1 | 9/2005 | Mohan |
| 2005/0234753 A1 | 10/2005 | Pinto |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0004633 A1 | 1/2006 | Ashbaugh |
| 2006/0026067 A1 | 2/2006 | Nicholas et al. |
| 2006/0041480 A1 | 2/2006 | Briggs |
| 2006/0053056 A1 | 3/2006 | Alspach-Goss et al. |
| 2006/0064372 A1 | 3/2006 | Gupta |
| 2006/0074749 A1 | 4/2006 | Kline |
| 2006/0076400 A1 | 4/2006 | Fletcher |
| 2006/0085240 A1 | 4/2006 | Salehi-sedeh et al. |
| 2006/0095434 A1 | 5/2006 | McCullough et al. |
| 2006/0111930 A1 | 5/2006 | Ayer et al. |
| 2006/0116800 A1 | 6/2006 | Obradovich et al. |
| 2006/0122874 A1 | 6/2006 | Postrel |
| 2006/0129426 A1 | 6/2006 | Pearson |
| 2006/0136299 A1 | 6/2006 | Ruhmkorf |
| 2006/0155603 A1 | 7/2006 | Abendroth et al. |
| 2006/0155641 A1 | 7/2006 | Postrel |
| 2006/0167753 A1 | 7/2006 | Teague et al. |
| 2006/0173672 A1 | 8/2006 | Bergeron |
| 2006/0178932 A1 | 8/2006 | Lang |
| 2006/0195359 A1 | 8/2006 | Robinson et al. |
| 2006/0212355 A1 | 9/2006 | Teague et al. |
| 2006/0224449 A1 | 10/2006 | Byerley et al. |
| 2006/0241859 A1 | 10/2006 | Kimchi et al. |
| 2006/0242011 A1 | 10/2006 | Bell et al. |
| 2006/0253321 A1 | 11/2006 | Heywood |
| 2006/0258397 A1 | 11/2006 | Kaplan et al. |
| 2006/0259364 A1 | 11/2006 | Strock et al. |
| 2006/0271552 A1 | 11/2006 | McChesney et al. |
| 2006/0293957 A1 | 12/2006 | Petersen |
| 2007/0000997 A1 | 1/2007 | Lambert et al. |
| 2007/0010942 A1 | 1/2007 | Bill |
| 2007/0022019 A1 | 1/2007 | Sherwin et al. |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0050258 A1 | 3/2007 | Dohse |
| 2007/0061216 A1 | 3/2007 | Jain et al. |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1 | 4/2007 | Bufford et al. |
| 2007/0129995 A1 | 6/2007 | Brandow |
| 2007/0130000 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0157237 A1 | 7/2007 | Cordray |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0198937 A1 | 8/2007 | Paris |
| 2007/0208879 A1 | 9/2007 | Liu |
| 2007/0210152 A1 | 9/2007 | Read |
| 2007/0214040 A1 | 9/2007 | Patel et al. |
| 2007/0233517 A1 | 10/2007 | Dayal |
| 2007/0244741 A1 | 10/2007 | Blume et al. |
| 2007/0244811 A1 | 10/2007 | Tumminaro |
| 2007/0260513 A1 | 11/2007 | Pavlov |
| 2007/0260523 A1 | 11/2007 | Schadt et al. |
| 2007/0288312 A1 | 12/2007 | Wang |
| 2007/0288372 A1 | 12/2007 | Behar et al. |
| 2008/0004917 A1 | 1/2008 | Mortimore, Jr. |

(56) References Cited

U.S. PATENT DOCUMENTS

| | | |
|---|---|---|
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0033857 A1 | 2/2008 | Moses |
| 2008/0040211 A1 | 2/2008 | Walker et al. |
| 2008/0040288 A1 | 2/2008 | Mortimore, Jr. et al. |
| 2008/0052140 A1 | 2/2008 | Neal et al. |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1 | 4/2008 | Lundy et al. |
| 2008/0109317 A1 | 5/2008 | Singh et al. |
| 2008/0109489 A1 | 5/2008 | Sherwood |
| 2008/0120129 A1 | 5/2008 | Seubert |
| 2008/0120155 A1 | 5/2008 | Pliha |
| 2008/0126515 A1 | 5/2008 | Chambers et al. |
| 2008/0133488 A1 | 6/2008 | Bandaru |
| 2008/0147450 A1 | 6/2008 | Mortimore, Jr. |
| 2008/0147514 A1 | 6/2008 | Shuster et al. |
| 2008/0147773 A1 | 6/2008 | Aaron |
| 2008/0154664 A1* | 6/2008 | Kuo ............... G06Q 30/0247 705/14.47 |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0195609 A1 | 8/2008 | Paris |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0262925 A1 | 10/2008 | Kim |
| 2008/0263135 A1 | 10/2008 | Olliphant |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0281699 A1 | 11/2008 | Whitehead |
| 2008/0281710 A1 | 11/2008 | Hoal |
| 2008/0294624 A1 | 11/2008 | Kanigsberg et al. |
| 2008/0300894 A1 | 12/2008 | John |
| 2008/0300979 A1 | 12/2008 | Abhyanker |
| 2008/0306769 A1 | 12/2008 | Roberts |
| 2008/0313078 A1 | 12/2008 | Payne |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1* | 1/2009 | Tollinger ........... G06Q 30/0225 705/14.1 |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1 | 3/2009 | Schmeyer et al. |
| 2009/0076912 A1 | 3/2009 | Rajan et al. |
| 2009/0094048 A1 | 4/2009 | Wallace et al. |
| 2009/0125719 A1 | 5/2009 | Cochran |
| 2009/0132347 A1 | 5/2009 | Anderson et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. et al. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0288140 A1 | 11/2009 | Huber |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327129 A1 | 12/2009 | Collas |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088149 A1 | 4/2010 | Sullivan |
| 2010/0088174 A1 | 4/2010 | Cohagan et al. |
| 2010/0094697 A1 | 4/2010 | Cananaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131342 A1 | 5/2010 | Thibedeau |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145798 A1 | 6/2010 | Richards |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0203963 A1 | 8/2010 | Allen |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0325048 A1 | 12/2010 | Carlson |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |

(56) References Cited

U.S. PATENT DOCUMENTS

| | | |
|---|---|---|
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0131077 A1 | 6/2011 | Tan |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0161172 A1 | 6/2011 | Lee |
| 2011/0167440 A1 | 7/2011 | Greenfield |
| 2011/0178845 A1 | 7/2011 | Rane |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246219 A1 | 10/2011 | Smith |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0258011 A1 | 10/2011 | Burns |
| 2011/0264490 A1 | 10/2011 | Durvasula et al. |
| 2011/0270617 A1 | 11/2011 | Pacheco E Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1 | 12/2011 | Scalisi |
| 2011/0302011 A1 | 12/2011 | Yoder et al. |
| 2011/0307509 A1 | 12/2011 | Hsiao |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029990 A1 | 2/2012 | Fisher |
| 2012/0029996 A1 | 2/2012 | Lang et al. |
| 2012/0030048 A1 | 2/2012 | Manley et al. |
| 2012/0035965 A1 | 2/2012 | Maguire |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0130737 A1 | 5/2012 | Finizio |
| 2012/0150641 A1 | 6/2012 | Dobbs |
| 2012/0150740 A1 | 6/2012 | Isaacson et al. |
| 2012/0196568 A1 | 8/2012 | Bakshi |
| 2012/0197707 A1 | 8/2012 | Cohagan |
| 2012/0197887 A1 | 8/2012 | Anderson |
| 2012/0203604 A1 | 8/2012 | Brown et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0239417 A1 | 9/2012 | Pourfallah |
| 2012/0239479 A1 | 9/2012 | Amaro et al. |
| 2012/0246004 A1 | 9/2012 | Book |
| 2012/0253852 A1 | 10/2012 | Pourfallah |
| 2012/0253957 A1 | 10/2012 | Bakshi |
| 2012/0271691 A1 | 10/2012 | Hammad et al. |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0006737 A1 | 1/2013 | Goldberg |
| 2013/0006766 A1 | 1/2013 | Dedeoglu |
| 2013/0013396 A1 | 1/2013 | Vinson et al. |
| 2013/0024256 A1 | 1/2013 | Wolf et al. |
| 2013/0024274 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0060644 A1 | 3/2013 | Le Quay |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0080239 A1 | 3/2013 | Okerlund |
| 2013/0080259 A1 | 3/2013 | Durvasula |
| 2013/0091000 A1 | 4/2013 | Hagey et al. |
| 2013/0103472 A1 | 4/2013 | Burgess et al. |
| 2013/0110555 A1 | 5/2013 | Dunham |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0145016 A1 | 6/2013 | Vantalon |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1 | 7/2013 | Carlson et al. |

(56) References Cited

U.S. PATENT DOCUMENTS

| | | | |
|---|---|---|---|
| 2013/0212177 | A1 | 8/2013 | Friedman |
| 2013/0218653 | A1 | 8/2013 | Rooke et al. |
| 2013/0227636 | A1 | 8/2013 | Bettini |
| 2013/0238412 | A1 | 9/2013 | Boncyk et al. |
| 2013/0246146 | A1 | 9/2013 | Fischer et al. |
| 2013/0246185 | A1 | 9/2013 | Hardman et al. |
| 2013/0260727 | A1 | 10/2013 | Knudson et al. |
| 2013/0262209 | A1 | 10/2013 | Boyer |
| 2013/0268333 | A1 | 10/2013 | Ovick et al. |
| 2013/0275192 | A1 | 10/2013 | Aissa |
| 2013/0304563 | A1 | 11/2013 | Haupt et al. |
| 2013/0325946 | A1 | 12/2013 | Allison, Jr. et al. |
| 2013/0346170 | A1 | 12/2013 | Epstein et al. |
| 2014/0006129 | A1 | 1/2014 | Heath |
| 2014/0006132 | A1 | 1/2014 | Barker |
| 2014/0025451 | A1 | 1/2014 | Knowles et al. |
| 2014/0025452 | A1 | 1/2014 | Knowles et al. |
| 2014/0025453 | A1 | 1/2014 | Knowles et al. |
| 2014/0025460 | A1 | 1/2014 | Knowles et al. |
| 2014/0046675 | A1 | 2/2014 | Harwood |
| 2014/0046744 | A1 | 2/2014 | Hagey |
| 2014/0046748 | A1 | 2/2014 | Nagarajan et al. |
| 2014/0046794 | A1 | 2/2014 | Vallery |
| 2014/0108108 | A1 | 4/2014 | Artman et al. |
| 2014/0108521 | A1 | 4/2014 | Marquess |
| 2014/0164199 | A1 | 6/2014 | Wilkes |
| 2014/0258032 | A1 | 9/2014 | Psota |
| 2015/0039393 | A1 | 2/2015 | Jain |
| 2015/0073925 | A1 | 3/2015 | Renfroe |
| 2015/0073980 | A1 | 3/2015 | Griffin |
| 2015/0100433 | A1 | 4/2015 | Choy |
| 2015/0170256 | A1 | 6/2015 | Pettyjohn |
| 2015/0248702 | A1 | 9/2015 | Chatterton |
| 2016/0021152 | A1 | 1/2016 | Maguire |
| 2016/0364790 | A1 | 12/2016 | Lanpher |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 20, 2016 in U.S. Appl. No. 13/889,307.
Pashtan, et al., "Personal Service Areas for Mobile Web Applications," IEEE Internet Computing, 2004, ieeexplore. ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
Park, et al., "Location-Based Recommendation System using Bayesian User's Preference Model in Mobile Devices," Ubiquitous Intelligence and Computing, 2007, Springer-Verlag Berlin Heidelberg, 10 pages.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Feb. 01, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Advisory Action dated Apr. 15, 2016 in U.S. Appl. No. 13/926,789.
USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.

(56) References Cited

OTHER PUBLICATIONS

USPTO; Office Action dated May 16, 2016 in U.S. Appl. No. 13/153,890.
USPTO; Office Action dated May 19, 2016 in U.S. Appl. No. 13/926,895.
Ghose, et al., "Opinion Mining using Econometrics: a case study on Reputation Systems", Department of Information, Operations, and Management Sciences, Annual Meeting, 2007.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Secruity and Trust, 2009—Springer.
Pocket-lint, Apple's iBeacons explained: What it is and why it mailers, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per Wayback Machine, 10 pages.
Office Action dated Feb. 1, 2017 in U.S. Appl. No. 15/334,490.
Final Office Action dated Mar. 22, 2017 in U.S. Appl. No. 15/334,490.
Canadian Examination Search Report dated Jan. 31, 2018 in Canadian Application No. 2,849,271.
USPTO; Non-Final Action dated Mar. 9, 2018 in U.S. Appl. No. 13/794,301.
USPTO; Advisory Action dated Mar. 22, 2018 in U.S. Appl. No. 13/715,423.
USPTO; Non-Final Office Action dated Apr. 5, 2018 in U.S. Appl. No. 15/216,264.
USPTO; Final Office Action dated Apr. 6, 2018 in U.S. Appl. No. 13/468,880.
USPTO; Final Office Action dated Apr. 25, 2018 in U.S. Appl. No. 15/195,781.
USPTO; Advisory Action dated Apr. 26, 2018 in U.S. Appl. No. 15/626,598.
USPTO; Non-Final Office Action dated 12/2212017 in U.S. Appl. No. 15/139,176.
USPTO; Non-Final Office Action dated Jan. 11, 2018 in U.S. Appl. No. 15/195,781.
USPTO; Final Office Action dated Jan. 18, 2018 in U.S. Appl. No. 13/715,770.
Australian Examination Report dated Jan. 19, 2018 in Australian Application No. 2017201307.
USPTO; Non-Final Office Action dated Jan. 23, 2018 in U.S. Appl. No. 15/166,086.
USPTO; Non-Final Office Action dated Feb. 2, 2018 in U.S. Appl. No. 14/928,680.
USPTO; Final Office Action dated Feb. 27, 2018 in U.S. Appl. No. 15/626,598.
LISPTO; Advisory Action dated Feb. 28, 2018 in U.S. Appl. No. 13/715,770.
Ying Cai et al., Design, Analysis, and Implentation of a Large-scale Real-time Location-based Information Sharing System, pp. 106-117, Proceedings of the 6th International Conference on . . . , 2008, dl.acm.org.
Moon-Hee Parket et al., Location-Based Recommendation System Using Bayesian User's Preference Model in Mobile Devices, International Conference on Ubiquitous, pp. 1130-1139, 2007, Spring-Verlag Berlin Heidelberg.
Rashid, O. et. Al., "Providing Location based information/ advertising for existing mobile phone users", Personal and Ubiquitous Computing, 2008, pp. 3-10, Springer.
Singhal, M., et al., "Implementation of Location based servcies in Android Using GPS and Web Servies", IJCSI International Journal of Computer Science Issues, vol. 9, Issue 1, No. 2, Jan. 2012, pp. 237-242, pdfs. semanticscholar.org.
"Standard Score", Wikipedia.org entry, retrieved on Nov. 30, 2017 from http://en.wikipedia.org/wiki/Standard_score, pp. 1-4.
Mahmoud, Q., "Provisioning Context-Aware Advertisements to Wireless Mobile Users", pp. 669-672, Multimedia and Expo, 2006 IEEE International, 2006.

Dhar, S. et al., "Challenges and Business Models for Mobile Location-Based Servies and Advertising", Communications of the ACM, May 2011, vol. 54, No. 5, pp. 121-129.
Lynn, Michael et al., "Gratutude and Fratuity: A Meta-Analysis of Research on the Service-tipping Relationship", Cornel University of Hotel Admiistraiton, 2000, Journal of Socio-Economics 29, pp. 1-18.
USPTO Advisory Action dated Jun. 8, 2018 in U.S. Appl. No. 13/468,880.
Canadian Examination Search Report dated Jun. 21, 2018 in Canadian Application No. 2,874,582.
USPTO; Non-final Office action dated Jun. 22, 2018 in U.S. Appl. No. 15/018,239.
USPTO; Non-Final Office action dated Jun. 28, 2018 in U.S. Appl. No. 14/928,855.
USPTO; Advisory Actoin dated Jul. 5, 2018 in U.S. Appl. No. 15/139,176.
USPTO; Final Office Action dated Jul. 6, 2018 in U.S. Appl. No. 14/284,817.
USPTO; Non-Final Office Action dated Jul. 11, 2018 in U.S. Appl. No. 13/794,272.
USPTO; Final Office Action dated Jul. 13, 2018 in U.S. Appl. No. 14/928,680.
USPTO; Advisory Action dated Jul. 20, 2018 in U.S. Appl. No. 15/195,781.
USPTO; Advisory Actoin dated Jul. 23, 2018 in U.S. Appl. No. 15/166,086.
USPTO; Non-Final Office Action dated Jul. 23, 2018 in U.S. Appl. No. 13/889,272.
USPTO; Final Office Action dated Aug. 6, 2018 in U.S. Appl. No. 15/216,264.
USPTO; Advisory Action dated Jun. 2, 2017 in U.S. Appl. No. 13/941,306.
USPTO; Notice of Allowance dated Jun. 9, 2017 in U.S. Appl. No. 14/464,439.
USPTO; Notice of Allowance dated Jun. 13, 2017 in U.S. Appl. No. 13/889,305.
USPTO; Notice of Allowance dated Jun. 13, 2017 in U.S. Appl. No. 14/464,474.
USPTO; Office Action dated Jun. 15, 2017 in U.S. Appl. No. 13/715,770.
Notice of Acceptance dated Jun. 21, 2017 in Australian Application No. 2016201509.
USPTO; Office Action dated Jun. 21, 2017 in U.S. Appl. No. 13/466,412.
USPTO; Notice of Allowance dated Jun. 29, 2017 in U.S. Appl. No. 13/889,299.
USPTO; Advisory Action dated Jul. 14, 2017 in U.S. Appl. No. 13/794,301.
USPTO; Notice of Allowance dated Jul. 25, 2017 in U.S. Appl. No. 13/411,281.
Australian Examination Report No. 3 dated Sep. 7, 2018 in Australian Application No. 2017201307.
USPTO; Non Final Office Action dated Oct. 2, 2018 in U.S. Appl. No. 15/495,428.
USPTO; Notice of Allowance dated Oct. 17, 2018 in U.S. Appl. No. 15/456,777.
USPTO;Non-Final Office Action dated Nov. 9, 2018 in U.S. Appl. No. 15/668,243.
USPTO; Restriction Requirement dated Nov. 23, 2018 in U.S. Appl. No. 15/018,239.
USPTO; Non-Final Office Action dated Nov. 29, 2018 in U.S. Appl. No. 15/216,264.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.

(56) References Cited

OTHER PUBLICATIONS

USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Notice of Allowance dated May 22, 2014 in U.S. Appl. No. 13/245,636.
International Preliminary Report on Patentability dated Aug. 22, 2013 in PCT/US2012/056231.
USPTO; Office Action dated May 7, 2014 in U.S. Appl. No. 13/477,806.
USPTO; Final Office Action dated May 13, 2014 in U.S. Appl. No. 13/476,910.
USPTO; Final Office Action dated May 20, 2014 in U.S. Appl. No. 13/593,204.
USPTO; Advisory Action dated Jul. 8, 2014 in U.S. Appl. No. 13/889,299.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
International Preliminary Report on Patentability dated Sep. 19, 2012 in Application No. PCT/US2011/047012.
USPTO; Final Office Action dated Jan. 28, 2015 in U.S. Appl. No. 13/889,307.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Jul. 30, 2014 in U.S. Appl. No. 13/794,301.
USPTO; Advisory Action dated Jul. 30, 2014 in U.S. Appl. No. 13/411,281.
USPTO; Advisory Action dated Jul. 30, 2014 in U.S. Appl. No. 13/593,204.
USPTO; Advisory Action dated Jul. 31, 2014 in U.S. Appl. No. 13/476,910.
USPTO; Advisory Action dated Aug. 7, 2014 in U.S. Appl. No. 13/468,931.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/466,412.
USPTO; Advisory Action dated Sep. 3, 2014 in U.S. Appl. No. 13/467,503.
USPTO; Advisory Action dated Sep. 3, 2014 in U.S. Appl. No. 13/021,237.
USPTO; Advisory Action dated Sep. 3, 2014 in U.S. Appl. No. 12/857,389.
USPTO; Advisory Action dated Sep. 2, 2014 in U.S. Appl. No. 13/466,445.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
American Express Website, Frequenty Asked Questions regarding American Express GiftCards, www.americanexpress.com/gift/faq from Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 17, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 7, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.

(56) References Cited

OTHER PUBLICATIONS

USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
International Preliminary Report on Patentability dated May 7, 2013 in Application No. PCT/US2012/021648.
USPTO; Advisory Action dated May 9, 2013 in U.S. Appl. No. 13/477,806.
USPTO; Advisory Action dated May 22, 2013 in U.S. Appl. No. 13/188,693.
USPTO; Office Action dated May 23, 2013 in U.S. Appl. No. 13/734,693.
International Preliminary Report on Patentability dated May 23, 2013 in Application No. PCT/US2012/027810.
International Preliminary Report on Patentability dated Jun. 28, 2013 in Application No. PCT/US2012/027664.
USPTO; Advisory Action dated Jun. 6, 2013 in U.S. Appl. No. 13/466,445.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Office Action dated Sep. 23, 2013 in U.S. Appl. No. 13/889,307.
USPTO; Advisory Action dated Oct. 7, 2013 in U.S. Appl. No. 12/857,424.
USPTO; Advisory Action dated Oct. 4, 2013 in U.S. Appl. No. 13/468,880.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.

(56) References Cited

OTHER PUBLICATIONS

Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii, "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++ retrieved from the web Nov. 21, 2013.
USPTO; Advisory Action dated Apr. 30, 2014 in U.S. Appl. No. 13/715,423.
USPTO; Final Office Action dated May 5, 2014 in U.S. Appl. No. 13/411,281.
USPTO; Advisory Action dated Jun. 10, 2015 in U.S. Appl. No. 13/477,806.
USPTO; Advisory Action dated Jun. 11, 2015 in U.S. Appl. No. 13/926,789.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Office Action dated Aug. 28, 2015 in U.S. Appl. No. 13/794,272.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.
Tang, "Approac to detection of community's consensus and interest," Institute of Systems Science, 2008, Springer-Verlag, pp. 17-29.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
Written Opinion dated Aug. 5, 2015 in Singapore Application No. 11201400788P.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.
USPTO; Advisory Action dated Nov. 17, 2015 in U.S. Appl. No. 13/889,299.
USPTO; Advisory Action dated Nov. 17, 2015 in U.S. Appl. No. 13/468,880.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Final Office Action dated May 9, 2018 in U.S. Appl. No. 15/139,176.
USPTO; Non-Final Office action dated May 18, 2018 in U.S. Appl. No. 15/018,623.
USPTO; Final Office Action dated May 23, 2018 in U.S. Appl. No. 15/166,086.
USPTO; Non-Final Office action dated May 24, 2018 in U.S. Appl. No. 14/928,905.
USPTO; Notice of Allowance dated May 25, 2018 in U.S. Appl. No. 15/626,598.
Australian Examination Report No. 2 dated Jul. 11, 2018 in Canadian Application No. 2017201307.
USPTO; Non-Final Office Action dated Aug. 10, 2018 in U.S. Appl. No. 14/928,786.
USPTO; Non-Final Office Action dated Sep. 4, 2018 in U.S. Appl. No. 15/195,781.
USPTO; Notice of Allowance dated Sep. 4, 2018 in U.S. Appl. No. 15/166,086.
USPTO; Notice of Allowance dated Sep. 6, 2018 in U.S. Appl. No. 15/139,176.
USPTO; Non-Final Office Action dated Sep. 7, 2018 in U.S. Appl. No. 15/456,777.

(56) References Cited

OTHER PUBLICATIONS

USPTO; Advisory Action dated Sep. 18, 2018 U.S. Appl. No. 14/284,817.
USPTO; Non-Final Office Action dated Sep. 19, 2018 in U.S. Appl. No. 13/686,608.
USPTO; Advisory Action dated Sep. 21, 2018 U.S. Appl. No. 14/928,680.
USPTO; Advisory Action dated Sep. 21, 2018 U.S. Appl. No. 15/216,264.
USPTO; Notice of Allowance dated Sep. 21, 2018 in U.S. Appl. No. 13/794,301.
Final Office Action dated Dec. 31, 2018 in U.S. Appl. No. 15/018,623.
Final Office Action dated Jan. 14, 2019 in U.S. Appl. No. 14/928,786.
Final Office Action dated Jan. 14, 2019 in U.S. Appl. No. 14/928,855.
Final Office Action dated Jan. 22, 2019 in U.S. Appl. No. 13/889,272.
Final Office Action dated Jan. 24, 2019 in U.S. Appl. No. 13/794,272.
Final Office Action dated Jan. 25, 2019 in U.S. Appl. No. 13/686,608.
Final Office Action dated Jan. 28, 2019 in U.S. Appl. No. 14/928,905.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 17, 2014 in U.S. Appl. No. 14/065,883.
USPTO; Office Action dated Oct. 17, 2014 in U.S. Appl. No. 11/779,734.
USPTO; Office Action dated Oct. 20, 2014 in U.S. Appl. No. 13/941,306.
USPTO; Office Action dated Oct. 3, 2014 in U.S. Appl. No. 12/857,424.
USPTO; Office Action dated Oct. 8, 2014 in U.S. Appl. No. 13/734,693.
USPTO; Office Action dated Oct. 9, 2014 in U.S. Serial No. 13/926,789.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
Search Report and Written Opinion dated Feb. 16, 2015 in Singapore Application No. 11201400788P.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Office Action dated Oct. 11, 2016 in U.S. Appl. No. 13/794,226.
USPTO; Office Action dated Oct. 11, 2016 in U.S. Appl. No. 13/794,301.
USPTO; Advisory Action dated Oct. 20, 2016 in U.S. Appl. No. 13/889,307.
USPTO; Advisory Action dated Oct. 27, 2016 in U.S. Appl. No. 12/857,424.
Supplementary Examination Report dated Oct. 17, 2016 in New Zealand Application No. 11201400788P.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
Notice of Eligibility for Grant dated Nov. 1, 2016 in Singapore Application No. 11201400788P.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.

(56) References Cited

OTHER PUBLICATIONS

USPTO; Final Office Action dated Nov. 4, 2016 in U.S. Appl. No. 13/794,334.
USPTO; Office Action dated Nov. 10, 2016 in U.S. Appl. No. 13/476,910.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
Examination Report dated Nov. 22, 016 in Australian Application No. 2015201925.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.
USPTO; Office Action dated Jan. 4, 2017 in U.S. Appl. No. 13/794,334.
USPTO; Office Action dated Jan. 13, 2017 in U.S. Appl. No. 13/794,374.
USPTO; Advisory Action dated Dec. 8, 2016 in U.S. Appl. No. 13/926,895.
Examination Report dated Jan. 11, 2017 in Australian Application No. 2016201509.
USPTO; Final Office Action dated Jan. 19, 2017 in U.S. Appl. No. 13/466,445.
USPTO; Final Office Action dated Jan. 20, 2017 in U.S. Appl. No. 13/467,503.
Examination Report dated Jan. 23, 2017 in Australian Application No. 2015201925.
USPTO; Office Action dated Jan. 23, 2017 in U.S. Appl. No. 14/464,439.
USPTO; Advisory Action dated Jan. 25, 2017 in U.S. Appl. No. 14/284,817.
USPTO; Office Action dated Jan. 30, 2017 in U.S. Appl. No. 14/464,474.
USPTO; Notice of Allowance dated Feb. 2, 2017 in U.S. Appl. No. 12/857,389.
USPTO; Advisory Action dated Feb. 7, 2017 in U.S. Appl. No. 13/188,693.
USPTO; Final Office Action dated Feb. 8, 2017 in U.S. Appl. No. 13/715,770.
USPTO; Final Office Action dated Feb. 9, 2017 in U.S. Appl. No. 13/443,100.
USPTO; Final Office Action dated Feb. 14, 2017 in U.S. Appl. No. 13/466,412.
USPTO; Notice of Allowance dated Feb. 14, 2017 in U.S. Appl. No. 13/794,226.
USPTO; Notice of Allowance dated Feb. 15, 2017 in U.S. Appl. No. 13/794,145.
USPTO; Notice of Allowance dated Feb. 16, 2017 in U.S. Appl. No. 13/889,307.
Examination Report dated Feb. 24, 2017 in Australian Application No. 2015201925.
USPTO; Advisory Action dated Feb. 27, 2017 in U.S. Appl. No. 13/468,880.
USPTO; Final Office Action dated Feb. 27, 2017 in U.S. Appl. No. 13/926,895.
Advisory Action dated Mar. 14, 2019 in U.S. Appl. No. 15/018,623.
Advisory Action dated Mar. 25, 2019 in U.S. Appl. No. 14/928,786.
Advisory Action dated Mar. 25, 2019 in U.S. Appl. No. 14/928,855.
Non-Final Office Action dated Feb. 7, 2019 in U.S. Appl. No. 15/668,593.
Final Office Action dated Mar. 15, 2019 in U.S. Appl. No. 15/195,781.
Final Office Action dated Mar. 19, 2019 in U.S. Appl. No. 15/216,264.
Office Action dated Apr. 2, 2019 in CA Serial No. 2874582.
Advisory Action dated Apr. 10, 2019 in U.S. Appl. No. 13/794,272.
Advisory Action dated Apr. 15, 2019 in U.S. Appl. No. 13/686,608.
Advisory Action dated Apr. 24, 2019 in U.S. Appl. No. 14/928,905.
Advisory Action dated Apr. 25, 2019 in U.S. Appl. No. 13/889,272.
Final Office Action dated Apr. 26, 2019 in U.S. Appl. No. 15/495,428.
Final Office Action dated May 15, 2019 in U.S. Appl. No. 15/668,243.
Advisory Action dated May 24, 2019 in U.S. Appl. No. 15/216,264.
Final action dated Jun. 6, 2019 in U.S. Appl. No. 15/018,239.
Non-final Office action dated Jun. 13, 2019 in U.S. Appl. No. 15/018,623.
Advisory action dated Jun. 21, 2019 in U.S. Appl. No. 15/495,428.
Final Office action dated Jul. 18, 2019 in U.S. Appl. No. 15/668,593.
Advisory Action dated Jul. 29, 2019 in U.S. Appl. No. 15/668,243.
Non-Final Office action dated Jul. 29, 2019 in U.S. Appl. No. 16/188,873.
Final Office action dated Aug. 9, 2019 in U.S. Appl. No. 13/715,423.
Advisory action dated Aug. 13, 2019 in U.S. Appl. No. 15/018,239.
Office Action dated Aug. 19, 2019 in CA Serial No. 2849271.
Advisory Action dated Oct. 4, 2019 in U.S. Appl. No. 15/668,593.
Non-Final Office Action dated Sep. 18, 2019 in U.S. Appl. No. 13/794,272.
Non-Final office action dated Sep. 13, 2019 in U.S. Appl. No. 14/928,680.
Non-Final office action dated Aug. 22, 2019 in U.S. Appl. No. 15/495,428.
USPTO; Advisory Action dated Oct. 3, 2017 in U.S. Appl. No. 13/794,272.
USPTO; Non-Final Office Action dated Oct. 3, 2017 in U.S. Appl. No. 15/626,598.
USPTO; Non-Final Office Action dated Oct. 6, 2017 in U.S. Appl. No. 13/188,693.
USPTO; Non-Final Office Action dated Oct. 6, 2017 in U.S. Appl. No. 13/468,880.
USPTO; Final Office Action dated Oct. 25, 2017 in U.S. Appl. No. 13/889,272.
USPTO; Notice of Allowance dated Oct. 30, 2017 in U.S. Appl. No. 13/794,374.
USPTO; Advisory Action dated Nov. 9, 2017 in U.S. Appl. No. 13/466,412.
USPTO; Non-Final Office Action dated Nov. 14, 2017 in U.S. Appl. No. 14/284,817.
USPTO; Advisory Action dated Nov. 28, 2017 in U.S. Appl. No. 13/889,272.
USPTO; Final Office Action dated Dec. 11, 2017 in U.S. Appl. No. 13/715,423.
USPTO; Notice of Allowance dated Dec. 13, 2017 in U.S. Appl. No. 13/941,306.
Office Action dated Jan. 11, 2017 in Canadian Application No. 2,849,271.
Office Action dated Feb. 15, 2017 in Canadian Application No. 2,874,582.
USPTO; Notice of Allowance dated Mar. 10, 2017 in U.S. Appl. No. 13/467,503.
USPTO; Advisory Action dated Mar. 10, 2017 in U.S. Appl. No. 13/466,445.
USPTO; Advisory Action dated Mar. 13, 2017 in U.S. Appl. No. 13/466,412.

(56) References Cited

OTHER PUBLICATIONS

Aloni, U.S. Appl. No. 15/495,428, filed Apr. 24, 2017 and entitled Offers Selected During Authorization.
USPTO; Notice of Allowance dated Mar. 15, 2017 in U.S. Appl. No. 13/476,910.
USPTO; Advisory Action dated Mar. 23, 2017 in U.S. Appl. No. 13/443,100.
Examination Report dated Mar. 23, 2017 in Australian Application No. 2016201509.
USPTO; Notice of Allowance dated Mar. 24, 2017 in U.S. Appl. No. 13/794,334.
USPTO; Final Office Action dated Mar. 27, 2017 in U.S. Appl. No. 13/794,374.
Notice of Allowance dated Mar. 29, 2017 in Canadian Appication No. 2,888,085.
USPTO; Advisory Action dated Mar. 29, 2017 in U.S. Appl. No. 13/715,770.
USPTO; Office Action dated Apr. 7, 2017 in U.S. Appl. No. 13/889,272.
USPTO; Office Action dated Apr. 10, 2017 in U.S. Appl. No. 13/443,100.
USPTO; Office Action dated Apr. 12, 2017 in U.S. Appl. No. 13/794,272.
USPTO; Office Action dated Apr. 13, 2017 in U.S. Appl. No. 13/466,412.
USPTO; Notice of Allowance dated Apr. 17, 2017 in U.S. Appl. No. 13/466,445.
USPTO; Notice of Allowance dated Apr. 20, 2017 in U.S. Appl. No. 13/889,288.
USPTO; Final Office Action dated Apr. 20, 2017 in U.S. Appl. No. 14/065,883.
USPTO; Final Office Action dated Apr. 20, 2017 in U.S. Appl. No. 13/941,306.
USPTO; Notice of Allowance dated Apr. 24, 2017 in U.S. Appl. No. 13/926,895.
USPTO; Final Office Action dated May 17, 2017 in U.S. Appl. No. 14/464,474.
Morris, U.S. Appl. No. 15/456,777, filed Mar. 13, 2017 and entitled Purchase Instructions Complying With Reservation Instructions.
USPTO; Final Office Action dated Apr. 28, 2017 in U.S. Appl. No. 13/153,890.
USPTO; Final Office Action dated Apr. 28, 2017 in U.S. Appl. No. 13/889,305.
USPTO; Final Office Action dated May 4, 2017 in U.S. Appl. No. 13/794,301.
USPTO; Final Office Action dated May 17, 2017 in U.S. Appl. No. 13/411,281.
USPTO; Advisory Action dated May 17, 2017 U.S. Appl. No. 13/794,374.
USPTO; Final Office Action dated May 17, 2017 in U.S. Appl. No. 14/464,439.
Resnick, et al., "Recommender Systems", Mar. 1997, Commuincations of the ACM, vol. 40, No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016in U.S. Appl. No. 13/889,299.
"What is a token in programming?" Quora, pp. 1-3, retrieved from https://www.quora.com/What-is-a-token-in-programrning on May 31, 2016.
USPTO; Notice of Allowance dated May 25, 2016 in U.S. Appl. No. 13/439,768.
USPTO; Office Action dated May 26, 2016 in U.S. Appl. No. 13/477,806.
IP Austraia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
SPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 13/794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Aug. 30, 2016 in U.S. Appl. No. 13/889,307.
USPTO; Office Action dated Sep. 2, 2016 in U.S. Appl. No. 13/467,503.
USPTO; Final Office Action dated Sep. 2, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.
USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.

(56) References Cited

OTHER PUBLICATIONS

USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.
USPTO; Final Office Action dated Aug. 11, 2017 in U.S. Appl. No. 13/443,100.
USPTO; Final Office Action dated Aug. 18, 2017 in U.S. Appl. No. 13/794,272.
USPTO; Non-Final Office Action dated Aug. 30, 2017 in U.S. Appl. No. 13/941,306.
USPTO; Final Office Action dated Sep. 20, 2017 in U.S. Appl. No. 13/466,412.

* cited by examiner

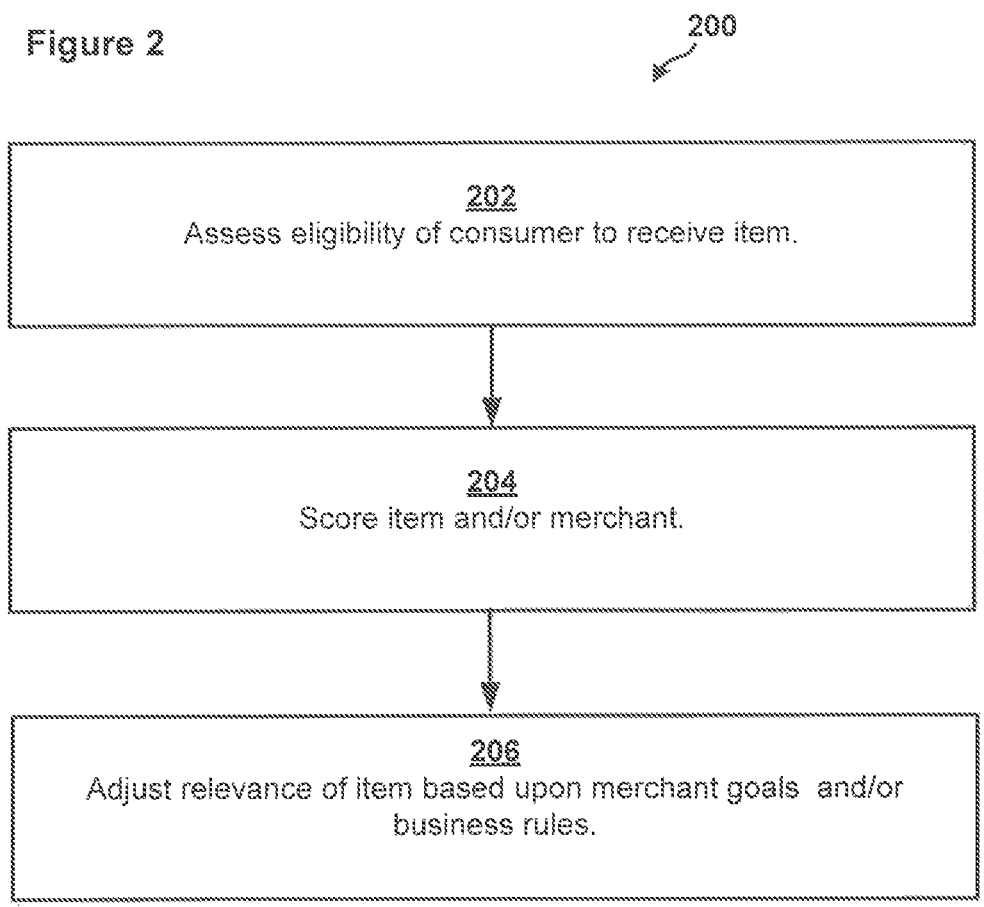

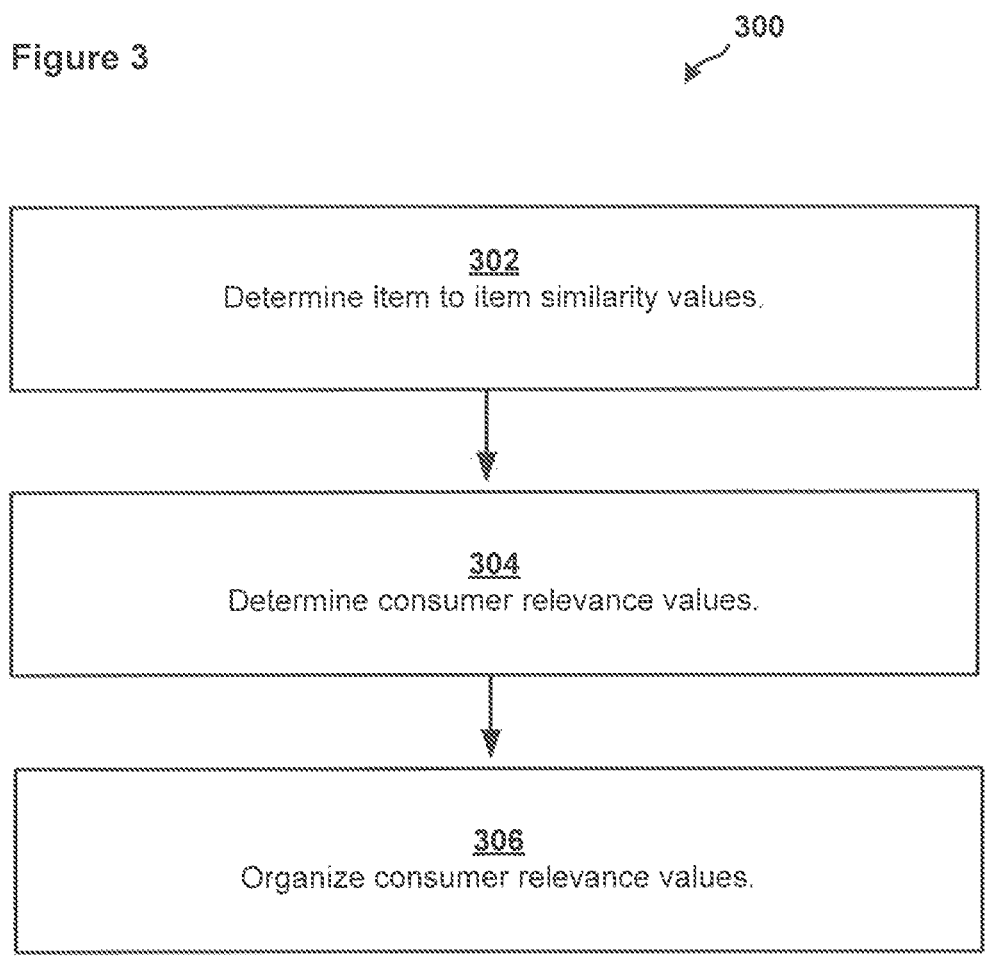

| Item → | SE 1 | SE 2 | SE 3 |
|---|---|---|---|
| SE 1 | 502a | 502b 2 | 502c 1 |
| SE 2 | 504a 2 | 504b | 504c 1 |
| SE 3 | 506a 1 | 506b 1 | 506c |

Consumer Transactional History

| | SE 1 | SE 2 | SE 3 |
|---|---|---|---|
| Dan | 508a 1 | 508b 0 | 508c 0 |
| Ed | 510a 1 | 510b 1 | 510c 0 |
| Fred | 512a 0 | 512b 1 | 512c 1 |

Dan's relevance to SE2 = 2*1 + 1*0 = 2
Dan's relevance to SE3 = 1*1 + 1*0 = 2

Figure 5C

CRV Matrix 500C

| | SE 1 | SE 2 | SE 3 |
|---|---|---|---|
| Dan | 0 | 2 | 1 |
| Ed | 2 | 2 | 2 |
| Fred | 3 | 1 | 1 |

Figure 6

|  | Item → | | | Demographics → | | |
|---|---|---|---|---|---|---|
| Item ↓ | SE 1 | SE 2 | SE 3 | Age | Zipcode | Gender |
| SE 1 | | | | | | |
| SE 2 | | | | | | |
| SE 3 | | | | | | |
| Age | | | | | | |
| Zipcode | | | | | | |
| Gender | | | | | | |

United States (Change Country)   Contact Us   Help   LOG IN

MY ACCOUNT | CARDS | TRAVEL | REWARDS | BUSINESS

Need help?

Expand your reach through American Express.

Home > Create an offer

Merchant A

| 1 Select Tailoring | 2 Build Offer | 3 Review & Submit | 4 Confirmation |

Manage your offers

Create an offer to reach all Cardmembers across the American Express network.

☐ All Cardmembers

Basic (free):
Maximize your exposure

Find my ideal customers among:
☑ New customers who have not yet spent at my establishment
☑ Existing customers who are not yet spending at their highest potential Advanced (fee):
Use our sophisticated targeting
A 20% fee will be applied based on sales generated by your offer.

[PREVIOUS]   [SAVE FOR LATER]   [NEXT]

Get help with building your offer.

MY ACCOUNT | CARDS | TRAVEL | REWARDS | BUSINESS

United States (Change Country) Contact Us Help [LOG IN]

[Need help?] [Q]

Expand your reach through American Express.

Home > Create an offer > Advanced offer

Merchant A

[ 1 Select Tailoring ✓ ] [ 2 Build Offer ] [ 3 Review & Submit ] [ 4 Confirmation ] [ Manage your offers ]

What type of offer?
● [$20 ▼]  Statement credit if you spend [$50+ ▼] limit to [10,000 ▼] offers
○ [20% ▼] Statement credit if you spend [$50+ ▼] limit to [10,000 ▼] offers What are the dates for this offer?
Starting on [11/20/2011] and ending on [12/31/2011]
In 2 days                 0 days in duration

[PREVIOUS] [SAVE FOR LATER]                                    [NEXT]

(?) Get help with building your offer.

Figure 13

Table 1300A

| | 1st Most Similar | 2nd Most Similar | 3rd Most Similar | 4th Most Similar | 5th Most Similar | 6th Most Similar | 7th Most Similar | 8th Most Similar |
|---|---|---|---|---|---|---|---|---|
| Gender (M) | Merch 45 | Merch 12 | SOW Bckt A | Merch 67 | Merch 34 | Age Bckt B | Merch 89 | Merch 90 |
| Merch 23 | Merch 90 | Age Bckt D | Merch 67 | SOW Bckt E | Merch 13 | Merch 15 | Merch 17 | Merch 45 |
| Merch 56 | SOW Bckt F | Age Bckt C | Merch 45 | Merch 90 | Merch 97 | Merch 67 | Merch 14 | Merch 82 |

Table 1300B

| | 1st Most Similar | 2nd Most Similar | 3rd Most Similar | 4th Most Similar | 5th Most Similar | 6th Most Similar | 7th Most Similar | 8th Most Similar |
|---|---|---|---|---|---|---|---|---|
| Gender (M) | Merch 45 | Merch 12 | Merch 67 | Merch 34 | Merch 89 | Merch 90 | Merch 64 | Merch 97 |
| Merch 23 | Merch 90 | Merch 67 | Merch 13 | Merch 15 | Merch 17 | Merch 45 | Merch 84 | Merch 53 |
| Merch 56 | Merch 45 | Merch 90 | Merch 97 | Merch 67 | Merch 14 | Merch 82 | Merch 99 | Merch 88 |

Figure 14

Item to Item (Similarity) Matrix — 1400A

| | Rest 1 | Rest 2 | Rest 3 | Rest 4 | SOW A | SOW B | Age A | Age B | Italian | Japanese |
|---|---|---|---|---|---|---|---|---|---|---|
| 1st Similar | Rest 5 / 4 | Rest 6 / 4 | Rest 7 / 4 | Rest 8 / 4 | Rest 5 / 4 | Rest 6 / 4 | Rest 8 / 4 | Rest 7 / 4 | Rest 6 / 4 | Rest 5 / 4 |
| 2nd Similar | Rest 6 / 2 | Rest 7 / 2 | Rest 8 / 2 | Rest 5 / 2 | Rest 7 / 2 | Rest 8 / 2 | Rest 5 / 2 | Rest 6 / 2 | Rest 8 / 2 | Rest 7 / 2 |
| 3rd Similar | Rest 7 / 1 | Rest 8 / 1 | Rest 5 / 1 | Rest 6 / 1 | Rest 6 / 1 | Rest 5 / 1 | Rest 7 / 1 | Rest 8 / 1 | Rest 5 / 1 | Rest 6 / 1 |

One Item "Group" Z1: Rest 1–Rest 4; Z2: SOW A, SOW B; Z3: Age A, Age B; Z4: Italian, Japanese Item Matrix — 1400B

| | Rest 1 | Rest 2 | Rest 3 | Rest 4 | SOW A | SOW B | Age A | Age B | Italian | Japanese |
|---|---|---|---|---|---|---|---|---|---|---|
| Consumer A | 1 | | | | 1 | | 1 | | | 0.5 |
| Consumer B | | 1 | | 1 | | 1 | 1 | 1 | 0.5 | |
| Consumer C | | | 1 | | | 1 | | 1 | | |

Figure 16

| Recommen-dation Order | Recommended Restaurant | CRV Total |
|---|---|---|
| 1 | Rest 16 | 2.75 |
| 2 | Rest 19 | 2.55 |
| 3 | Rest 6 | 2.35 |
| 4 | Rest 8 | 2.2 |
| 5 | Rest 7 | 1.30 |
| 6 | Rest 17 | 1.25 |
| 7 | Rest 18 | 0.6 |
| 8 | Rest 9 | 0.55 |

| Top Weighted Score – Item the Score is Based On | | |
|---|---|---|
| Rest 6 | 1.2 – Rest 3 | |
| Rest 7 | 0.4 – Rest 3 | 0.4 – Rest 5 |
| Rest 8 | 0.8 – Rest 3 | |
| Rest 9 | 0.3 – Age BucketB | |
| Rest 16 | 0.8 – Rest 2 | 0.8 – Rest 5 |
| Rest 17 | 1.2 – Rest 2 | |
| Rest 18 | 0.6 – Rest 5 | |
| Rest 19 | 1.2 – Rest 5 | |

1700B — Weighted CRVs for Consumer A

| | Rest 1 | Rest 2 | Rest 3 | Rest 4 | Rest 5 | SOW Bucket A | SOW Bucket B | Age Bucket A | Age Bucket B | Italian | Japanese |
|---|---|---|---|---|---|---|---|---|---|---|---|
| | Rest 6 0 | Rest 17 1.2 | Rest 6 1.2 | Rest 8 0 | Rest 19 1.2 | Rest 6 0.6 | Rest 19 0 | Rest 7 0 | Rest 9 0.3 | Rest 8 0.3 | Rest 16 0.3 |
| | Rest 7 0 | Rest 16 0.8 | Rest 8 0.8 | Rest 18 0 | Rest 16 0.8 | Rest 8 0.4 | Rest 18 0 | Rest 19 0 | Rest 6 0.2 | Rest 16 0.2 | Rest 8 0.2 |
| | Rest 18 0 | Rest 19 0.6 | Rest 19 0.6 | Rest 17 0 | Rest 18 0.6 | Rest 16 0.3 | Rest 6 0 | Rest 17 0 | Rest 16 0.15 | Rest 19 0.15 | Rest 6 0.15 |
| | Rest 8 0 | Rest 8 0.4 | Rest 7 0.4 | Rest 9 0 | Rest 7 0.4 | Rest 7 0.2 | Rest 17 0 | Rest 8 0 | Rest 8 0.1 | Rest 7 0.1 | Rest 9 0.1 |
| | Rest 9 0 | Rest 7 0.2 | Rest 16 0.2 | Rest 16 0 | Rest 6 0.2 | Rest 9 0.1 | Rest 7 0 | Rest 9 0 | Rest 17 0.05 | Rest 9 0.05 | Rest 5 0.05 |

Figure 18

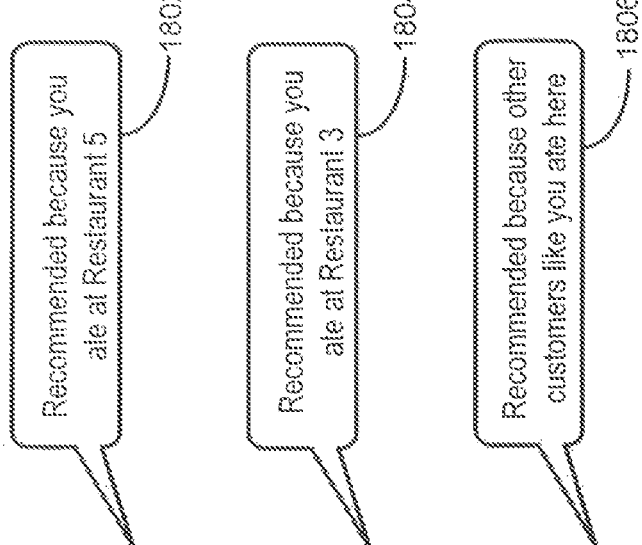

1800

| Recommen-dation Order | Recommended Restaurant | Sum of Weighted Similarity Scores | Recommended Based On |
|---|---|---|---|
| 1 | Rest 16 | 2.75 | Restaurant 2 |
| 2 | Rest 19 | 2.55 | Restaurant 5 |
| 3 | Rest 6 | 2.35 | Restaurant 3 |
| 4 | Rest 8 | 2.2 | Restaurant 3 |
| 5 | Rest 7 | 1.30 | Restaurant 3 |
| 6 | Rest 17 | 1.25 | Restaurant 2 |
| 7 | Rest 18 | 0.6 | Restaurant 5 |
| 8 | Rest 9 | 0.55 | Age Bucket B |

Sample Messages:

1802 — Recommended because you ate at Restaurant 5

1804 — Recommended because you ate at Restaurant 3

1806 — Recommended because other customers like you ate here

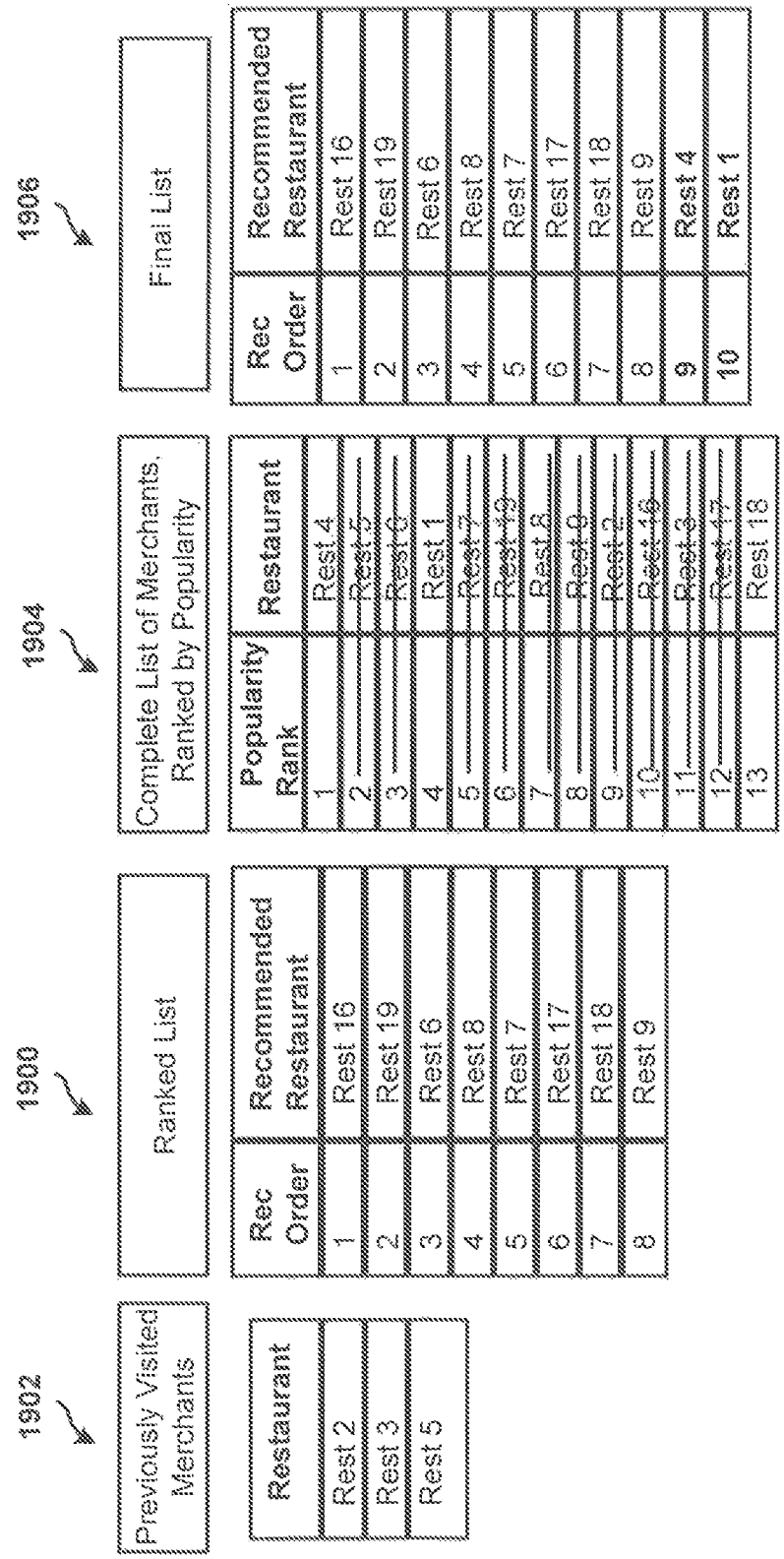

Figure 21

Table 2100A:

| Obs | Merchant ID | Customer ID | Amount | # Transactions | Transaction Date | Transaction Time* |
|-----|-------------|-------------|--------|----------------|------------------|-------------------|
| 1 | 12312312311 | 2532 | $12 | 1 | Jan 01, 2011 | 08:03 |
| 2 | 12312312311 | 462542 | $13 | 1 | Jan 01, 2011 | 09:13 |
| 3 | 12312312311 | 7451 | $9 | 1 | Jan 01, 2011 | 10:15 |
| ... | ... | ... | ... | ... | ... | ... |
| ... | ... | ... | ... | ... | ... | ... |
| 2323325343 | 9087834981 | 4342333 | $33 | 1 | Dec 28, 2011 | 12:23 |

Table 21000B:

| Obs | Merchant ID | Transaction Date | Amount |
|-----|-------------|------------------|--------|
| 1 | 12312312311 | Jan 01, 2011 | 46 |
| 2 | 12312312311 | Jan 02, 2011 | 35 |
| 3 | 12312312311 | Jan 03, 2011 | 24 |
| ... | ... | ... | ... |

Figure 22

For Average daily number of Transactions:

| Obs | Merchant ID | Transaction Date | Amount |
|---|---|---|---|
| 1 | 12312312311 | Jan 01, 2011 | 46 |
| 2 | 12312312311 | Jan 02, 2011 | 35 |
| 3 | 12312312311 | Jan 03, 2011 | 24 |
| ` | ` | ` | ` |
| 3456 | 12312312311 | Dec 31, 2011 | 55 |
| 3457 | 12312312399 | Jan 01, 2011 | 87 |
| ` | ` | ` | ` |

2200A

Avg ⇒

| Avg. Daily # Txns for 12312312311 |
|---|
| 33 |

| Merchant | charge_amt_usd | legal_nm | zip5_cd | corr_addr_line1 |
|---|---|---|---|---|
| 6311327407 | 253.35 | MERCHANT A | 10012 | 568 BROADWAY RM 405 |
| 6311327407 | 210.2 | MERCHANT A | 10012 | 568 BROADWAY RM 405 |
| 6311327407 | 270.1 | MERCHANT A | 10012 | 568 BROADWAY RM 405 |
| 6311327407 | 82.05 | MERCHANT A | 10012 | 568 BROADWAY RM 405 |
| 6311327407 | 418.4 | MERCHANT A | 10012 | 568 BROADWAY RM 405 |
| 6311327407 | 220 | MERCHANT A | 10012 | 568 BROADWAY RM 405 |
| 6311327407 | 53.3 | MERCHANT A | 10012 | 568 BROADWAY RM 405 |

| Merchant | legal_nm | zip5_cd | corr_addr_line1 | avg_rocsize | rocs | std_rocsize |
|---|---|---|---|---|---|---|
| 6311327407 | MERCHANT A | 10012 | 568 BROADWAY RM 409 | 152.32 | 6423 | 177.57 |
| 6311880173 | MERCHANT B | 10016 | 120 LEXINGTON AVE FRNT 1 | 70.15 | 572 | 81.77 |
| 6317358158 | MERCHANT C | 10022 | 133 W 19TH ST STE 300 | 132.88 | 2593 | 366.99 |
| 6317346344 | MERCHANT D | 10009 | 158 E 7TH ST APT B1 | 340.01 | 2 | 0 |

| Merchant | legal_nm | zip5_cd | corr_addr_line1 | avg_rocsize | rocs | std_rocsize |
|---|---|---|---|---|---|---|
| 6311327407 | MERCHANT A | 10012 | 568 BROADWAY RM 405 | 152.32 | 6423 | 177.57 |
| 6319018933 | MERCHANT A | 10012 | 568 BROADWAY RM 405 | 148.83 | 116 | 112.63 |

| Merchant | legal_nm | zip_cd | corr_addr_line1 | avg_rocsize | rocs | std_rocsize | cutoff_min | cutoff_max |
|---|---|---|---|---|---|---|---|---|
| 6311327407 | MERCHANT A | 10012 | 568 BROADWAY RM 405 | 152.32 | 6423 | 177.57 | 0 | 507.46 |
| 6311880173 | MERCHANT B | 10016 | 120 LEXINGTON AVE FRNT 1 | 70.15 | 572 | 81.77 | 0 | 233.69 |
| 6317358158 | MERCHANT C | 10022 | 133 W 19TH ST STE 300 | 132.88 | 2593 | 366.99 | 0 | 866.86 |

Figure 41

| Merchant | charge_amt_usd | legal_nm | zip5_cd | corr_addr_line1 | cutoff_min | cutoff_max |
|---|---|---|---|---|---|---|
| 6311327407 | 253.35 | MERCHANT A | 10012 | 568 BROADWAY RM 405 | 0 | 507.46 |
| 6311327407 | 210.2 | MERCHANT A | 10012 | 568 BROADWAY RM 405 | 0 | 507.46 |
| 6311327407 | 220 | MERCHANT A | 10012 | 568 BROADWAY RM 405 | 0 | 507.46 |
| 6311327407 | 53.3 | MERCHANT A | 10012 | 568 BROADWAY RM 405 | 0 | 507.46 |
| 6311327407 | 763.6 | MERCHANT A | 10013 | 569 BROADWAY RM 405 | 0 | 507.46 |
| 6311327407 | 270.1 | MERCHANT A | 10012 | 568 BROADWAY RM 405 | 0 | 507.46 |
| 6311327407 | 82.05 | MERCHANT A | 10012 | 568 BROADWAY RM 405 | 0 | 507.46 |
| 6311327407 | 418.4 | MERCHANT A | 10012 | 568 BROADWAY RM 405 | 0 | 507.46 |

| Merchant | legal_nm | zip_cd | corr_addr_line1 | avg_rocsize | spend | std_rocsize | cutoff_min | cutoff_max |
|---|---|---|---|---|---|---|---|---|
| 6311327407 | MERCHANT A | 10012 | 568 BROADWAY RM 405 | 149.34 | 978348 | 168.02 | 0 | 507.46 |
| 6311880173 | MERCHANT B | 10016 | 120 LEXINGTON AVE FRNT 1 | 68.17 | 40124 | 75.95 | 0 | 233.69 |
| 6317358158 | MERCHANT C | 10022 | 133 W 19TH ST STE 300 | 130.83 | 344553 | 349.11 | 0 | 866.86 |

Figure 44

Table 4400:

| Merchant | cust_xref_id | cnsumr_size_of_wallet |
|---|---|---|
| 6311327407 | 2185358017 | $ 226,980.85 |
| 6311327407 | 1523378l014 | $ 732,284.93 |
| 6311327407 | 1720075501 0 | $ 54,711.48 |
| 6311327407 | 1792984401 9 | $ 53,015.53 |
| 6311327407 | 5874142001 4 | $ 51,223.15 |

Table 4402:

| Merchant | ccsg_size |
|---|---|
| 6311327407 | 125226.801 |
| 6311880173 | 57750.548 |
| 6317358158 | 111218.838 |

| Obs | CM11 | Merchant | Amount | # Roc | Transaction Date | Transaction Time |
|---|---|---|---|---|---|---|
| 1 | 46137982514 | 2135645566 | $32 | 1 | Jan 12, 2011 | 08:03 |
| 2 | 46137982514 | 4670939438 | $35 | 1 | Mar 23, 2011 | 13:13 |
| 3 | 46137982514 | 7865908767 | $22 | 1 | Jun 12, 2011 | 20:23 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| 2323325343 | 8462951 7532 | 2399838998 | $23 | 1 | Dec 28, 2011 | 12:23 |

Figure 47

| Obs | Merchant | CM11 | Amount | # Roc | TransactionDate | Transaction Time |
|---|---|---|---|---|---|---|
| 1 | 12312312311 | 25323543217 | $12 | 1 | Jan 01, 2011 | 08:03 |
| 2 | 12312312311 | 46254276544 | $13 | 1 | Jan 01, 2011 | 09:13 |
| 3 | 12312312311 | 74512345671 | $9 | 1 | Jan 01, 2011 | 09:14 |
| ... | ... | ... | ... | ... | ... | ... |
| ... | ... | ... | ... | ... | ... | ... |
| 23233253343 | 90878324981 | 43423339501 | $33 | 1 | Dec 31, 2011 | 10:54 |

| | Transaction Time | Probable Dining Time |
|---|---|---|
| Breakfast | 7am – 10am | 6am – ~10am |
| Lunch | 12pm – 4pm | 11am – ~4pm |
| Dinner | 6pm – 11pm | 5pm – ~11pm |
| Late Night | 12am – 4am | 11pm – ~4am |
| Weekend Brunch | 11am – 4pm | 10am – ~4pm |

4902

| Obs | Merchant | Customer | Amount | # Roc | TransactionDate | Transaction Time* | Meal Type |
|---|---|---|---|---|---|---|---|
| 1 | 12312312311 | 2532 | $12 | 1 | Jan 01, 2011 | 08:03 | Breakfast |
| 2 | 12312312311 | 462542 | $13 | 1 | Jan 01, 2011 | 09:13 | Breakfast |
| 3 | 12312312311 | 7451 | $9 | 1 | Jan 01, 2011 | 09:14 | Breakfast |
| .. | .. | .. | .. | .. | .. | .. | |
| .. | .. | .. | .. | .. | .. | .. | |
| 23233253243 | 90878324981 | 4342333 | $33 | 1 | Dec 31, 2011 | 10:54 | Dinner |

Figure 50

| Obs | Merchant | Meal Type | # Roc | Amount |
|---|---|---|---|---|
| 1 | 12312312311 | Breakfast | 446 | $3,544 |
| 2 | 12312312311 | Lunch | 435 | $4,670 |
| 3 | 12312312311 | Dinner | 524 | $9,394 |
| 4 | 12312312311 | Late Night | 33 | $678 |

| | Merchant | Meal Type | Total # Roc | Total Amount | $0-$5 | $5-$10 | $10-$15 | $15-$20 | $20-$25 | $25-$30 | $30-$35 | $35-$40 | $40-$45 | --- | First Peak @ |
|---|---|---|---|---|---|---|---|---|---|---|---|---|---|---|---|
| 1 | 12312312311 | Breakfast | 10012 | $3,544 | 0.5% | 1.2% | 1.6% | 3.8% | 3.2% | 3.0% | 2.9% | 2.6% | 2.4% | --- | $15-$20 |
| 2 | 12312312311 | Lunch | 10016 | $4,670 | 0.6% | 2.3% | 2.8% | 4.3% | 4.5% | 3.2% | 3.1% | 2.9% | 2.6% | --- | $20-$25 |
| 3 | 12312312311 | Dinner | 10022 | $9,394 | 0.1% | 0.2% | 1.9% | 4.0% | 7.1% | 8.0% | 9.6% | 7.9% | 6.7% | --- | $30-$5 |

Figure 51

5100

RANKING MERCHANTS BASED ON A NORMALIZED POPULARITY SCORE

CROSS REFERENCE TO RELATED APPLICATIONS

This application is a continuation of, claims priority to and the benefit of, U.S. Ser. No. 13/794,226 filed Mar. 11, 2013 and entitled "Systems and Methods for Tailoring Marketing." The '226 application claims priority to, and the benefit of, U.S. Provisional Patent Application Ser. No. 61/610,981 filed on Mar. 14, 2012 and entitled "GENERATING A CUSTOMER REVIEW USING CUSTOMIZED TAGS". The '226 application further claims priority to, and the benefit of, U.S. Provisional Patent Application Ser. No. 61/610,983 filed on Mar. 14, 2012 and entitled "TRANSACTION REWARDS LIST". The '226 application further claims priority to, and the benefit of, U.S. Provisional Patent Application Ser. No. 61/610,461 filed on Mar. 13, 2012 and entitled "GENERATING MERCHANT RECOMMENDATIONS FOR CONSUMERS". The '226 application further claims priority to, and the benefit of, U.S. Provisional Patent Application Ser. No. 61/646,778 filed on May 14, 2012 and entitled "SYSTEMS AND METHODS FOR TAILORED MARKETING BASED ON FILTERING." All of these applications are incorporated by reference herein in their entirety for all purposes.

BACKGROUND

Field

The present disclosure generally relates to tailored marketing.

Background

With the proliferation of the Internet, as well as the growing popularity of mobile communication devices, marketplaces in which deals (e.g., offers, recommendations, etc.) are exchanged (e.g., purchased, sold, traded, distributed, etc.) have grown over time. This "deals marketplace" has grown quickly, but has encountered a number of challenges. For example, deals are often poorly tailored to consumers (e.g., deals are irrelevant or less relevant to consumers), which may lead many consumers to opt out of receiving such deals and/or a tendency of consumers to "tune out" or ignore deals that are received. Similarly, processes associated with redemption and/or fulfillment of deals may be cumbersome, which may discourage consumers from receiving deals and/or necessitate tedious and/or expensive employee deal redemption training programs. In addition, merchants often find it difficult to accurately assess the return on investment (or ROI) associated with deals they have paid to have delivered to consumers. It would therefore be advantageous to have a system in which one or more merchants are able to accurately tailor relevant deals to one or more consumers. Likewise, it would be advantageous to have a system in which deal redemption and/or fulfillment are accomplished quickly and easily, and in which ROI may be measured.

SUMMARY

The present disclosure includes systems, methods, and/or articles of manufacture for tailoring marketing. In various embodiments, a method may comprise determining, based on a collaborative filtering algorithm, a consumer relevance value associated with a merchant and transmitting, based on the consumer relevance value, an offer associated with the merchant to a social media channel. In various embodiments, a collaborative filtering algorithm may receive, as an input, one or more of: a transaction history associated with the consumer, a demographic of the consumer, a consumer profile, a type of transaction account, a transaction account associated with the consumer, a period of time that the consumer has held a transaction account, a size of wallet, and a share of wallet, social data, time and/or date information, consumer feedback, merchant characteristics, and/or the like. A method may further comprise, in various embodiments, generating a ranked list of items based upon a plurality of consumer relevance values, transmitting the ranked list of offers to a consumer, and/or re-ranking the ranked list. Further, in various embodiments, a method may comprise receiving, from a merchant, a selection of a social media channel through which information associated with an item should be delivered, and/or re-ranking an item in response to: a holiday, consumer feedback, and/or the like.

In various embodiments, a method may comprise, determining a consumer relevance value associated with a restaurant based upon a plurality of item to item similarity values, and transmitting, based on the consumer relevance value, a restaurant identifier to the consumer.

In various embodiments, a method may comprise counting a number of transactions with a merchant during a time period, determining an average transaction count based on the counting, determining a maximum transaction count of the merchant during the time period, and determining a normalized popularity score based upon the average transaction count and the maximum transaction count.

In various embodiments, a method may comprise determining a consumer preference, and transmitting information associated with an item to a web client associated with a consumer.

In various embodiments, a method may comprise receiving a rating associated with an item, transmitting a plurality of word tags based on the rating, and receiving a selection of one of the plurality of word tags.

In various embodiments, a method may comprise determining a gratuity amount associated with a transaction, and determining a quality of service associated with a merchant associated with the transaction based upon the gratuity amount.

In various embodiments, a method may comprise calculating based on a first data set comprising a plurality of transactions associated with a merchant, a mean record of charge (ROC) amount and a standard deviation ROC amount associated with the merchant, and determining a relative consumer cost based on the mean ROC amount and the standard deviation ROC amount.

In various embodiments, a method may comprise determining a plurality of percentages of ROCs, wherein each of the plurality of percentages is associated with a range of ROC amounts, and determining an estimated price per person based upon a first maximum in the percentages of the ROCs.

In various embodiments, a method may comprise comparing a number of days between a ROC associated with a merchant and a current date to a number of consecutive days during which the merchant was not associated with a ROC, and flagging the merchant with a status of inactive based upon the comparing.

In various embodiments, a method may comprise offering a reward to a consumer on a condition that the consumer check in with a merchant, and checking in the consumer in response to a transaction with the merchant.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

FIG. 2 shows a flowchart depicting an exemplary process for tailoring a relevant item to a consumer, in accordance with various embodiments.

FIG. 3 shows a flowchart depicting an exemplary process for generating a consumer relevance value, in accordance with various embodiments.

FIG. 4A shows an exemplary item matrix, in accordance with various embodiments.

FIG. 4B shows an exemplary item to item similarity matrix, in accordance with various embodiments.

FIG. 5A shows an exemplary item to item similarity matrix used as part of a computation, in accordance with various embodiments.

FIG. 5B shows an exemplary item matrix used as part of a computation, in accordance with various embodiments.

FIG. 5C shows an exemplary CRV matrix, in accordance with various embodiments.

FIG. 6 shows an exemplary item to item similarity matrix including demographic information, in accordance with various embodiments.

FIG. 8A shows a screenshot depicting an interface wherein a merchant may select a tailoring option, in accordance with various embodiments.

FIG. 8B shows a screenshot depicting an interface wherein a merchant may build an offer, in accordance with various embodiments.

FIG. 13 shows exemplary item to item similarity matrices associated with a plurality of restaurants, in accordance with various embodiments.

FIG. 14 shows an exemplary item matrix and an exemplary item to item similarity matrix, in accordance with various embodiments.

FIG. 16 shows an exemplary ranked list of restaurants, in accordance with various embodiments.

FIG. 17 shows an exemplary ranked list of restaurants including reason codes and an exemplary CRV matrix, in accordance with various embodiments.

FIG. 18 shows an exemplary ranked list of restaurants including sample messages, in accordance with various embodiments.

FIG. 19 shows exemplary lists of previously visited restaurants, ranked restaurants, restaurants ranked by popularity, and a final list, in accordance with various embodiments.

FIG. 21 shows an exemplary table including a plurality of transaction histories, in accordance with various embodiments.

FIG. 22 shows an exemplary table depicting an average transaction count associated with a period of time, in accordance with various embodiments.

FIG. 37 shows an exemplary table including a plurality of transactions associated with a merchant, in accordance with various embodiments.

FIG. 39 shows an exemplary table in which a merchant associated with fewer than a threshold number of ROCs is eliminated, in accordance with various embodiments.

FIG. 40 shows an exemplary table in which a merchant location associated with a lesser number of ROCs is eliminated, in accordance with various embodiments.

FIG. 41 shows an exemplary table in which a plurality of ROC cutoff points are calculated, in accordance with various embodiments, in accordance with various embodiments.

FIG. 42 shows an exemplary table in which a ROC is eliminated based upon a ROC cutoff point, in accordance with various embodiments.

FIG. 43 shows an exemplary table in which a mean ROC amount and standard deviation ROC amount are recalculated, in accordance with various embodiments.

FIG. 44 shows an exemplary table including a plurality of consumer sizes of wallet and an exemplary table including a plurality of average consumer sizes of wallet, in accordance with various embodiments.

FIG. 47 shows an exemplary table including a plurality of ROCs associated with a plurality of merchants, in accordance with various embodiments.

FIG. 48 shows an exemplary table organizing a plurality of ROCs by merchant and ROC date, in accordance with various embodiments.

FIG. 49 shows an exemplary cross-reference table associating a meal type with a transaction time and a probable dining time as well as an exemplary table associating a ROC with a meal type, in accordance with various embodiments.

FIG. 50 shows an exemplary table including aggregated meal type information associated with a merchant, in accordance with various embodiments.

FIG. 51 shows an exemplary table including a percentage of ROCs corresponding to a range of ROC amounts, in accordance with various embodiments.

DETAILED DESCRIPTION

Figure 1:
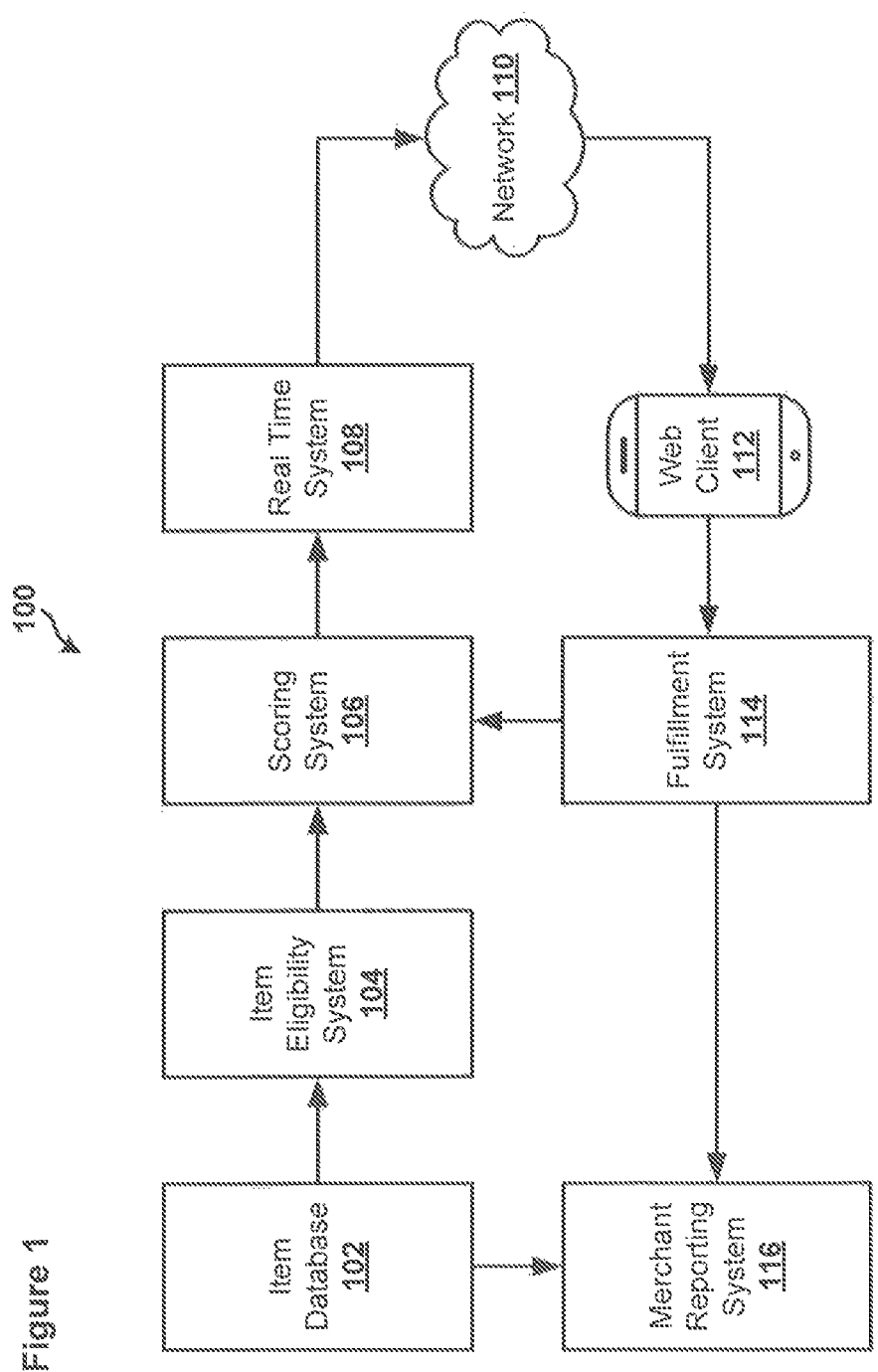
FIG. 1 shows an exemplary system diagram, in accordance with various embodiments.

The present disclosure generally relates to filtering, and more particularly, to tailored marketing to consumers based on filtering. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, account affiliate, cardmember or the like may be used interchangeably and shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer or account affiliate may include a transaction account owner, a transaction account user, an account affiliate, a child account user, a subsidiary account user, a beneficiary of an account, a custodian of an account, and/or any other person or entity affiliated or associated with a transaction account.

A bank may be part of the systems described herein, and the bank may, in various embodiments, represent other types of card issuing institutions, such as credit card companies, card sponsoring companies, or third party issuers under contract with financial institutions. It is further noted that other participants may be involved in some phases of a transaction, such as an intermediary settlement institution.

Phrases and terms similar to "business," "merchant," "service establishment," or "SE" may be used interchangeably with each other and shall mean any person, entity, distributor system, software and/or hardware that is a provider, broker and/or any other entity in the distribution chain of goods or services. For example, a merchant may be a grocery store, a retail store, a restaurant, a travel agency, a service provider, an on-line merchant and/or the like. In various embodiments, a merchant may request payment for goods and/or services sold to a customer or consumer who holds an account with a transaction account issuer.

Terms such as "transmit," "communicate" and/or "deliver" may include sending electronic data from one system component to another over a network connection. Additionally, as used herein, "data" may include information such as commands, queries, files, data for storage, and/or the like in digital or any other form.

A "transaction" may include one or more approved authorizations. Moreover, the phrase "transaction data" may comprise data associated with one or more transactions. In various embodiments, an authorization may be approved by a payment processor in response to a transaction request, which may be initiated by a consumer and/or a merchant.

Phrases and terms similar to "item" may include any good, service, information, experience, data, content, access, rental, lease, contribution, account, credit, debit, benefit, right, reward, points, coupons, credits, monetary equivalent, anything of value, something of minimal or no value, monetary value, offer, merchant, type of merchant, demographic data, preference data, consumer profile data, consumer profile, type of transaction account, transaction account, period of time (e.g., a period of time a consumer has been a customer of a transaction account issuer), size of wallet, share of wallet, information, and/or the like. Further, in various embodiments, an item may comprise an input to and/or an output of a collaborative filtering or recommendation algorithm.

An "offer" may comprise any data and/or information. An offer may comprise one or more items. In addition, an offer may comprise data associated with one or more items. An offer may further comprise one or more characteristics or metadata. The characteristics or metadata associated with an offer may describe one or more attributes associated with the offer. Further, in various embodiments, an offer may comprise an offer to purchase good or service offered for sale by a merchant or SE. Similarly, in various embodiments, an offer may be associated with a merchant or SE.

A "record of charge" or "ROC" may comprise a record of a transaction or charge by a consumer with a particular merchant. In various embodiments, a ROC may correspond to an individual transaction. Further, in various embodiments, a ROC may comprise a cumulative value, which may indicate a number of total transactions (e.g., purchases) a consumer has made with a particular merchant. Further still, in various embodiments, a ROC may simply comprise an indication that a consumer has conducted at least one transaction with a merchant (e.g., within a particular time period). For instance, where a consumer's transaction history shows that the consumer has made at least one purchase from a merchant (e.g., within 12 months), a ROC may simply comprise a binary value, such as a "1" or a "yes." Conversely, where a consumer's transaction history indicates that a consumer has not made a purchase from a merchant, a ROC may simply comprise a value such as a "0" or a "no". Various embodiments may be described with respect to purchases; however, the system contemplates any transaction in association with the system.

A "channel" may include any system or method for delivering content and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe pdf document, etc.), an "ebook," an "emagazine," an application or micro-application (as described herein), a text message, an email, and/or the like. In various embodiments, a channel may be hosted or provided by a data partner. Further, in various embodiments, a channel may comprise a social media channel, such as FACEBOOK, FOURSQUARE, TWITTER, and/or the like.

A "consumer profile" or "consumer profile data" may comprise any information or data about a consumer that describes an attribute associated with the consumer (e.g., a preference, an interest, demographic information, personally identifying information, and/or the like). In various embodiments, a consumer profile may be based upon a variety of data. For example, a consumer profile may be based upon data that is received, culled, collected, and/or derived from a variety of sources, such as a consumer's transaction history, data associated with or available via a consumer's social networking profile (e.g., a consumer's FACEBOOK profile), data associated with a customer's physical location, and/or other publicly and/or privately available sources of information about a consumer. In various embodiments, a consumer profile may not be based upon such data, unless a consumer opts in or requests that such data be used.

Further, in various embodiments, a consumer profile may be based upon data contributed by a consumer, a merchant, a third party, and/or an SE (as described herein). Such data may comprise, for example, a consumer's personal information, e.g., demographic information, a consumer's date of birth, a consumer's residence information, an address of the consumer's work, a specific preference associated with the consumer (e.g., a preference for a certain type of vacation, such as a preference for a tropical vacation), a website in which the consumer is interested, and/or the like. Further, a consumer may contribute data towards a consumer profile by way of a form and/or questionnaire, such as, for example, a web-based form or questionnaire.

With further regard to the types of data which may be contributed to a consumer profile, in general, any information that a consumer would like to serve as a basis for a consumer profile may be contributed. For instance, a consumer profile may comprise location data (e.g., data associated with a global positioning system, a home address, a work address, family location data, data about a consumer's most shopped or favorite shopping locations, data about a consumer's most visited or favorite places), data associated with a consumer's favorite websites, digital destinations, or magazines (e.g., blogs, news websites, shopping websites, research websites, financial websites, etc.), personal data (e.g., email addresses, physical addresses, phone numbers, age information, income information, expenses information, etc.), data associated with a consumer's status or mode of travel (e.g., vacation data, business data, personal data, airline data, lodging data, etc.), data associated with a consumer's favorite items (e.g., food, restaurants, groceries, electronics, music, gaming, clothing types, hobbies, fitness, etc.), and/or the like.

In addition, in various embodiments, a consumer profile may include online tracking cookie data, web beacon data, web tracking data, web packet trace data, digital fingerprint data, clickstream data, purchase or transaction history data, data entered by a consumer in a web based form, data purchased by a merchant about a consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the merchant may have in its possession or to which the merchant may gain access.

In various embodiments, a consumer may specify that a consumer profile may be based upon certain data, but that the profile should not be based upon other data. For example, a consumer may specify that the consumer's profile may be based upon data associated with the consumer's transaction history, but may not be based upon data culled from the consumer's social networking profile.

Phrases and terms similar to "account," "transaction account," "account," "account number," "account code," and/or "consumer account" may include any account that may be used to facilitate a transaction (e.g., financial transaction). These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card and/or an associated account.

Further, the phrase "size of wallet" may refer to a consumer's or business' total aggregate spending. Likewise, as used herein, the phrase "share of wallet" may represent how a customer uses different payment instruments. A size of wallet and a share of wallet may, for example, be determined as described in U.S. patent application Ser. No. 10/978,298 filed, Oct. 29, 2004, and entitled Method and Apparatus for Estimating the Spend Capacity of Consumers, which is incorporated herein by reference in its entirety for all purposes.

In general, although embodiments are described with additional detail herein, an item may be tailored to a consumer based upon a collaborative filtering algorithm. In various embodiments, a collaborative filtering algorithm may identify items that are relevant to one or more consumers. For example, a collaborative filtering algorithm may assign a score to one or more items, where the score may be based on information such as a consumer profile, a transaction history associated with a consumer, social data (e.g., data associated with a social media channel, such as FOURSQUARE, FACEBOOK, TWITTER, and/or the like), demographic data, clickstream data, consumer feedback data, and/or the like. Thus, a score may identify relevant items based upon a variety of information associated with a consumer.

Moreover, in various embodiments, an item may be tailored to a consumer based on a merchant's needs (e.g., that the merchant is interested in rewarding existing loyal customers and/or that the merchant would like to acquire new customers). Further still, in various embodiments, an item may be tailored to a particular consumer based upon a business rule, such as, for example, that it is a holiday, that it is a particular time of day, that the consumer is traveling, that the item is associated with a merchant who is some distance away and/or near to from the consumer's location, that the consumer has indicated a preference not to receive the item (e.g., the consumer has given the item a "thumbs down"), and/or the like.

In operation, social data may be used to determine how an item is displayed to a consumer or to modify a predetermined ranking. For example, an offer presented through FACEBOOK may comprise or be associated with criteria (e.g., keywords, metadata, and/or the like). Social data from FACEBOOK may be captured and compared to the criteria. Where there is a match or association between the criteria and the social data, the offer may be ranked higher, associated with a higher rank (e.g., higher number) or displayed more prominently based on the match or association. Business rules may be employed to define how a match or association is determined. The business rules may include that the social data partially match or associate with the criteria. The business rules may include that the social data exactly match or associate with the criteria. An exact match or association may be used to adjust the ranking of an offer (where the offer was previously ranked based on other data associated with the customer) to ensure that the social data adjusts the ranking in a manner that is relevant and desirable for the customer.

For example, company A may have a FACEBOOK page that a customer can "like." Another party may also have a FACEBOOK page that is critical of company A that a customer can "like." If the customer "likes" company A's FACEBOOK page, that social data may be used to promote or adjust the rankings of an offer from company A based on the direct match. However, if the customer "likes" the FACEBOOK page that is critical of company A, the social data may be ignored with respect to the ranking of an offer from company A or may be used to lower the ranking of the offer from company A.

Rankings of offers may also be adjusted based on other types of social data such as customer broadcasts. For example, a customer using TWITTER may broadcast tweets comprising hashtags and/or any other identifiers or keywords. The hashtag, identifier, and/or keyword data may be captured (e.g., via an API interfacing with Twitter, or being on a Twitter distribution list) and used to adjust offers associated with the hashtag, identifier, and/or keyword. The hashtag, identifier, and/or keyword data may be compared to criteria associated with the offer. The hashtag, identifier, and/or keyword data may also be evaluated to identify a customer's interests, hobbies, and/or preferences. This knowledge of the customer may affect the ranking of particular offers associated with any interest, hobby, or preference (e.g., if an offer is relevant to a particular customer, the ranking of the offer may be increased).

Accordingly, and with reference to FIG. 1, an exemplary recommender system 100 for tailoring and/or recommending an item (e.g., an offer, a merchant, a restaurant, etc.) to a consumer is disclosed. In various embodiments, system 100 may comprise an item database 102, an item eligibility system 104, a scoring system 106, a real time system 108, a network 110, a web client 112, a fulfillment system 114, and/or a merchant reporting system 116.

An item database 102 may comprise hardware and/or software capable of storing data. For example, an item database 102 may comprise a server appliance running a suitable server operating system (e.g., MICROSOFT INTERNET INFORMATION SERVICES or, "IIS") and having database software (e.g., ORACLE) installed thereon. In various embodiments, an item database 102 may store one or more items, such as one or more offers, associated, for example, with one or more merchants. An item database 102 may also store information associated with one or more items, such as information associated with one or more offers, one or more merchants, one or more recommendations and/or the like.

An item eligibility system 104 may comprise hardware and/or software capable of determining whether a consumer is eligible to receive an item and/or information related to an item (e.g., an offer, information associated with a merchant). For example, in various embodiments, an item eligibility system 104 may determine that a consumer is ineligible to receive an offer based upon a partnership and/or an affiliation associated with a transaction account of the consumer (e.g., an AMERICAN EXPRESS Airline A customer may be ineligible to receive an offer on an airline that is not Airline A).

A scoring system 106 may comprise hardware and/or software capable of scoring an item. For example, in various embodiments (as described herein), a scoring system 106 may analyze a variety of consumer information to score an item, such as an offer and/or a merchant. Moreover, in various embodiments a scoring system 106 may comprise a variety of "closed loop" or internal data associated with a consumer (e.g., as described herein).

A real time system 108 may comprise hardware and/or software capable of adjusting the relevance of an item (e.g., a scored offer and/or merchant) based upon a variety of criteria, such as one or more merchant criteria, one or more business rules, and/or the like. For example, as described herein, a real time system 108 may adjust the relevance of an offer based upon a merchant interest in acquiring new customers, a merchant interest in rewarding loyal customers, a holiday, a particular time of day, that the consumer is traveling, that the offer is associated with a merchant who is some distance away from and/or near to the consumer's location, that the consumer has indicated a preference not to receive an offer (e.g., the consumer has given the offer a "thumbs down"), and/or the like.

A network 110 may include any electronic communications system or method which incorporates hardware and/or software components (e.g. a "cloud" or "cloud computing" system, as described herein). Communication among parties via network 110 may be accomplished through any suitable communication channels, such as, for example, a telephone network, an extranet, an intranet, Internet, point of interaction device (point of sale device, electronic device (e.g., IPHONE, PALM PILOT, BLACKBERRY cellular phone, tablet computer, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although system 100 is frequently described herein as being implemented with TCP/IP communications protocols, the system may also be implemented using IPX, APPLETALK, IP-6, NetBIOS, OSI, any tunneling protocol (e.g. IPsec, SSH), or any number of existing or future protocols. If network 110 is in the nature of a public network, such as the Internet, it may be advantageous to presume network 110 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently and separately or collectively suitably coupled to network 110 via data links which include, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that network 110 may be implemented variously, such as, for example, as an interactive television (ITV) network. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

A web client 112 may include any device (e.g., a personal computer, a mobile communications device, and/or the like) which communicates via any network, for example such as those discussed herein. A web client 112 may include one or more browsers or browser applications and/or application programs, including browser applications comprising Internet browsing software installed within a computing unit or a system to conduct online transactions and/or communications. For example, in various embodiments, a web client 112 may include (and run) MICROSOFT INTERNET EXPLORER, MOZILLA FIREFOX, GOOGLE CHROME, APPLE SAFARI, and/or any software package available for browsing the Internet.

A computing unit or system may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as IPADs, IMACs, and MACBOOKS, kiosks, terminals, point of sale (POS) devices and/or terminals, televisions, GPS receivers, in-dash vehicle displays, and/or any other device capable of receiving data over a network. The computing unit of the web client 112 may be further equipped with an Internet browser connected to the Internet or an intranet using standard dial-up, cable, DSL or any other Internet protocol known in the art. Transactions originating at a web client 112 may pass through a firewall in order to prevent unauthorized access from users of other networks. Further, additional firewalls may be deployed between the varying components of system 100 to further enhance security.

In various embodiments, a web client 112 may or may not be in direct contact with an application server. For example, a web client 112 may access the services of an application server through another server and/or hardware component, which may have a direct or indirect connection to an Internet server. For example, a web client 112 may communicate with an application server via a load balancer and/or a web server. In various embodiments, access is through a network or the Internet through a commercially-available web-browser software package.

A web client 112 may further include an operating system (e.g., WINDOWS NT/95/98/2000/XP/VISTA/7/8/CE/MOBILE, OS2, UNIX, Linux, SOLARIS, MACOS, PALMOS, etc.) as well as various conventional support software and drivers typically associated with computers. A web client 112 may be in a home or business environment with access to a network. A web client 112 may implement security protocols such as Secure Sockets Layer (SSL) and Transport Layer Security (TLS). A web client 112 may further implement several application layer protocols including http, https, ftp, and sftp.

A fulfillment system 114 may comprise any hardware and/or software capable of fulfilling and/or facilitating fulfillment. For instance, a fulfillment system 114 may, in various embodiments, comprise hardware and/or software capable of fulfilling and/or facilitating fulfillment of an offer. In various embodiments, a fulfillment system 114 may comprise a system, such as a system described in U.S. patent application Ser. No. 11/779,734, filed, Jul. 18, 2007, and entitled Loyalty Incentive Program Using Transaction Cards, which is incorporated herein by reference in its entirety. In addition, in various embodiments, a fulfillment system 114 may comprise a system, such as a system described in U.S. patent application Ser. No. 12/857,389, filed, Aug. 16, 2010, and entitled System and Method for E-Mail Based Rewards, which is incorporated herein by reference in its entirety. In various embodiments, a fulfillment system 114 may comprise a system, such as a system described in U.S. patent application Ser. No. 13/153,890, filed, Jun. 6, 2011, and entitled System and Method for Administering Marketing Programs, which is incorporated herein by reference in its entirety. In various embodiments, a fulfillment system 114 may comprise a system, such as a system described in U.S. patent application Ser. No. 13/021,327, filed, Feb. 4, 2011, and entitled Systems and Methods for Providing Location Based Coupon-Less Offers to Registered Card Members, which is incorporated herein by reference in its entirety. In various embodiments, a fulfillment system 114 may comprise a system, such as a system described in U.S. patent application Ser. No. 13/153,890, filed, Jun. 6, 2011, and entitled System and Method for Administering Marketing Programs, which is incorporated herein by reference in its entirety. In various embodiments, a fulfillment system 114 may comprise a system, such as a system described in U.S. patent application Ser. No. 13/188,693, filed, Jul. 22, 2011, and entitled System and Method for Coupon-Less Product Level Discounts, which is incorporated herein by reference in its entirety. In various embodiments, a fulfillment system 114 may comprise a system, such as a system described in U.S. patent application Ser. No. 13/411,281, filed, Mar. 2, 2012, and entitled System and Method for Providing Coupon-Less Discounts Based on a User Broadcasted Message, which is incorporated herein by reference in its entirety. In various embodiments, a fulfillment system 114 may comprise a system, such as a system described in U.S. patent application Ser. No. 13/439,768, filed, Apr. 4, 2012, and entitled System and Method for Providing International Coupon-Less Discounts, which is incorporated herein by reference in its entirety.

A merchant reporting system 116 may comprise any hardware and/or software capable of generating a report and/or providing a report to a merchant. For example, in various embodiments, a merchant reporting system 116 may generate a report illustrating a ROI received by the merchant as the result of a tailored marketing campaign.

Figure 59:
FIG. 59 shows a screenshot depicting an interface wherein a consumer may review a plurality of tailored lists, in accordance with various embodiments.

Referring broadly now to FIGS. 2-59, the process flows, logical representations, and/or screen shots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 2-59 but also to the various system components and/or logical representations as described above with reference to FIG. 1. In addition, although FIGS. 2-59 may variously utilize and make reference to one or more matrices, tables, and/or the like, it will be appreciated that a variety of data structures, data sets, and/or the like may be substituted and/or utilized with equal application to the process flows, logical representations, and/or screen shots depicted and discussed herein.

With reference to FIG. 2, a process 200 for tailoring and/or recommending a relevant item, such as an offer and/or merchant, to a consumer is described. In addition to the processes described herein, in various embodiments, a process for tailoring marketing to a consumer as described in U.S. patent application Ser. No. 13/245,636, filed, Sep. 26, 2011, and entitled Systems and Methods for Targeting Ad Impressions, which is incorporated herein by reference in its entirety, may be implemented. Similarly, in various embodiments, a process for tailoring marketing to a consumer as described in U.S. patent application Ser. No. 13/172,676, filed, Jun. 29, 2011, and entitled Spend Based Digital Ad Targeting and Measurement, which is incorporated herein by reference in its entirety, may be implemented. Further, in various embodiments, a process may be implemented for tailoring marketing to a consumer as described in U.S. patent application Ser. No. 13/348,432, filed, Jan. 11, 2012, and entitled Systems and Methods for Digital Spend Based Targeting and Measurement, which is incorporated herein by reference in its entirety.

Further still, in various embodiments and in addition to the processes described herein, a process for tailoring marketing to a consumer may be implemented as described in U.S. patent application Ser. No. 11/315,262, filed, Dec. 23, 2005, and entitled Method and Apparatus for Collaborative Filtering of Card Member Transactions, which is incorporated herein by reference in its entirety. In addition, in various embodiments a process for tailoring marketing to a consumer may be implemented as described in U.S. patent application Ser. No. 11/500,492, filed, Aug. 8, 2006, and entitled System and Method for Predicting Card Member Spending Using Collaborative Filtering, which is incorporated herein by reference in its entirety.

Further still, in various embodiments and in addition to the processes described herein, a process for tailoring marketing to a consumer may be implemented as described in U.S. Provisional Patent Application Ser. No. 61/610,461, filed, Mar. 13, 2012, and entitled Generating Merchant Recommendations for Consumers, which is incorporated herein by reference in its entirety. In addition, in various embodiments a process for tailoring marketing to a consumer may be implemented as described in U.S. Provisional Patent Application Ser. No. 61/610,981, filed, Mar. 14, 2012, and entitled Generating a Customer Review Using Customized Tags, which is incorporated herein by reference in its entirety. Moreover, in various embodiments a process for tailoring marketing to a consumer may be implemented as described in U.S. Provisional Patent Application Ser. No. 61/610,983, filed, Mar. 14, 2012, and entitled Transaction Rewards List, which is incorporated herein by reference in its entirety.

Referring broadly to FIG. 2, each of the steps 202-206 may be performed alone and/or in combination with any other step 202-206. Accordingly, as shown, in various embodiments, a consumer's eligibility may be assessed (step 202). As described herein, an item eligibility system 104 may assess a consumer's eligibility to receive an item, such as an offer and/or information associated with a merchant. Furthermore, a consumer may be ineligible to receive an item for many reasons. For example, a consumer may be ineligible to receive an item because the consumer holds a transaction account (e.g., an AMERICAN EXPRESS Airline A account) that is associated with a partner and/or merchant (e.g., Airline A) that is unaffiliated with (and/or a competitor of) an item associated with another merchant (e.g., Airline B).

Further, in various embodiments, a consumer relevance value or score may be determined (e.g., by a scoring system 106) (step 204). In various embodiments, a consumer relevance value (or "CRV") may be determined based on content and/or an industry associated with one or more items. Similarly, in various embodiments, a consumer relevance value may be determined based on a collaborative filtering algorithm, as described herein. Further, in various embodiments, a consumer relevance value may be based on either or both of content and/or a collaborative filtering algorithm.

Further still, in various embodiments, a consumer relevance value associated with an item such as an offer and/or merchant may be adjusted and/or determined based on one or more merchant goals and/or one or more business rules (e.g., by a real time system 108) (step 206). For example, as described herein, a consumer relevance value may be adjusted based on a merchant goal to acquire only new customers, tailor existing customers of the merchant, and/or tailor all consumers. In various embodiments, a consumer relevance value may be adjusted based on any suitable adjustment parameter including, for example, a holiday, a particular time of day, a determination that the consumer is traveling, a determination that the item is associated with a merchant who is some distance away from and/or near to the consumer's location, because the consumer has indicated a preference not to receive the item (e.g., the consumer has given the offer a "thumbs down"), and/or the like.

With reference to FIGS. 3-6, a process 300 and screenshots for determining a consumer relevance value of an item are described. In various embodiments, a CRV may be determined based upon a collaborative filtering algorithm. As shown, an "item to item similarity" may be determined (step 302). In general terms, an item to item similarity may show which pairings of items (e.g., merchants, demographics, etc.) occur most often or are most strongly correlated. An item to item similarity may be determined for many types of items, but for purposes of illustration and in various embodiments, an item to item similarity between a plurality of merchants may be determined by comparing ROCs of a plurality of consumers at the plurality of merchants.

To illustrate, and with particular attention now to FIG. 4A, an "item matrix" (e.g., item matrix 400A) may be arranged and/or generated. In various embodiments, an item matrix may comprise one or more coefficients (and/or one or more rows and/or columns). Each coefficient of an item matrix may comprise a record associated with one or more items, such as an indication that an item is associated with another item (e.g., a consumer with a merchant, a consumer and/or merchant with an interest, a consumer with a demographic, a merchant with a demographic, a consumer with another consumer, a consumer's profile with another consumer's profile, a size or share of wallet with a consumer, an age attribute with a consumer, a gender with a consumer, a favorite cuisine with a consumer, and/or the like). So, for example, in various embodiments, each coefficient may comprise a ROC of a consumer with a merchant. As described herein, a ROC may comprise an indication or record that a consumer has conducted a transaction with a merchant and/or a record of a number of transactions a consumer has made with a merchant. Where a ROC comprises a record of a number of transactions a consumer has made, the ROC may be capped or limited to a particular maximum value (e.g., a ROC may be limited to a value of "1," "2," etc.), so that a CRV (which is calculated as described herein) is not overly skewed or distorted by a large number of ROCs. However, in various embodiments, a ROC may not be capped to a maximum value.

Thus, in various embodiments, each column or row of an item matrix may correspond to a merchant and/or a consumer. For example, item matrix 400A may include a first consumer's ROCs at one or more merchants or SEs (e.g., ROCs 402a, 402b, and/or 402c of the consumer Alex at SE1, SE2, and/or SE3), which may be compared to ROCs of one or more other consumers at those merchants (e.g., ROCs 404a, 404b, and/or 404c and/or ROCs 406a, 406b, and/or 406c of the consumers Bob and Cara, respectively). In various embodiments, an item may comprise any information associated with a merchant and/or a consumer, such as, for example, one or more merchant characteristics, on or more consumer characteristics, one or more consumer profiles and/or information comprising a consumer profile, demographic information associated with a consumer and/or a merchant, consumer and/or merchant feedback, and the like.

In various embodiments, coefficients of an item matrix may be compared, and a correlation or similarity between items, (i.e., "item to item similarity"), may be determined based upon the comparison. For instance, in various embodiments, coefficients of an item matrix may be compared, and an item to item similarity between items may be determined based on one or more methods. More particularly, in various embodiments, an item to item similarity may be determined based on a co-occurrence method, a cosine method, and/or the like. Broadly, a co-occurrence method may determine, in various embodiments and as described herein, how many times one or more items occur together. Similarly, a cosine method may be used to determine, in various embodiments, a distance between two vectors (e.g., where a vector may comprise one or more coefficients in an item matrix).

Where coefficients comprise ROCs, a comparison of ROCs (e.g., using a co-occurrence method) of a plurality of consumers at one or more merchants (e.g., ROCs 402a, 402b, 402c, 404a, 404b, 404c, 406a, 406b, and/or 406c) may show that two consumers (e.g., Bob and Cara) have a ROC at both SE1 and at SE2. Likewise, the comparison may show that two consumers (e.g., Alex and Cara) have a ROC at SE3, but that only one of those consumers (e.g., Cara) also has a ROC at SE1. Similarly, the comparison may show that two consumers (e.g., Bob and Cara) have a ROC at SE2, while only one of those consumers (e.g., Cara) has a ROC at SE3.

As such, a comparison may show ROCs by more than one consumer (e.g., Bob and Cara) at a plurality of merchants (e.g., SE1 and SE2), and this may suggest a correlation or similarity (i.e., an item to item similarity) between these merchants. In other words, the correlation may show a tendency by consumers like Bob and Cara to conduct transactions with these merchants. Similarly, the existence of ROCs by a first consumer at a first merchant (e.g., Alex at only SE3) and ROCs by a second consumer at a plurality of merchants including the first merchant (e.g., Cara at SE1, SE2, and SE3) may suggest an item to item similarity between the first merchant and the plurality of merchants (e.g., between SE3 and SE1 and between SE3 and SE2).

Therefore, where an item to item similarity is based on ROCs of a first consumer at a first merchant and ROCs by a second consumer at a plurality of merchants including the first merchant, as described above, the item to item similarity between merchants (e.g., between SE3 and SE1 and between SE3 and SE2) may not be as pronounced or strong as an item to item similarity, for example, between merchants (e.g., SE1 and SE2) from whom each consumer conducted a transaction. In other words, a comparison may suggest a more pronounced, stronger, and/or greater item to item similarity between merchants when consumers (e.g., Bob and Cara at SE1 and SE2) each shop at the merchants than when consumers shop at some merchants (e.g., Alex and Cara shop at SE3) but not all merchants (e.g., Alex does not shop at SE1 and SE2). Thus, in simple terms, an item to item similarity may demonstrate or suggest a sort of "wisdom of the people," with which a tendency of certain consumers to transact with one merchant may suggest an interest by other consumers in that merchant and/or in other merchants from whom the consumer may transact.

In various embodiments, and with attention now to FIG. 4B, an item to item similarity may correspond to a numerical value (an "item to item similarity value"), and this value may be determined based upon a comparison as described above (e.g., a comparison of ROCs of one or more consumers at a plurality of merchants). In particular, an item to item similarity value may be based upon the number of consumers two merchants share in common. Moreover, one or more item to item similarity values may be arranged in an "item to item similarity matrix" (e.g., item to item similarity matrix 400B), in which each coefficient corresponds to an item to item similarity value, and in which each row and/or column may correspond to a particular item or merchant. Thus, an item to item similarity value may describe, as discussed herein, the similarity of one item to another (e.g., where greater values correspond to more pronounced or stronger item to item similarities between items such as merchants).

For instance, an item to item similarity matrix 400B may comprise a first item to item similarity value 408 of "2." The value 408 may be assigned to SE1 and SE2, because these two merchants have two consumers (e.g., Bob and Cara) in common. Likewise, an item to item similarity value 410 of "1" may be assigned to SE1 and SE3, because, only one of these two merchants (e.g., SE3) has ROCs for both consumers (e.g., Alex and Cara both shop at SE3, but only Cara shops at SE1). And, an item to item similarity value 412 of "1" may be similarly assigned to SE2 and SE3, because, as the example shows, only one of these two merchants (e.g., SE2) has ROCs for both consumers (e.g., Bob and Cara may both shop at SE2, but only Cara shops at SE3). Thus, an item to item similarity value may, in various embodiments, be based upon a co-occurrence between items (e.g., the number of consumers with co-occurring ROCs at a plurality of merchants).

In addition, although items may be scored (e.g., associated with an item to item similarity value and/or a CRV, as described herein) with a collaborative filtering algorithm, in various embodiments, an item may be scored based upon its content. For example, where a first item comprises an offer to eat at a particular type of restaurant (e.g., a Chinese restaurant), a second item may be scored based upon its similarity to the first item. So, for example, where a consumer's transaction history, consumer profile, social data, feedback data, click-through data, etc. show that the consumer has eaten at and/or accepted an offer related to a first type of restaurant, offers related to similar restaurants may be tailored to the consumer. Further, as described herein, an item may be scored based upon a combined collaborative filtering and/or content based process, in which case both types of scoring may simply apply and/or contribute to an item's overall or collective score.

With continuing regard to FIG. 3 and with special attention now to FIGS. 5A through 5C, a CRV may be determined or calculated (step 304). In various embodiments, a CRV may describe a relevance of an item (e.g., a merchant, an offer associated with the merchant) to a consumer. In other words, a CRV may describe a likelihood or probability that a consumer will be interested in a particular item (e.g., a merchant and/or an offer from a merchant).

Accordingly, in various embodiments, a CRV may be determined based on an item to item similarity and/or an item to item similarity value, a consumer transaction history, a demographic, a consumer profile, a size of wallet, social data, time and/or date information, consumer and/or merchant feedback, and/or the like. For instance, in various embodiments, a CRV may be calculated by multiplying an item to item similarity value by a consumer transaction history. More particularly, in various embodiments, a "consumer relevance matrix" or "CRV matrix" comprising one or more CRVs may be determined or calculated by multiplying an item matrix by an item to item similarity matrix. Thus, each coefficient of a CRV matrix may comprise a CRV.

Many additional examples and/or implementations are possible. With regard to FIGS. 5A, 5B, and 5C, CRVs for the consumer Dan to each of the three merchants, SE1, SE2, and SE3 may be obtained by multiplying the row vector corresponding to Dan in the consumer item matrix 500B to each column vector corresponding to the three SEs in the item to item similarity matrix 500A. As shown in FIG. 5C, a CRV matrix 500C may comprise CRVs for one or more consumers to one or more items (e.g., merchants, offers associated with one or more merchants, and/or the like). To illustrate, a calculation may be performed for the consumer Dan as follows:

*Dan's CR* to *SE*1: $508a*502a+508b*504a+508c*506a=1*0+0*2+0*1=0$

Dan's CR to SE2: 508$a$*502$b$+508$b$*504$b$+
508$c$*506$b$=1*2+0*0+0*1=2

Dans's CR to SE3: 508$a$*502$c$+508$b$*504$c$+
508$c$*506$c$=1*1+0*1+0*0=1

Accordingly, as shown, the consumer Dan has CRVs of "0" to SE1, "2 " to SE2, and "1" to SE3. These values may indicate, for example, that Dan is most likely to have an interest in the merchant SE2 (and/or offers from or recommendations for the merchant SE2), while he is less likely to have an interest in the merchant SE3, and least likely to have an interest in the merchant SE1. That is, in other words and in various embodiments, greater consumer relevance values may indicate that a consumer is more likely to have an interest in an item, while lesser values may indicate that a consumer is less likely to have an interest in an item.

In various embodiments, a CRV may be determined based upon any item (as described herein). For example, a CRV may be determined based on a consumer profile, transaction data, demographic data, a type of transaction account, a transaction account, a period of time (e.g., a period of time a consumer has been a customer of a transaction account issuer), a size of wallet, a share of wallet, an output of a collaborative filtering algorithm, a preference, and/or the like. For instance, a CRV may be determined based on data comprising a consumer profile (e.g., demographic data) where, for example, a consumer is not associated with a transaction history (e.g., the consumer may hold an unused transaction account). Moreover, in various embodiments, consumer profile data, demographic data, and/or the like may be used (alone and/or in conjunction with a transaction history such as ROC data) to determine a CRV even if a consumer is associated with a transaction history.

Figure 6:
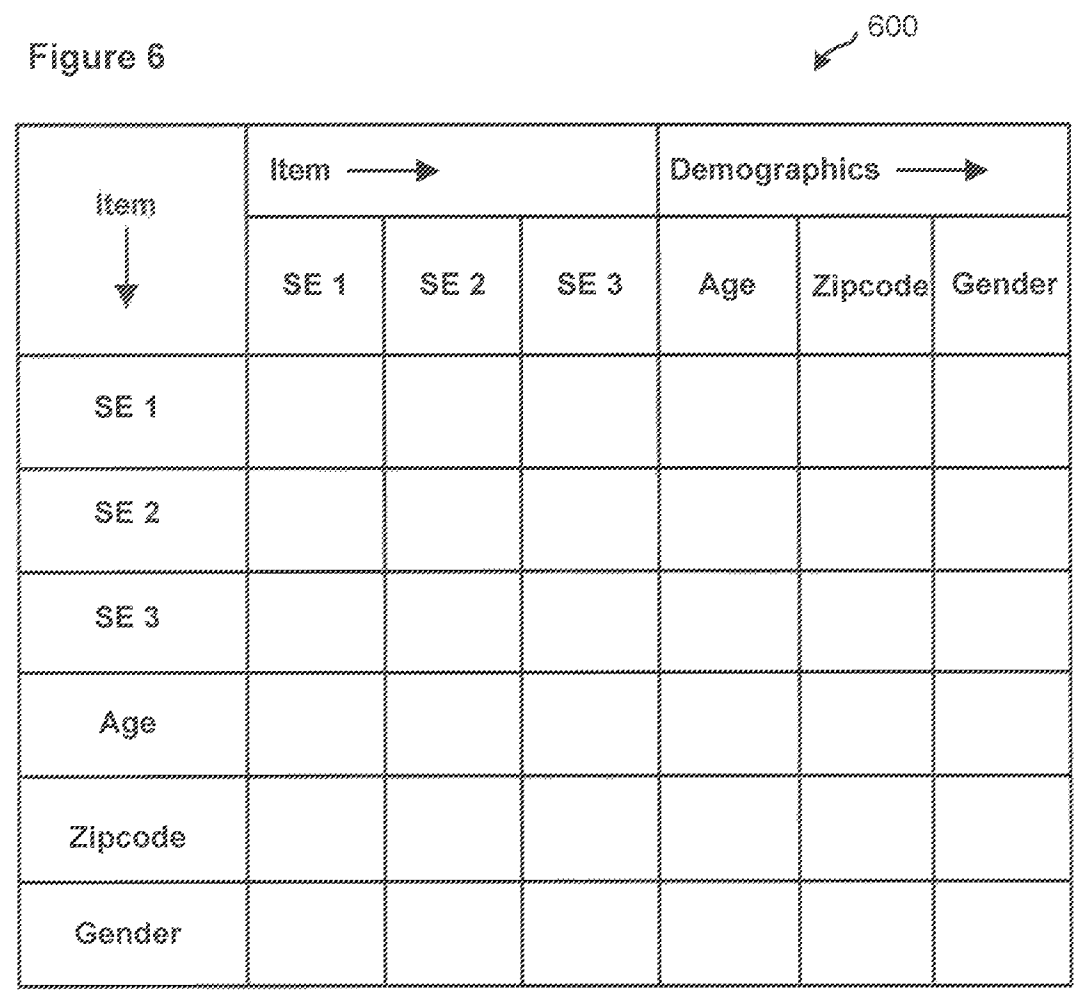

More particularly, in various embodiments, a CRV may be determined based on a consumer profile, demographic information, social data, time and/or date information, consumer and/or merchant feedback, and/or the like by including the item as part of an item matrix and/or as part of an item to item similarity matrix, as described herein. An illustrative item to item similarity matrix that includes demographic information is shown in FIG. 6, and a CRV may be calculated, as described herein, by multiplying an item matrix including such information by an item to item similarity matrix that also includes such information. With regard to an item to item similarity matrix that includes demographic (or other) information, an item such as a merchant may, in various embodiments, be associated with a particular demographic item based on, for example, a demographic of a consumer who may tend to shop with the merchant (e.g., consumers in a particular age range, consumers in a particular zip code, consumers having a particular gender, etc.) Thus, a CRV may be determined based upon a variety of items.

Further, in various embodiments, matrix coefficients, item to item similarity values, CRVs, and/or the like, may be weighted or adjusted by an adjustment or weighting factor. For example, a coefficient (e.g., a coefficient in an item to item similarity matrix) may be weighted based upon a likelihood that a consumer will perform a desired action, such as a likelihood that a consumer will transact with a merchant. More particularly, in various embodiments, a coefficient in a matrix (e.g., a coefficient in an item to item similarity matrix) may be weighted more heavily in response to a determination that the coefficient is associated with a greater likelihood that a consumer will transact with a merchant. A coefficient may, similarly, be weighted less heavily in response to a determination that the coefficient is associated with a reduced or lesser likelihood that a consumer will transact with a merchant. Thus, a coefficient (such as an item to item similarity value and/or a CRV) may be adjusted or weighted based upon a likelihood that a consumer will perform a desired action, such as transaction with a merchant, and this adjustment may be used to increase or maximize (or attempt to maximize) a chance of predicting that a consumer will perform a desired action.

In various embodiments, a weighting or adjustment factor may be calculated based on one or more transaction histories. For example, an analysis of the transaction histories of a plurality of consumers may suggest that items such as a particular size of wallet and/or a particular demographic may often co-occur with transactions by consumers with a particular merchant. Where this is the case, a size of wallet and/or a demographic may be weighted more heavily, while other items or factors (e.g., ROCs) may be weighted less heavily, e.g., because a similarity between ROCs and transactions with a particular consumer may be less than a similarity between other items (e.g., share of wallet) and transactions with the consumer.

In various embodiments, each coefficient of a CRV matrix (e.g., CRV matrix 500C) may be organized or ranked (e.g., as part of a ranked list (step 306)) and the ranking and/or ranked list may be used to tailor items (e.g., offers, merchants, etc.) to consumers (e.g., as part of a merchant marketing campaign). For instance, with continued attention to the foregoing example, each CRV may be ranked from most relevant to least relevant and/or highest to lowest. Thus, with continuing reference to the example provided above, a ranking and/or list may be generated for the consumer Dan which lists SE2 first, SE3 second, and SE1 last. In various embodiments, such a list may be used to recommend items and/or tailor items to a consumer (e.g., Dan). For example, a consumer may receive merchant offers and/or merchant identifiers associated with a CRV. Likewise, a consumer may receive a list of merchants and/or offers related to each item or merchant in a CRV matrix. A ranked list may be organized according to CRV value. For instance, merchants and/or offers associated with high CRVs may be displayed at the top of a list, while merchants and/or offers associated with lower CRVs may be displayed nearer the bottom of a list.

Figure 11:
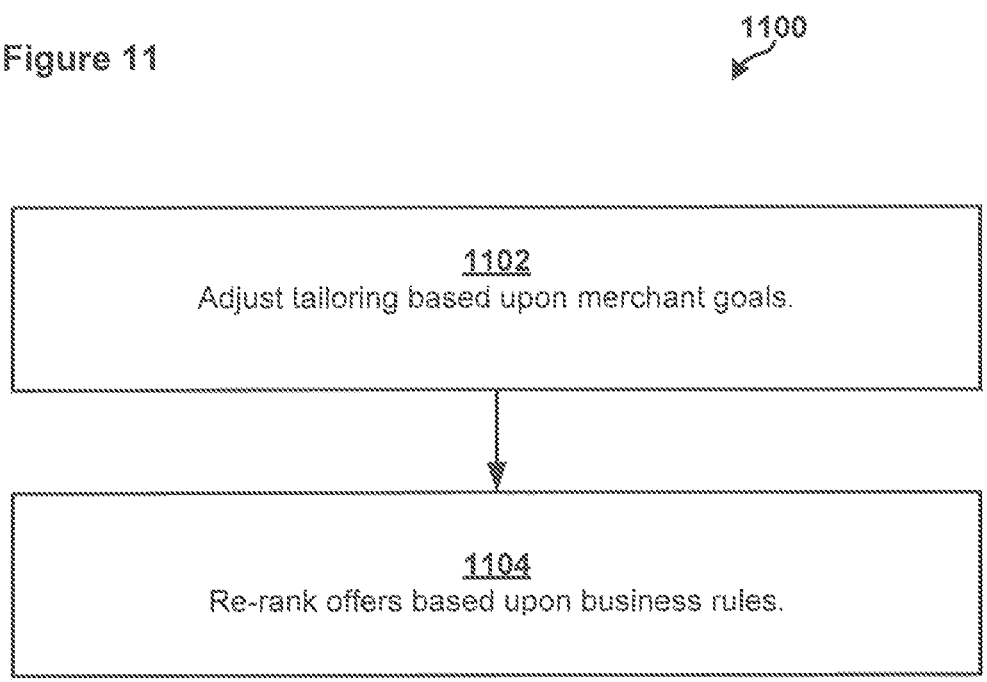
FIG. 11 shows a flowchart depicting an exemplary process for adjusting tailoring based upon one or more merchant goals, in accordance with various embodiments.

With reference to FIG. 11, a process 1100 for adjusting a recommendation of an item, such as an offer, is described. As shown, a recommendation may be adjusted based upon a merchant goal (step 1102), which a merchant may establish as part of a marketing campaign, as described herein. For instance, in various embodiments, a ranking of CRVs, a list of ranked items, and/or a list of ranked CRVs, as discussed above, may be reorganized or re-ranked based upon one or more merchant tailoring goals (step 1104). Similarly, in various embodiments, an item that might otherwise be tailored and/or delivered to a consumer (e.g., based upon a ranked list and/or a CRV) may not be tailored and/or delivered as a result of process 1100.

A merchant goal may, in various embodiments, comprise an "acquisition goal," a "loyalty goal," and/or an "unlimited goal." An acquisition goal may comprise a goal to acquire new customers. A loyalty goal may comprise a goal to reward or encourage additional spending by existing customers. An unlimited goal may comprise a goal to reach and/or tailor marketing to all consumers (e.g., all consumers based upon one or more CRVs).

Figure 7:
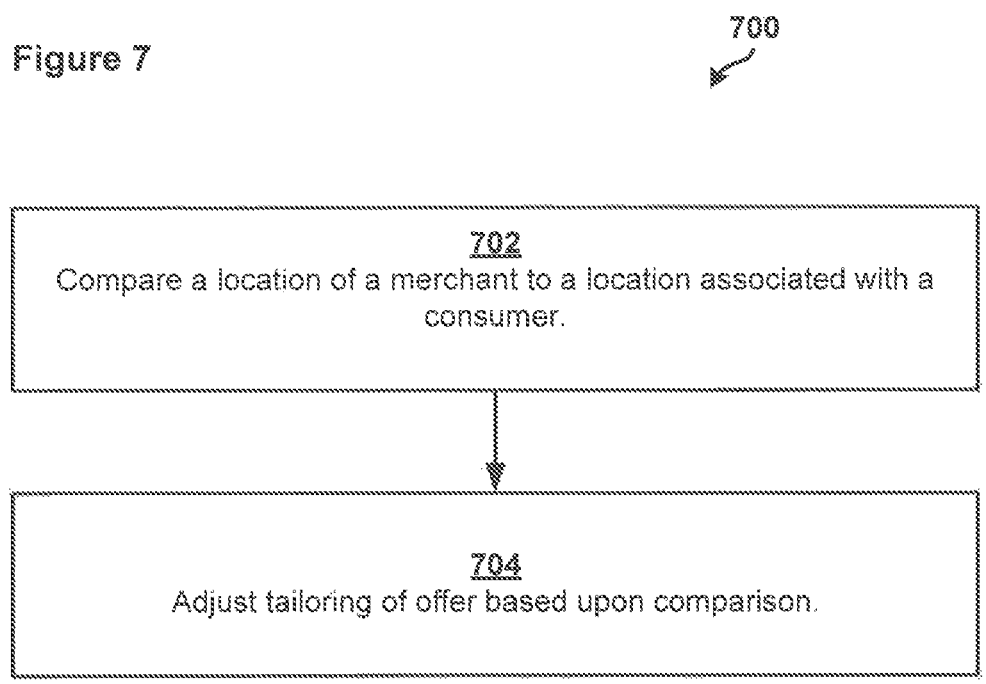
FIG. 7 shows a flowchart depicting an exemplary process for adjusting a merchant goal based upon a consumer location, in accordance with various embodiments.

With reference to FIG. 7, an acquisition goal may be associated with a process 700 in which the tailoring of one or more items may be adjusted according to a merchant goal to acquire new customers. As shown, in various embodiments, a location of a merchant (or "merchant location") may be compared to a location of a consumer (or "consumer location") to determine whether the consumer may be a candidate for acquisition (step 702). A consumer location may comprise, for example, a location in which a consumer resides, such as a zip code in which a consumer lives (or "living location") and/or one or more locations in which a consumer spends, such as one or more zip codes in which a consumer spends (or "spending location"). A consumer location may also be determined based on an input from the consumer. For example, the consumer may be able to indicate a desired location on a map where the customer expects to be at a later time (e.g., through a computer interface). In addition, in various embodiments, as described herein, a consumer location may comprise a real-time physical location of a consumer. Where a consumer location comprises a real-time location (or "real-time consumer location"), the location may be based upon a global positioning system signal ("GPS"), triangulation or another positioning technique that uses a signal output by a consumer's web client 112, and/or the like.

Thus, in various embodiments, if a consumer location is within a particular distance of a merchant location (e.g., one or two miles), the consumer may be considered a candidate for acquisition and a tailored item transmitted to the consumer based, for example, upon a ranked list and/or a CRV matrix, as described herein (step 704). However, if a consumer location is not within a particular distance of a merchant location, a consumer may not be considered a candidate for acquisition, because, although the consumer may be likely to accept the tailored item, the consumer may nevertheless be unlikely to return to the merchant as an existing customer due to the distance between the consumer location and the merchant location.

Continuing, in various embodiments, a loyalty goal may be associated with a process in which tailored items are delivered to existing consumers, provided, for example, that these consumers meet one or more criteria. For example, information associated with a tailored item may be delivered to an existing customer of a merchant provided the customer has purchased from the merchant within a threshold time period (e.g., the previous twelve months).

In various embodiments, with respect to an unlimited goal, such a goal may simply indicate that a merchant wishes to tailor items to all consumers (e.g., that the merchant wishes to tailor items to all consumers based upon a collaborative filtering process, a ranked list, a CRV matrix, etc.). Thus, for example, consumers (whether existing customers or new customers) may receive information associated with tailored items based upon a CRV matrix, as described herein.

Figure 8C:
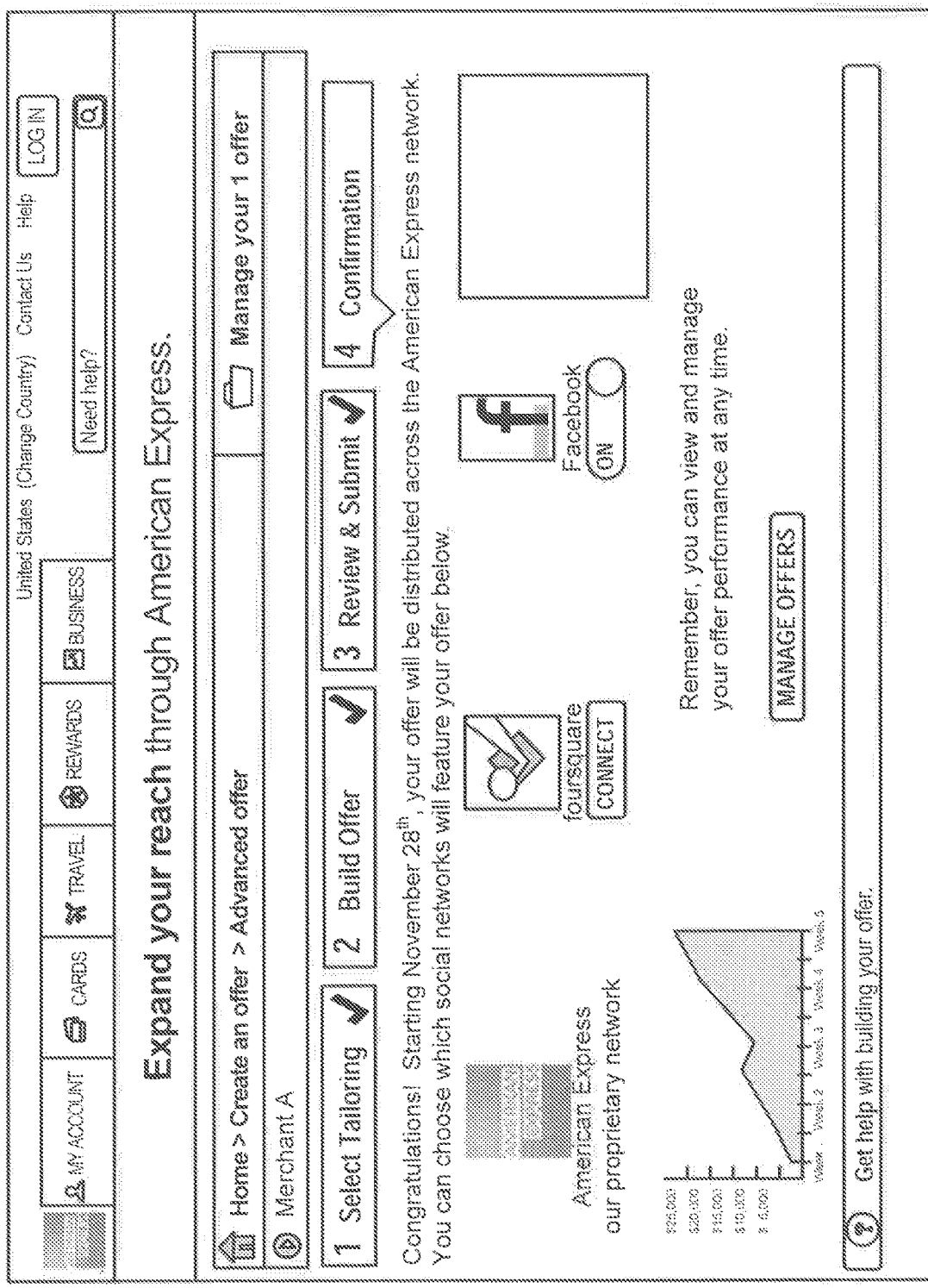
FIG. 8C shows a screenshot depicting an interface wherein a merchant may select one or more social media channels to feature an offer, in accordance with various embodiments.

In various embodiments, and with reference now to FIGS. 8A, 8B, and 8C, and with particular reference to FIG. 8A, a merchant may (e.g., via interface 800, such as a web based interface displayed by web client 112) select a merchant goal (e.g., an unlimited goal to recommend to all consumers, an acquisition goal to recommend to new customers, and/or a loyalty goal to recommend to existing customers). Moreover, with particular reference to FIG. 8B, a merchant may, in various embodiments, place a variety of constraints on an item. For instance, as shown, a merchant may specify a type of item (e.g., an offer to receive a credit on a billing statement, and/or the like). Similarly, in various embodiments, a merchant may specify that a particular item should be delivered to a consumer provided the consumer meets a particular restriction (e.g., that the consumer spends a threshold amount with the merchant, etc.) Further, a merchant may limit an item to a particular number or range of consumers (e.g., a merchant may limit an offer to 10,000 consumers).

In addition, with particular reference to FIG. 8C, a merchant may select one or more channels (e.g., one or more websites, one or more social networks, and/or the like) that should feature an item. For example, in various embodiments, a merchant may specify channels associated with entities such as AMERICAN EXPRESS, FOURSQUARE, FACEBOOK, TWITTER, GOOGLE, and/or the like. Similarly, in various embodiments, a merchant may specify channels such as an electronic statement associated with a consumer's transaction account, an application and/or micro-application associated with web client 112, as described herein, and/or the like. Additionally, in various embodiments, a consumer may be associated with one or more preferred channels (e.g., via a consumer profile), and a tailored item may be delivered to the consumer via the one or more preferred channels. For example, a consumer may register to receive information associated with tailored items via one or more preferred channels (e.g., via an AMERICAN EXPRESS channel).

Further, in various embodiments, an item may be distributed or delivered over one or more channels over time. For example, in various embodiments, an offer may be distributed to a first channel or group of channels (e.g., FACEBOOK during the morning and evening hours (e.g., based on a probability or assumption that a consumer is at home), while the same offer may be distributed to a second channel or group of channels (e.g., FOURSQUARE during the afternoon and/or from 8 am to 5 pm, for example (e.g., based on a probability or assumption that a consumer is not at home, but potentially shopping).

Further, in various embodiments, a ranking and/or ranked list of items and/or CRVs may be transmitted to a channel or channel owner for delivery or further transmittal to one or more consumers. In various embodiments, a channel or channel owner may not be allowed to re-rank a list and/or CRVs. However, in various embodiments, a channel or channel owner may be allowed to re-rank a list and/or CRVs in response to certain actions by a consumer (e.g., an explicit indication of interest or non-interest by a consumer, such as a "like" or "dislike," a thumbs up or thumbs down, and/or the like). Moreover, in various embodiments, an explicit indication of interest (e.g., a consumer "liking" the ACME brand) may permit a channel or channel owner to move or re-rank an item (e.g., at the top of a ranking and/or ranked list of items).

A merchant may pay for an item accepted by a consumer in a variety of ways. For instance, a merchant may pay for an accepted offer in response to the offer being redeemed by a consumer and/or a merchant may pay for an offer or group of offers at a time the merchant selects or chooses to make a number of offers, as described herein (e.g., see FIG. 8B). In addition, where a merchant pays only for accepted offers, a merchant may in essence pay for performance. In other words, because a merchant may only pay for redeemed offers, the merchant need not be concerned about making a number of offers to consumers via system 100 (e.g., because the merchant would not pay for each offer unless redeemed).

Figure 9:
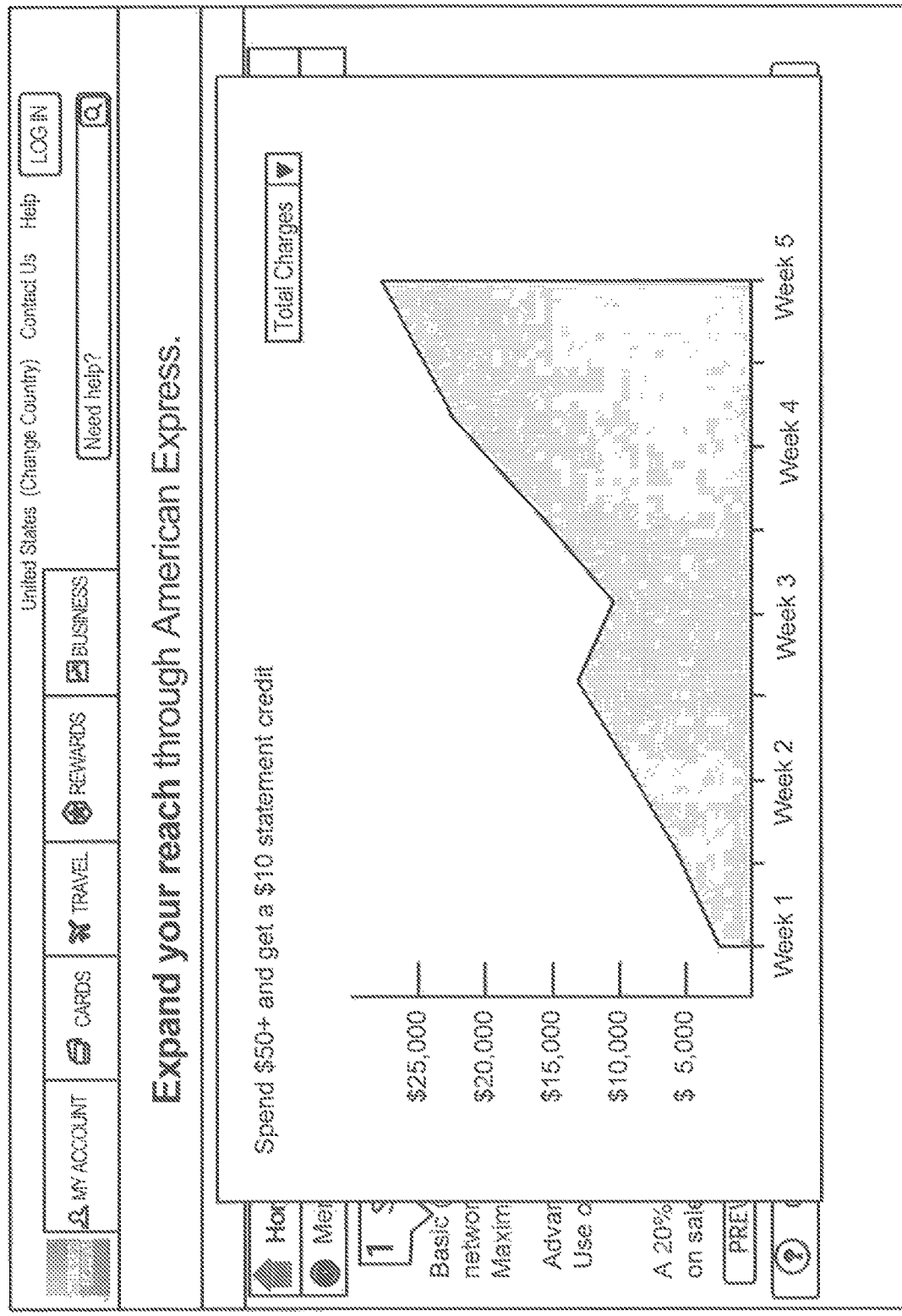
FIG. 9 shows a screenshot depicting an interface wherein a merchant may review a marketing campaign report, in accordance with various embodiments.

Further, with reference to FIG. 9, a merchant may receive and/or view, in various embodiments, a marketing campaign report (e.g., report 900). A marketing campaign report 900 may show, for example, a ROI associated with a particular tailored marketing campaign. Moreover, in various embodiments, a marketing campaign report 900 may show a ROI over the course of a particular campaign period (e.g., several weeks or months). Thus, a merchant may visualize an actual effectiveness of a tailored marketing campaign (i.e., an actual effectiveness because the merchant may only be charged for accepted offers).

Returning now to FIG. 4, as discussed above, an item and/or CRV may be ranked or re-ranked based upon one or more business rules (step 404). For example, in various embodiments, an item and/or CRV may be re-ranked in response to a holiday, in response to a particular time of day, in response to the consumer traveling, in response to an item being associated with a merchant who is some distance away and/or near to from the consumer's location, in response to a consumer indicating a preference to receive an item and/or not to receive the item (e.g., a consumer giving an item a "thumbs up" and/or "thumbs down"), and/or the like.

More particularly, in various embodiments, and for purposes of illustration, an item and/or CRV may be up-ranked or down-ranked (i.e., moved up or down in a list and/or increased or decreased in value) based upon one or more of the foregoing criteria. For instance, an item related to a holiday (e.g., a Halloween decoration) may be up-ranked near in time to the holiday (e.g., the Halloween holiday) and/or down-ranked in response to the holiday not being near. Similarly, an item related to dining (e.g., a dining offer at a restaurant, the restaurant itself, etc.) may be up-ranked around breakfast, lunch, and/or dinner time, and/or down-ranked at other times of day. Further, an item related to an activity or product that is not typically associated with travel (e.g., home improvement) may be up-ranked if a consumer is located in a living location and/or down-ranked if a consumer is on travel or located away from a living zip code. Further still, an item may be up-ranked and/or down-ranked based upon consumer feedback (e.g., a consumer may give a thumbs up and/or thumbs down, for instance, which may affect the ranking of an item and/or CRV).

In addition, an item associated with a merchant located a certain distance from a consumer's living location and/or a consumer location (as described herein) may be up-ranked if the consumer location and/or living location is within a certain distance of the merchant location and/or down-ranked if the consumer location or living location is not within a certain distance of the merchant location. For example, an item associated with a merchant located a first distance from a consumer location (e.g., one-half mile) may receive a first up-ranking, while an item associated with a merchant located a second distance from a consumer location (e.g., two miles) may receive a second, lesser, up-ranking, and an item associated with a merchant located a third distance from a consumer location (e.g., fifteen miles) may receive a third, still lesser, up-ranking, and so on.

With reference now to FIGS. 10A-10E, a consumer may receive information related to a recommended item (e.g., a tailored offer, information associated with a merchant, etc.) via, for example, a web client 112. For instance, with reference to FIG. 10A, a consumer, e.g., "Natasha," may access her web client 112 to view one or more tailored offers (e.g., for offers related to merchants such as Merchant A, Merchant B, Merchant C, and/or the like). These offers may be tailored to a consumer (e.g., Natasha, in this example) as a result of one or more of the processes described herein.

Figure 10B:
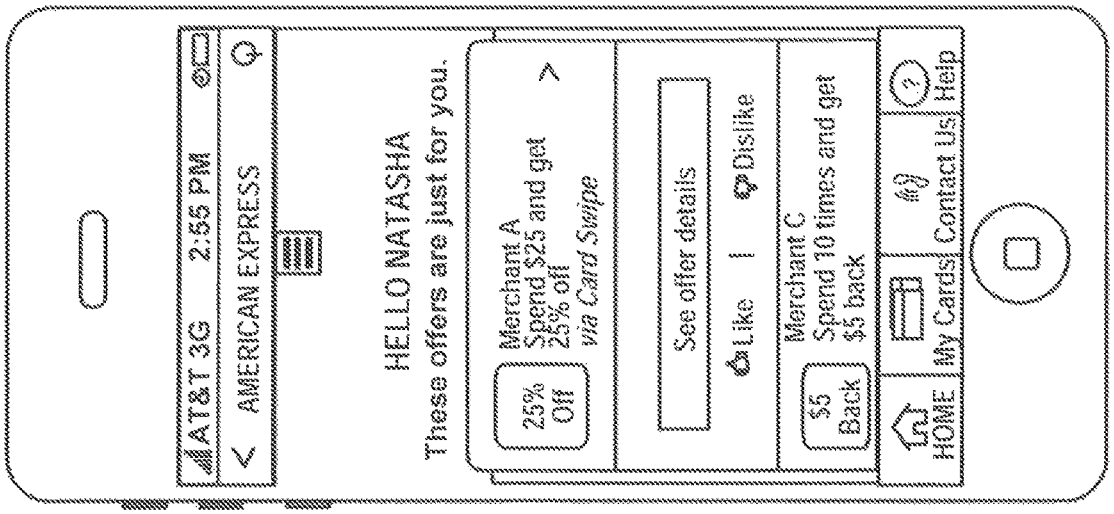
FIG. 10B shows a screenshot depicting an interface wherein a consumer may review details associated with one or more offers, in accordance with various embodiments.
Figure 10A:
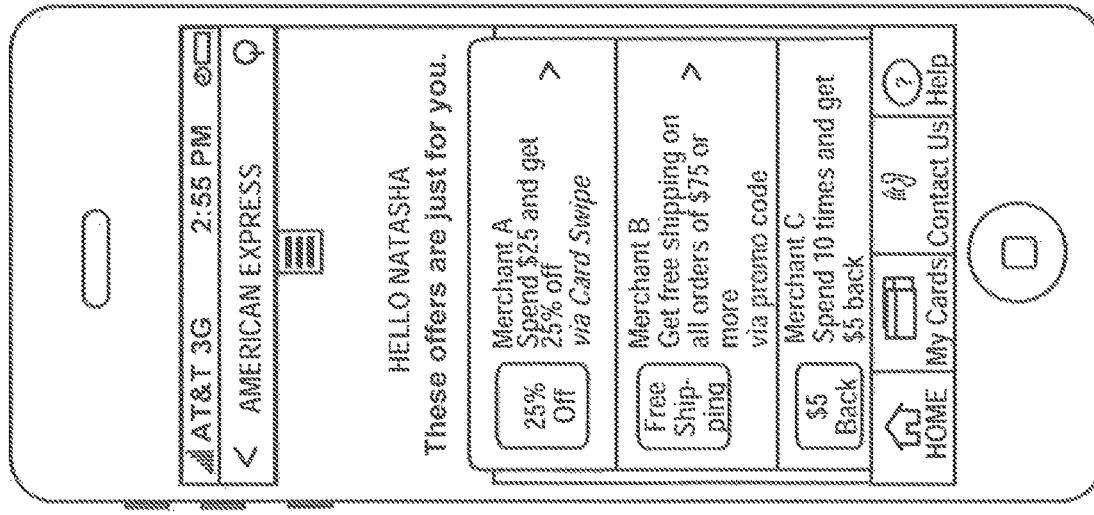
FIG. 10A shows a screenshot depicting an interface wherein a consumer may review one or more offers, in accordance with various embodiments.

With reference to FIG. 10B, a consumer may select a particular item to review details related to the item. For example, Natasha may select an offer related to the merchant TARGET to review details related to the offer. In various embodiments, a consumer (e.g., Natasha) may "Like" or "Dislike" an item, such as an offer and/or a merchant, (as described herein), which may cause the item and/or other items related to the merchant to be re-ranked or down-ranked.

Figure 10D:
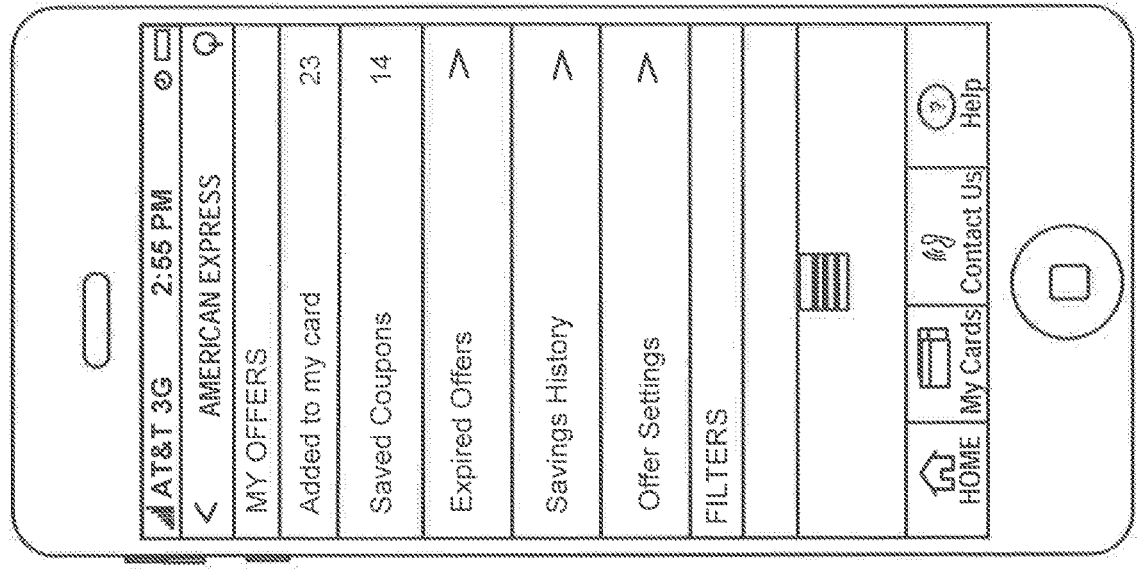
FIG. 10D shows a screenshot depicting an interface wherein a consumer may review offers and filter based upon one or more filtering criteria, in accordance with various embodiments.
Figure 10C:
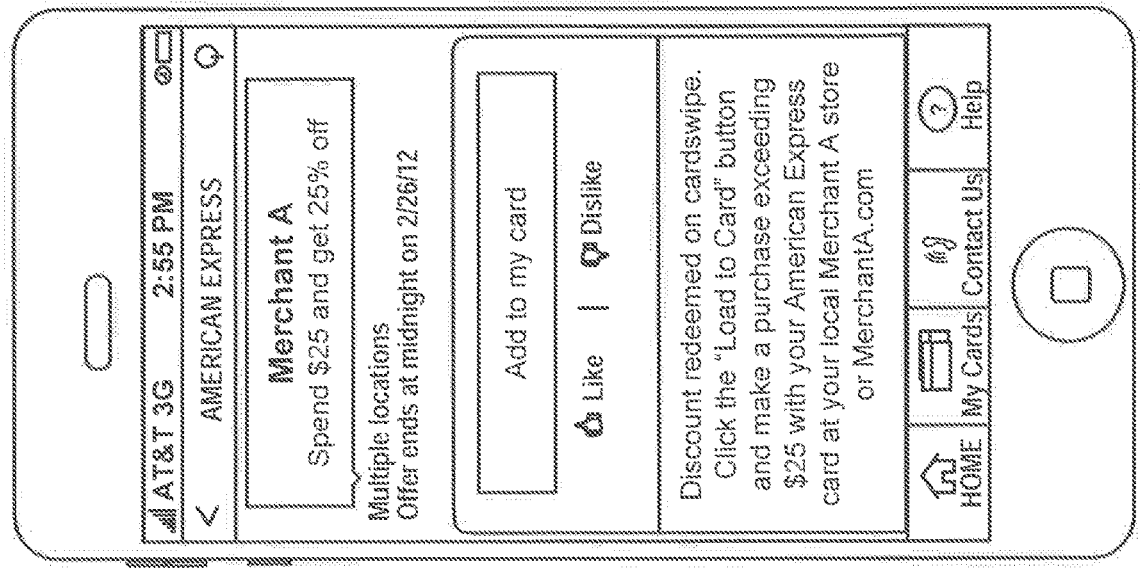
FIG. 10C shows a screenshot depicting an interface wherein a consumer may add one or more offers to a transaction account, in accordance with various embodiments.

Having reviewed an offer, a consumer may, as shown with reference to FIG. 10C, select an option to add the item to a transaction instrument or transaction account associated with the user. For instance, a consumer may select an option, as shown, labeled "Add to my Card." Selection of such an option may associate or "load" an item (e.g., an offer) directly to a consumer's transaction account. Thus, a selected item may be couponlessly associated with a consumer's transaction account. A consumer may redeem such an offer (a "loaded offer") without using a coupon. For example, a consumer may make a purchase associated with a loaded offer (e.g., a purchase at Merchant A, for example), and the consumer's transaction account may be automatically credited (e.g., with a rebate) based upon the loaded offer. Thus, a consumer may quickly and effortlessly redeem loaded offers.

Figure 10E:
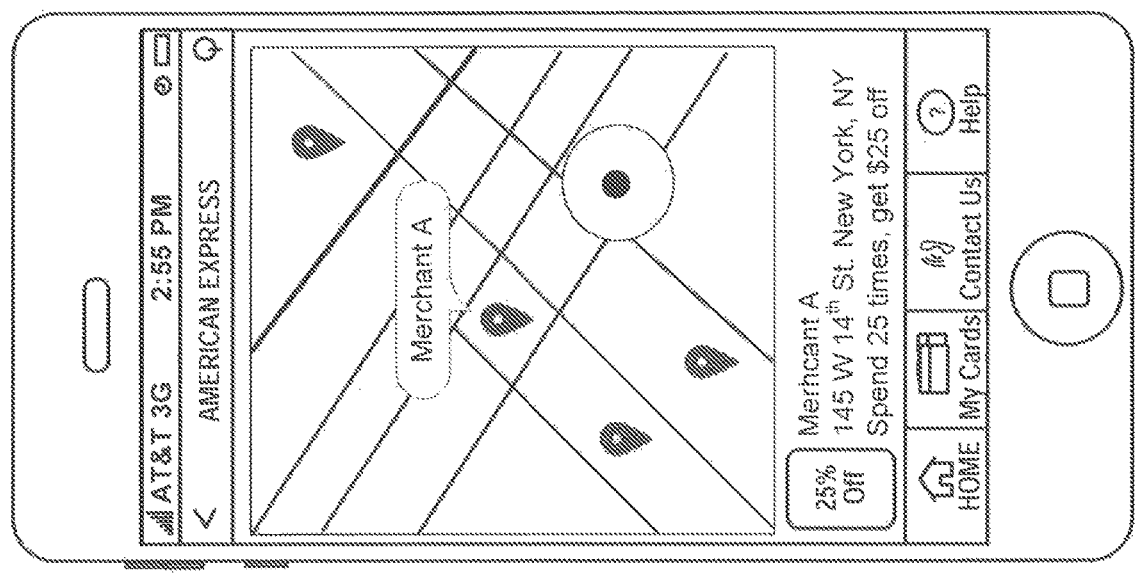
FIG. 10E shows a screenshot depicting an interface wherein a consumer may review the locations associated with one or more offers via a map, in accordance with various embodiments.

In addition, in various embodiments, as shown with reference to FIG. 10D, a consumer may review a plurality of offers associated with a transaction account, saved coupons or offers, expired offers, a savings history, offer settings, and/or the like. In addition, in various embodiments, a consumer may filter one or more tailored items based upon one or more criteria (e.g., offers deemed special offers, a location associated with offers, and/or the like). For instance, as illustrated in FIG. 10E, a consumer may select an option to filter offers by location, in response to which, a consumer's web client 112 may display a map showing a consumer location and/or one or more locations associated with one or more tailored items. For instance, in various embodiments, a web client 112 may display a consumer location and a location of a plurality of merchants associated with tailored offers and/or a location of one or more recommended or tailored merchants themselves. So, in various embodiments, a consumer may navigate to a location associated with a tailored item, such as an offer and/or merchant, according to its location.

Thus, as described above, one or more items may be tailored to a consumer based upon a collaborative filtering process. For example, in various embodiments, and as discussed, offers and/or merchants, to name a few items, may be tailored to a consumer.

Now, although systems and methods for tailoring a variety of items are described in detail above, for purposes of illustration, more specialized processes for tailoring one or more restaurants are described herein. In addition, although the processes set forth herein are described with respect to restaurants, the processes may apply, with certain variations, to other types of items as well, e.g., other merchants, offers, etc.

Figure 12:
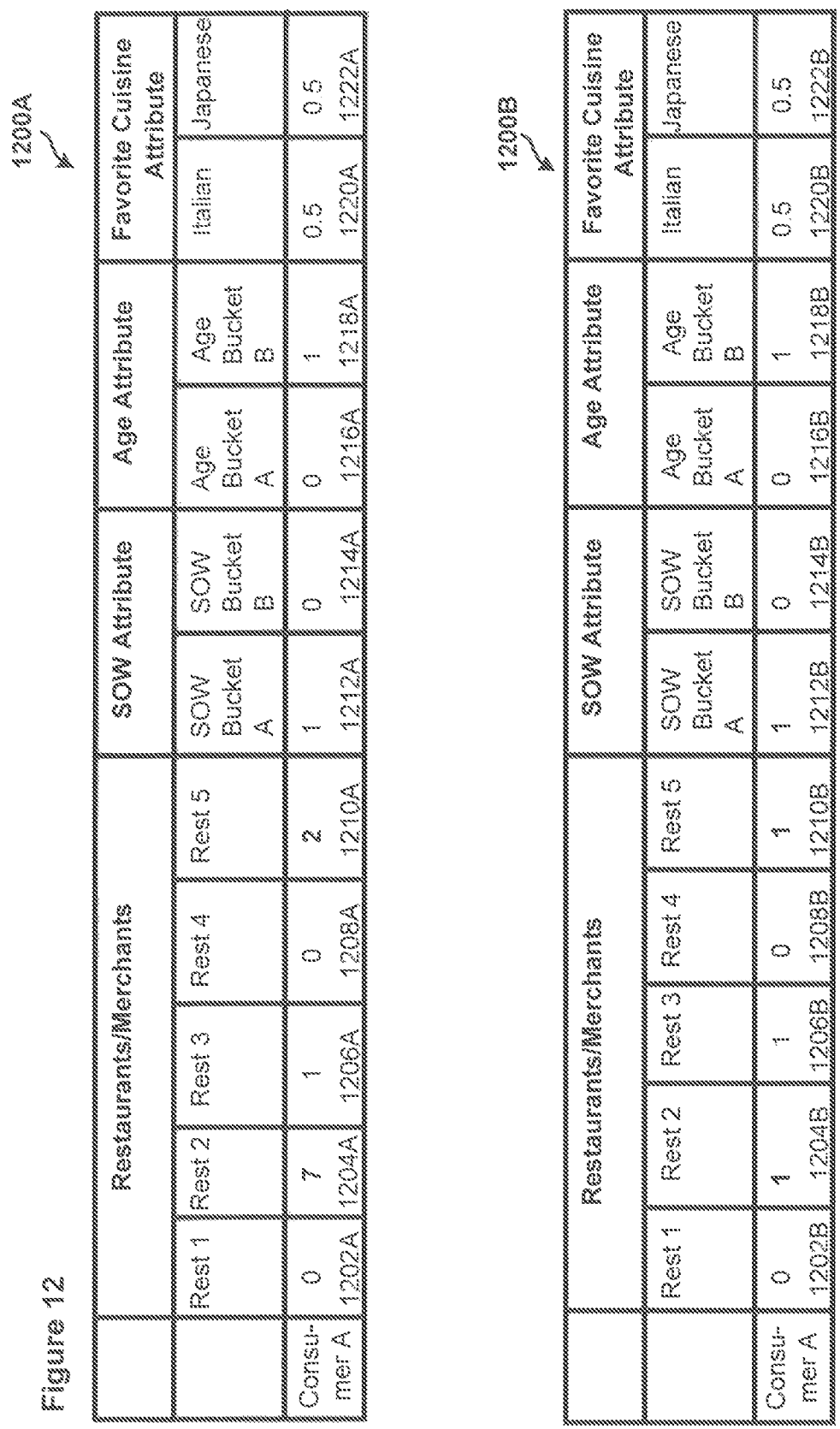
FIG. 12 shows exemplary item matrices associated with a restaurant consumer, in accordance with various embodiments.

With reference to FIG. 12, a process for tailoring a recommendation for an item (e.g., a merchant such as a restaurant) to a consumer may be based upon, as described herein, an item matrix 1200A. As shown, item matrix 1200A may comprise one or more coefficients, each of which may be based upon a relationship between a consumer (e.g., Consumer A) and a particular item (e.g., one of a plurality of restaurants, such as Rest 1-Rest 5, one of a particular share of wallet attributes, such as SOW Bucket A and SOW Bucket B, one of a plurality of age attributes, such as Age Bucket A and Age Bucket B, a gender, one of a plurality of favorite cuisine attributes, such as Italian and Japanese, and/or the like). As described above, a relationship between a consumer and a particular item may be determined based upon a consumer profile, a transaction history associated with a consumer, social data (e.g., data associated with a social media channel, such as FOURSQUARE, FACEBOOK, TWITTER, and/or the like), demographic data, clickstream data, consumer feedback data, and/or the like. While the examples below discuss restaurants, it should be understood that system 100 may be capable of recommending any suitable item based on the process described herein.

With continuing reference to FIG. 12, a coefficient 1202A-1210A may, as discussed herein, be based upon a ROC between a restaurant (e.g., Rest 1-Rest 5) and a consumer (e.g., Consumer A). Thus, as shown by item matrix 1200A, a consumer such as Consumer A may have zero ROCs with a restaurant, Rest 1, 7 ROCs with a restaurant, Rest 2, and so on. Further, as depicted, coefficient 1212A and/or 1214A may be based upon a share of wallet attribute associated with a consumer. Likewise, coefficient 1216A and/or 1218A may be associated with an age attribute of a consumer, while in various embodiments, coefficient 1220A and/or 1222A may be associated with a favorite cuisine attribute of a consumer. With respect to each of these attributes, a share of wallet (as discussed above) attribute may comprise a variable related to and/or describing a consumer's use or utilization of one or more transaction instruments. Further, an age attribute may comprise an age or age group of a consumer, and a favorite cuisine attribute may comprise, as shown, a type of cuisine associated with a consumer (as determined, for example, from the consumer's transaction history, consumer profile, and/or the like).

In various embodiments, a coefficient may, as described above, comprise a total value associated with a particular item. For example, as illustrated in FIG. 12A, a coefficient such as coefficient 1204A may comprise a value greater than one, which may indicate, for example, a total number of items or instances of an item associated with a consumer. Thus, with respect to coefficient 1204A, this coefficient may indicate that a consumer has visited and/or purchased from a restaurant, Rest 2, a total of seven times. Moreover, in various embodiments, a coefficient having a value greater than one may be capped or truncated to a value equal to or less than one. For example, as illustrated in FIG. 12B, a coefficient 1204B and/or 1206B may be truncated to a value of one.

In various embodiments, a coefficient may, as described above, comprise a binary, or positive or negative, value associated with an item. For instance, a coefficient such as coefficient 1214A and/or 1216A may comprise a zero value, which may simply indicate that a consumer is not associated with a SOW attribute and/or an age attribute, respectively. Likewise, coefficient 1212A and/or 1218A may comprise a value of one, which may indicate that the consumer is associated with a particular SOW attribute and/or a particular age attribute, respectively.

Further, in various embodiments, a coefficient may comprise a non-whole number or a decimal fraction, e.g., 0.5, which may indicate that a consumer is associated with a particular item (e.g., as shown, Italian cuisine, Japanese cuisine), but that such an attribute is considered less indicative of a consumer's dining preferences than, for example, a ROC of a consumer, a share of wallet of a consumer, and/or an age of a consumer. A decimal fraction may also indicate, as discussed herein, that a coefficient has been adjusted by a weighting factor. A coefficient may also comprise a non-whole or decimal fraction where, for example, it is desirable to more precisely measure a consumer's relationship to an item (greater values designating, for example, greater correlation between the consumer and the item).

With further regard to each item, as shown by item matrix 1200A, certain items (e.g., SOW Attributes, Age Attributes, and/or the like) may be grouped or divided into "buckets." In various embodiments, a bucket may simply refer to a group or range. Thus, a SOW bucket may comprise a range of shares of wallet. Similarly, an age bucket may simply refer to a group or range of ages.

Thus, in general terms, a relationship of a consumer to a variety of items may be captured as part of item matrix 1200A and/or 1200B. Further, as described above, an item to item similarity matrix may be generated based, for example, upon item matrix 1200A and/or 1200B.

For example, as illustrated in FIG. 13, and as described above, an item to item similarity matrix 1300A may be generated. Matrix 1300A may, in various embodiments, identify a similarity between a first item and a second item. For example, matrix 1300A may show that a gender item of male (M) is most similar to a merchant, Merch 45, second most similar to a merchant, Merch 12, third most similar to a share of wallet, SOW Bucket A, and so on.

An item to item similarity matrix 1300A may be generated, as discussed above with reference to FIGS. 4A and 4B, based upon a comparison of a plurality of coefficients comprising an item matrix (e.g., item matrices 1200A and/or 1200B). For example, returning briefly to FIG. 4B for purposes of explanation, an item to item similarity matrix 400B may be generated, as discussed, such that matrix 400B includes one or more item to item similarity values (e.g., values 408, 410, and 412). To illustrate, each of the coefficients comprising a matrix 400B may be compared, and a matrix similar to matrix 1300A generated based upon the comparison. Such a comparison would yield, with respect to matrix 400B, a matrix identifying SE2 as the first most similar item to the item SE1 and SE3 as the second most similar to the item SE1. Thus, an item to item similarity matrix 1300A may be organized or reorganized according to a coefficient or item to item similarity value such that matrix 1300A lists each item in descending or ascending order of similarity to a particular other item.

With continuing reference to FIG. 13, in various embodiments, any bucketed or grouped items (e.g., SOW Bucket A, Age Bucket D, etc.) may be removed from an item to item similarity matrix 1300A, where for example, it is desirable to determine a similarity between non-bucketed items (e.g., merchants or restaurants). Moreover, bucketed items that cannot be recommended to a consumer or which are not desirably recommended to a consumer (such as age) may be removed from an item to item similarity matrix 1300A.

An item to item similarity matrix 1300B is shown in which each bucketed item has been removed. Where an item (e.g., Merch 67) is located adjacent to a one or more bucketed items (e.g., SOW Bucket A) which are eliminated, the adjacent item may be moved within matrix 1300B into the location of the leftmost eliminated bucketed item (e.g., as described with reference to matrix 1300B, Merch 67 may move into the position of SOW Bucket A as the third most similar item to the item Gender (M)).

With reference now to FIG. 14, an item to item similarity matrix 1400A may, in addition to identifying a first most similar item, a second most similar item, a third most similar item, etc., also identify or show an item to item similarity value, as described above. For example, as shown by matrix 1400A, a Restaurant 5 may be first most similar to a Restaurant 1, and these restaurants may share an item to item similarity value of four. Likewise, a Restaurant 6 may be second most similar to a Restaurant 5, and these restaurants may share an item to item similarity value of two.

Further, in various embodiments, an item to item similarity value may be adjusted by a weight or weighting factor. In general, a weighting factor may be based upon a regression analysis of CRVs, which may be calculated as discussed herein.

So, for instance, in various embodiments, a CRV may be calculated according to the following formula: $\beta 1*Z1+\beta 2*Z2+\beta 3*Z3+\beta 4*Z4$, where each Z value represents an item to item similarity value, and each $\beta$ value represents an association of an item with a particular consumer (i.e., each $\beta$ value may represent a coefficient in an item matrix).

More particularly, and for example, a CRV "Z1" as shown in FIG. 14, may be calculated for a consumer (e.g., Consumer A) in connection with a particular restaurant (e.g., Restaurant 5) by multiplying each coefficient representing a restaurant visited by the consumer, as indicated by the coefficients in item matrix 1400B, by the item to item similarity value of each of these restaurants to Restaurant 5. To illustrate, a CRV Z1 may be calculated according to the formula provided above as follows, where each value is followed, for the purpose of explanation, by a parenthetical to aid understanding:

Z1=1 (Consumer A visited Rest 1)*4 (the item to item similarity value of Rest 1 to Rest 5)+0 (Consumer A did not visit Rest 2)*0 (the item to item similarity value of Rest 2 to Rest 5)+0 (Consumer A did not visit Rest 3)*1 (the item to item similarity value of Rest 3 to Rest 5)+0 (Consumer A did not visit Rest 4)*2 (the item to item similarity value of Rest 4 to Rest 5)=4.

Similarly, CRVs, Z2, Z3, and Z4 may be calculated for a consumer (e.g., Consumer A) in connection with each of a variety of other items. For example, CRVs may be calculated for a SOW attribute, an age attribute, and/or a favorite cuisine attribute. As discussed above, this may be accomplished by multiplying each coefficient representing an item attribute associated with a consumer by the item to item similarity value of each of these item attributes to a restaurant (e.g., as above, Rest 5). Thus, for example, Z2, Z3, and Z4 may be calculated as follows for a variety of other items:

Z2=1(Consumer *A* is associated with *SOW A*)*4 (the item to item similarity of *SOW A* to Rest 5)+0 (Consumer *A* is not associated with *SOW B*)*1 (the item to item similarity of *SOW B* to Rest 5)=4

Z3=0*2+1*0=0

Z4=0*1+0.5*4=2

Thus, a variety of CRVs may be calculated for a consumer with respect to a particular restaurant based upon an item to item similarity between the restaurant and a variety of other items (e.g., other restaurants, other item attributes such as SOW, age, favorite cuisine, etc.)

In various embodiments, having calculated a variety of CRVs, each corresponding to a consumer in connection with an item, a regression matrix may be generated according to the following equation: Z1+Z2+Z3+Z4=Y, where the variable Y may take a value of "1" in the event that a consumer visited a restaurant and/or was associated with an item during a particular period of time. Thus, a first row of a regression matrix may, with the Z values derived above, be generated as follows: [Z1 Z2 Z3 Z4] [Y], or [4 4 0 2] [1]. Here, Y may take a value of "1," because, for example, Consumer A visited Rest 5 during a particular period of time. Further, in various embodiments, a dataset of consumer transactions may be broken out or divided into two subsets based upon a time period during which each transaction in the dataset occurred. For example, for twelve months of transaction data, transactions occurring during a first period (e.g., the first nine months of the twelve month period) may be grouped as "post-period" data, while transactions occurring during a second period (e.g., the last three months of the twelve month period) may be grouped as "pre-period" data. Thus, regression matrices may be formulated for a variety of periods (e.g., pre and/or post-periods).

In various embodiments, a regression matrix may be expanded according to the process discussed above by calculating CRVs for a consumer (e.g., Consumer A) in connection with a plurality of other restaurants, e.g., Rest 6, Rest 7, Rest 8, etc. Further, in various embodiments, a regression matrix may serve as the basis for a regression analysis, such as a logistic regression analysis, which may yield a weighting to be applied to one or more groups of items, e.g., groups Z1, Z2, Z3, Z4, etc.

Figure 15:
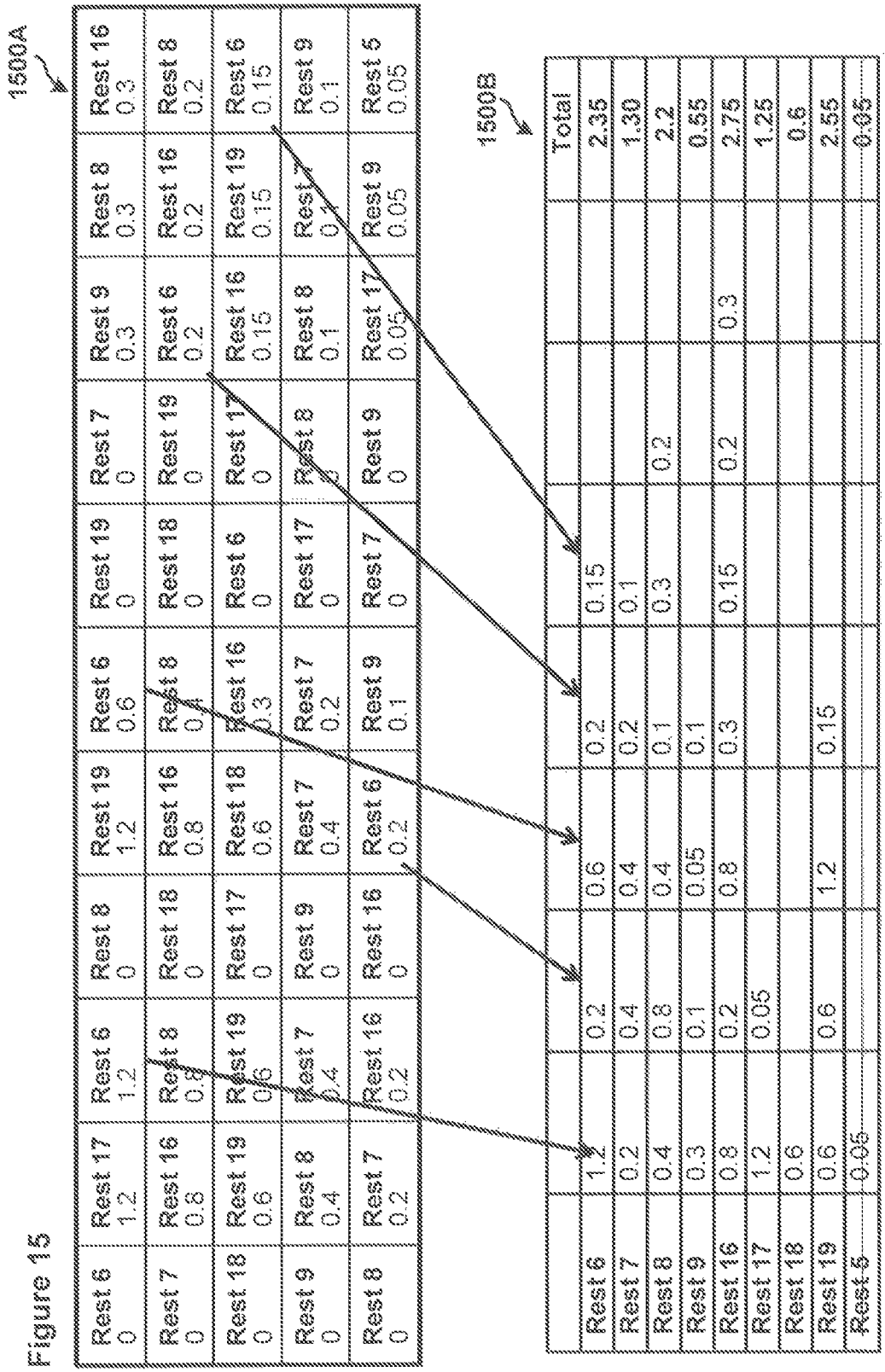
FIG. 15 shows an exemplary CRV matrix and an exemplary total CRV matrix, in accordance with various embodiments.

With reference to FIG. 15, a CRV matrix 1500A may, as shown, be generated for a consumer. CRV matrix 1500A may comprise one or more weighted (or unweighted) CRVs for a consumer. For example, with respect to the CRVs Z1, Z2, Z3, and Z4 calculated above for Consumer A and relating to Rest 5, a CRV matrix may resemble the following matrix [4 4 0 2]. Likewise, in various embodiments, a CRV matrix for each of the CRVs calculated above may also resemble [(4*w1) (4*w2) (0*w3) (2*w4)], where w1-w4 are weighting factors calculated as described above. Similarly, in various embodiments, a CRV matrix may be calculated as discussed above based upon weighted item to item similarity values. Thus, a weighting factor may be applied variously.

With continuing reference to FIG. 15, a plurality of CRVs comprising CRV matrix 1500A may form the basis for a total CRV matrix 1500B. More particularly, in various embodiments, each CRV related to a restaurant for a consumer (e.g., as shown, Rest 6) may be used to generate total CRV matrix 1500B. Further, each of these CRVs may be summed or aggregated to obtain a total CRV, as shown in the rightmost column of matrix 1500B. A total CRV may represent, for each restaurant, an aggregate consumer relevance value associated with that restaurant for a particular consumer based upon, as described above, a variety of calculated CRVs for the customer to the restaurant.

With attention to FIG. 16, a plurality of total CRVs (or restaurants associated with total CRVs) may be ranked from greatest to least, least to greatest, etc. to form a table or list of restaurants 1600. List 1600 may rank a plurality of restaurants in order of relevance to a consumer. Thus, with respect to list 1600, a restaurant, Rest 16, may be most relevant to a consumer, a restaurant, Rest 19, may be second most relevant to a consumer, and so on. Further, in various embodiments, a plurality of restaurants may be ranked simply based upon a CRV associated with each.

Referring to FIG. 17, a reason or reason code may be determined for each restaurant in a ranked list 1700A of restaurants. A reason code may comprise a greatest or most significant CRV and/or restaurant contributing to a total CRV. For example, and with reference to CRV matrix 1700B, matrix 1700B may show that the most significant individual CRV contributing to the position of the restaurant, Rest 8, on ranked list 1700A of restaurants, is the CRV of Rest 8 to the restaurant, Rest 3 (with a CRV of 0.8). Likewise, matrix 1700B may show that the most significant individual CRV contributing to the position of the restaurant, Rest 6, on ranked list 1700A of restaurants, is the CRV of Rest 6 to the restaurant, Rest 3 (with a CRV of 1.2). Thus, a reason or reason code may simply comprise a restaurant and/or an item that most significantly contributed to a total CRV of another restaurant and/or item.

With reference to FIG. 18, a ranked list of restaurants 1800 may be organized as shown. In addition, ranked list of restaurants 1800 may include a reason or reason code as described above. Further, ranked list of restaurants 1800 may include a message 1802, 1804, and/or 1806 indicating a reason for adding a restaurant to ranked list 1800. Thus, as shown, message 1802 and/or 1804 may indicate that a restaurant was recommended because a consumer dined at a restaurant having an item to item similarity with the recommended or listed restaurant. As discussed above, the recommendation may be based upon a total CRV. Thus, in various embodiments, message 1802 and/or 1804 may be based upon a CRV that most significantly contributes to a restaurant's ranking. Similarly, as shown, message 1806 may indicate that a restaurant was added to ranked list 1800, because other consumers having an identity attribute in common with the consumer also dined at the restaurant. For example, although a variety of CRVs may contribute to a ranking, a CRV comprising an age attribute and/or a favorite cuisine attribute may be listed where, for example, that CRV most significantly contributed to the total CRV.

In various embodiments, and referring now to FIG. 19, a ranked list 1900 may be backfilled or adjusted based upon a list of restaurants previously visited by a consumer 1902 and/or a list of popular restaurants 1904. For example, one or more restaurants comprising ranked list 1900 may be removed based upon an indication that the consumer for whom ranked list 1900 is generated has already visited the restaurant (e.g., within a particular period of time, such as the last day, week, month, etc.) Similarly, in various embodiments, ranked list of restaurants 1900 may be supplemented by the addition of one or more restaurants on a list of popular restaurants 1904. For example, ranked list 1900 may be compared to list of popular restaurants 1904, and those restaurants appearing on list 1904 which do not appear on ranked list 1900 may be added to the ranked list. The results of these operations may be compiled as part of a final list 1906.

With further regard to list of popular restaurants 1904, such a list may be created based upon a normalized popularity score. In various embodiments, a normalized popularity score may be obtained as discussed with reference to FIGS. 20-23. With brief regard to these figures, although each figure refers to and is discussed in the context of a merchant (and/or a merchant id), in general, a normalized popularity score may be obtained for any item, including a merchant such as a restaurant and/or an offer.

Figure 20:
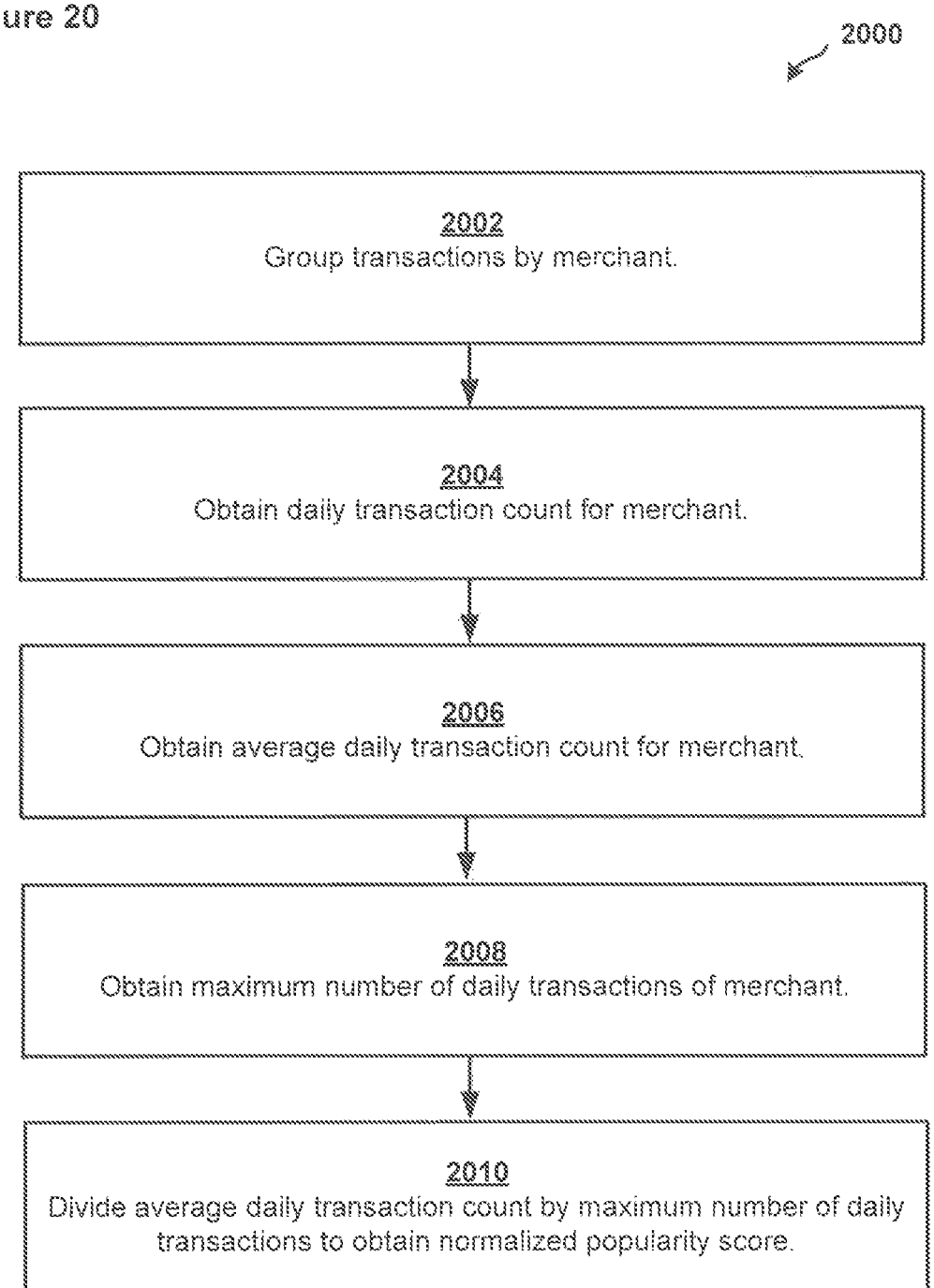
FIG. 20 shows a flowchart depicting an exemplary process for generating a normalized popularity score, in accordance with various embodiments.

Accordingly, with reference now to FIG. 20, a process 2000 for obtaining a normalized popularity score is shown. To obtain a normalized popularity score, a plurality of transactions may be grouped by merchant (step 2002). A table 2100A grouping a plurality of transactions by merchant is illustrated in FIG. 21. As indicated, a merchant having a merchant I. D. of, for example, 12312312311 may be associated with a plurality of transactions, each occurring during a particular time period, such as a particular day of a particular month during a particular year (e.g., Jan. 1, 2011). Each transaction may be associated with an amount, a customer id, a transaction time, and/or the like. Thus, in various embodiments, each transaction may represent a purchase by a consumer from the merchant. Further, as shown in table 2100B, the plurality of transactions occurring during a time period with a particular merchant may be counted or aggregated to obtain a periodic (e.g., daily, monthly, etc.) transaction count of a merchant (step 2004).

Having obtained a periodic transaction count, as shown in FIG. 22, an average periodic transaction count may be obtained by dividing the periodic transaction count by, for example and where the period during which transactions are aggregated is greater than a single day, the number of days in the period (step 2006). This process is shown in tables 2200A and 2200B. This process may be applied to other types of item data as well, as discussed elsewhere herein. For instance, a count may be calculated in association with social data, time and/or date information, consumer and/or merchant feedback, and the like.

Figure 23:
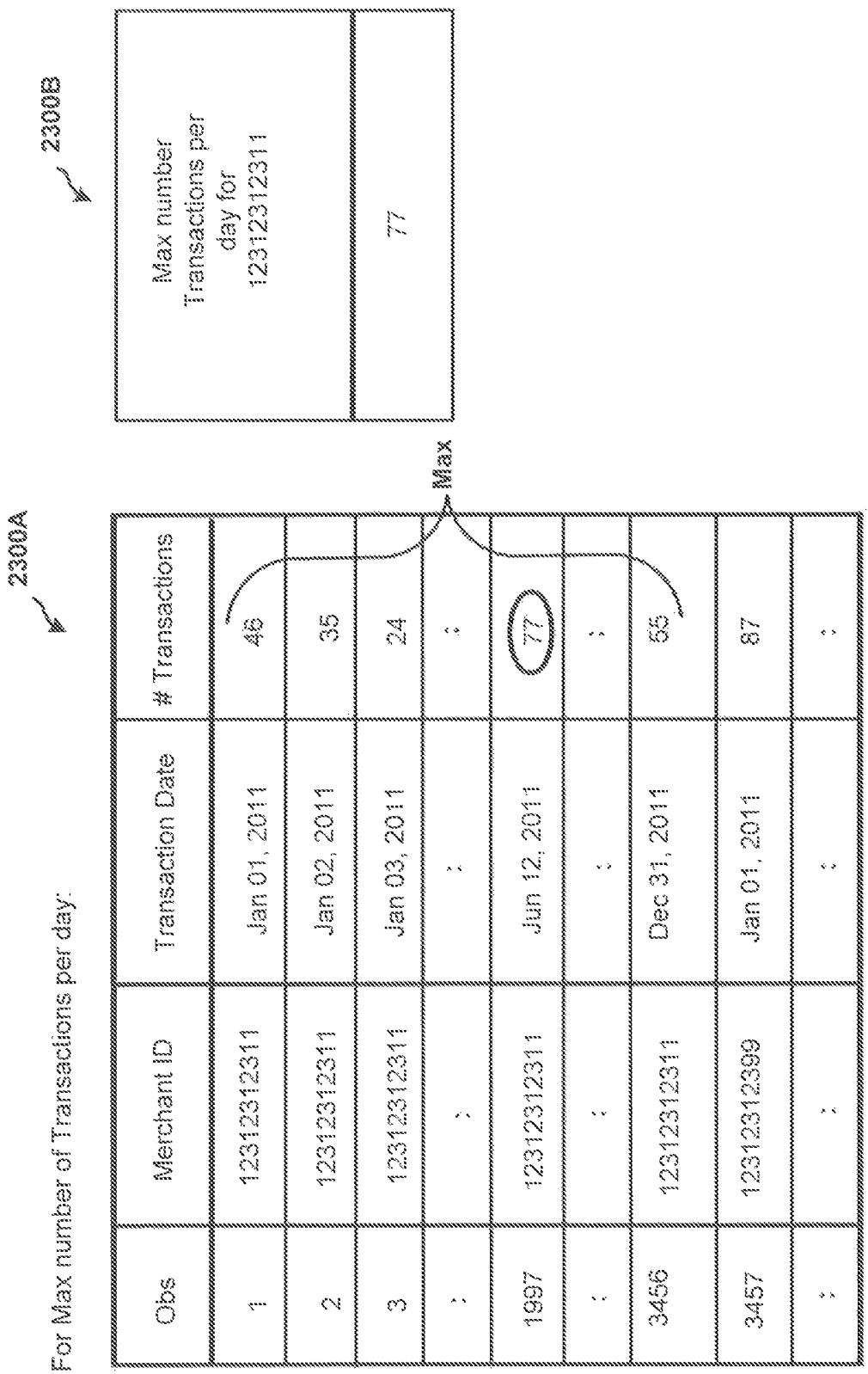
FIG. 23 shows an exemplary table depicting a maximum transaction count associated with a period of time, in accordance with various embodiments.

Continuing, a maximum number of transactions during a period with a given merchant may be determined (step 2008). For example, as illustrated in FIG. 23, a maximum number or count of daily transactions with the exemplary merchant 12312312311 may be determined for a specified time period (e.g., one month). This process is shown in tables 2300A and 2300B.

Now, having obtained both an average periodic transaction count associated with a merchant as well as a maximum transaction count associated with the same merchant, a normalized merchant popularity score may be obtained by taking the quotient of the two (step 2010). For example, with reference to FIGS. 22 and 23, the average daily transaction count associated with merchant 12312312311 is 33, while the maximum number of daily transactions during the specified period of time is 77. The normalized popularity score for the merchant 12312312311 during the specified period is therefore 33/77, or approximately 43%. A normalized popularity score may therefore represent a probability or likelihood that a merchant such as a restaurant, irrespective of its size relative to any other merchant, will on any given day reach its maximum capacity. Greater normalized popularity scores therefore represent greater popularity, in that merchants that are more likely to reach a maximum capacity are more popular with consumers.

Thus, in various embodiments, list of popular restaurants 1904 (and/or a list of popular merchants or items) may be generated by repeating process 2000 for each item of interest. In response to a score being determined for each item of interest, list of popular items 1904 may be generated by ranking or ordering each restaurant in the list according to its popularity score (e.g., with higher popularity scores being ranked higher in the list).

Further, as discussed above, a normalized popularity score may be used to construct list 1904 of popular restaurants, which may be used to backfill or adjust list of merchants 1900 output by a collaborative filtering or recommendation process. Moreover, in various embodiments, a normalized popularity score may, as discussed briefly above, normalize a capacity bias of a variety of merchants. More particularly, a normalized popularity score may adjust for an apparent bias in the popularity of one merchant over another merchant which may otherwise arise as a result of the greater capacity or size (e.g., a greater number of ROCs) of the one merchant over the other merchant.

In addition, in various embodiments, a normalized popularity score may not simply act as a supplement to ranked list of merchants 1900. On the contrary, a normalized popularity score may inform a ranked list of items, including a ranked list of restaurants and merchants. For example, ranked list 1900 may include a normalized popularity score, and a consumer may, as described herein, receive a normalized score in association with one or more recommended items.

In addition, in certain embodiments, a normalized popularity score may be used to supplement or substitute restaurants in ranked list 1900. For example, a consumer may indicate that he is interested in items outside his normal mode of shopping (e.g., items that system 100 (e.g., a recommender system or a system suitably configured to make recommendations) would not identify based upon the consumer's transaction history, etc.) In these circumstances, a consumer may receive one or more items associated with a normalized popularity score (e.g., a top ten most popular items). Similarly, a normalized popularity score may be used to recommend items to a consumer who has no transaction history and/or who is associated with data insufficient to make a recommendation, as described elsewhere herein.

Furthermore, in certain embodiments, a restaurant and/or a list of restaurants may be ranked based upon a channel through which a consumer receives an identifier (e.g., a name) associated with the one or more restaurants. For example, a consumer who receives a ranked list of restaurants via a mobile communication device may receive restaurant identifiers associated with restaurants that are within a certain distance of the location of the mobile communications device, while a consumer who receives a ranked list of restaurants from a stationary personal computer may receive offers based purely upon a CRV or total CRV, as described above. Further, in various embodiments, a restaurant in a list of restaurants may be up-ranked and/or down-ranked depending upon the relationship of the restaurant to an owner or proprietor of system 100. For instance, a restaurant may be up-ranked where the restaurant is a partner of the owner of system 100.

Figure 24B:
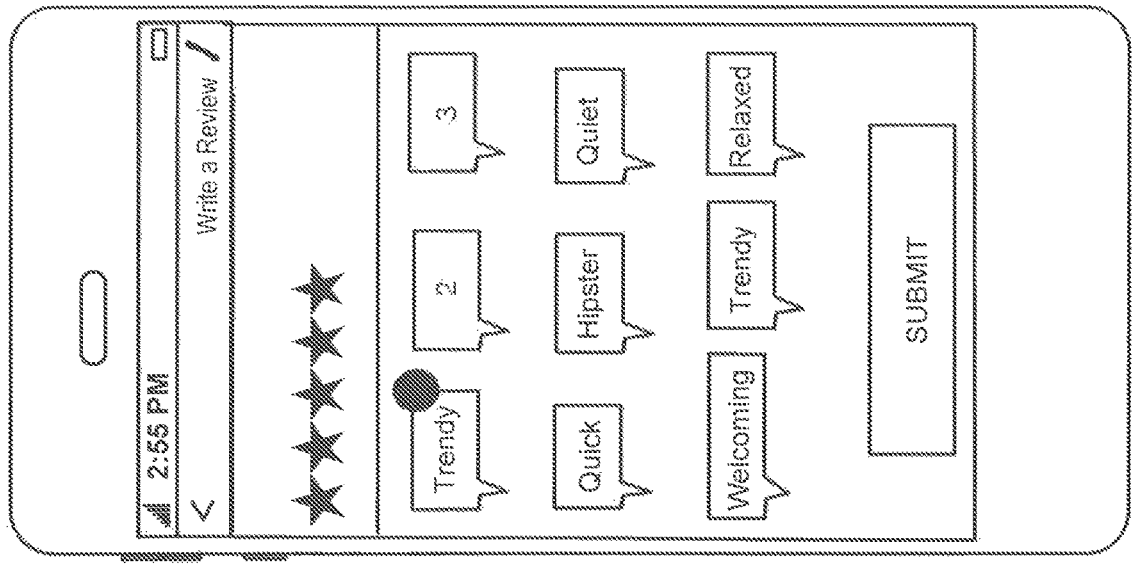
FIG. 24B shows a screenshot depicting an interface wherein a consumer may review a ranked restaurant, in accordance with various embodiments.
Figure 24A:
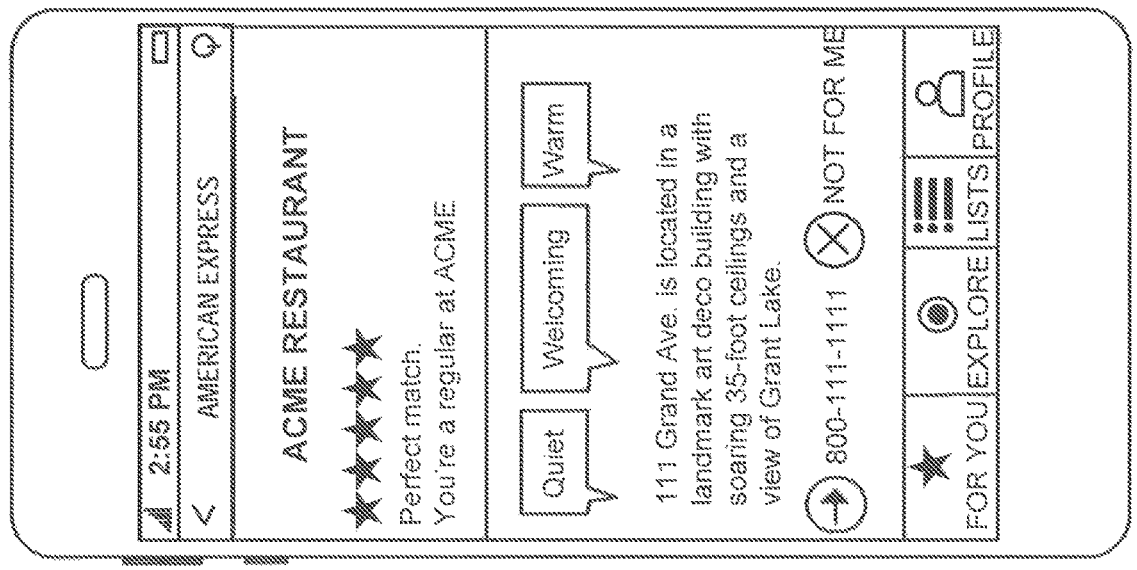
FIG. 24A shows a screenshot depicting an interface wherein a consumer may receive a ranked restaurant, in accordance with various embodiments.
Figure 24C:
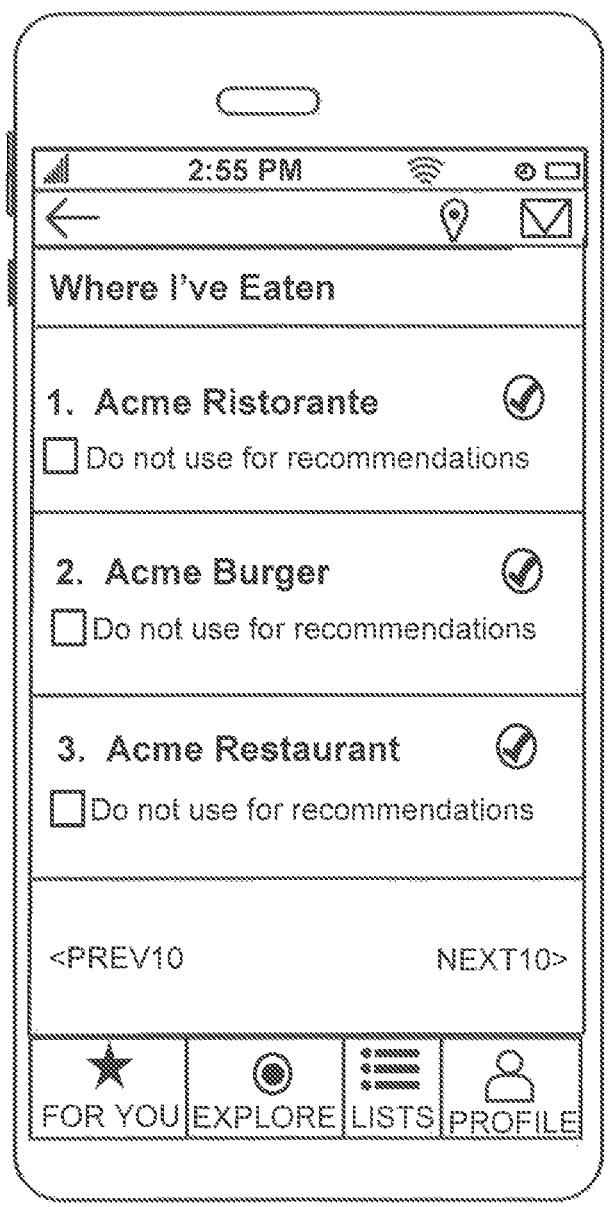
FIG. 24C shows a screenshot depicting an interface wherein a consumer may review a list of ranked restaurants, in accordance with various embodiments.

Referring now to FIGS. 24A-24C, a ranked list of restaurants and/or a ranked restaurant may be provided to a consumer in a variety of formats and via a variety of channels and/or web clients 112. For example, with special attention to FIG. 24A, a restaurant (e.g., ACME Restaurant) may be provided to a consumer via a mobile communication device with a description of the restaurant, a CRV associated with the restaurant (which may be expressed as a number of stars and/or via another rating or ranking scale), an address of the restaurant, and/or the like. A consumer may further obtain directions to a recommended restaurant, as discussed herein.

In addition, with reference to FIG. 24B, a consumer may describe or rate a restaurant the consumer has visited (e.g., as described in greater detail herein and as trendy, quick, etc.), request a restaurant fitting such a description, and/or review such a description associated with the restaurant. Further still, with reference to FIG. 24C, a consumer may receive a ranked list of restaurants (e.g., Acme Ristorante, Acme Burger, Acme Restaurant, etc.) in accordance with a ranked list, as described above. More particularly, in various embodiments, a consumer may receive a ranked list of restaurant identifiers (e.g., restaurant names) in an ascending order of relevance, where the order is based upon a CRV and/or total CRV associated with each restaurant.

Thus, as discussed above, system 100 may recommend a variety of items to a consumer based upon a variety of criteria. Moreover, although certain portions of the foregoing description rely upon specific items for purposes of illustration, any item may be recommended based upon the processes discussed above. Further, although the embodiments discussed above highlight a variety of exemplary items and item attributes, many other items may be used as part of the recommendation processes discussed above. Some of these items are discussed herein.

In various embodiments, an item may, as discussed above, comprise a preference of a consumer for another item. Thus, a preference may comprise a favorite or preferred cuisine of a consumer, a favorite or preferred merchant of a consumer, and/or any other favorite or preferred item of a consumer.

A preference may be determined, in various embodiments, based upon data associated with a consumer. More particularly, in various embodiments, a preference may be determined based upon an analysis of transaction data associated with a consumer. For instance, a preference may be inferred from transaction data associated with a consumer. That is, in various embodiments, system 100 may infer, based upon one or more transactions associated with a consumer that a consumer has an interest in a particular item, and, based upon this inference, system 100 may determine that the consumer has a preference for one or more items. Specifically, in various embodiments, system 100 may determine that a consumer has an interest in one or more types of cuisine, one or more merchants, and/or the like.

As discussed briefly above, the data upon which a preference is based may be variously determined. For instance, a preference may be based, in various embodiments, upon transaction data, which may include, for example, one or more industry codes (e.g., standard industry codes or SIC codes) associated with one or more transactions. Similarly, a preference may be based upon one or more groups of similar items (e.g., merchants), a mapping of third party data associated with one or more items to internal data (as discussed herein), a consumer profile (as discussed above), and/or the like. Further, as discussed herein, data such as transaction data, social data, time and/or date information, consumer and/or merchant feedback, and/or the like, may serve as a basis for determining a preference.

Thus, to illustrate, system 100 may determine that a consumer has a preference for a particular merchant based upon a transaction history of the consumer which shows that the consumer has one or more transactions with the particular merchant, one or more transactions with merchants in a same or similar industry group as the merchant, and/or the like. A similar process may be performed for other items, such as cuisine. And, in this way, system 100 may associate a consumer with a preference, which may act as an input to a collaborative filtering process as described above. That is, in various embodiments, a CRV may be calculated, as described above, based upon a preference of a consumer. Similarly, in various embodiments, a ranked list of items (e.g., merchants) may be ordered and/or reordered based upon a preference. For example, ranked list of merchants 1900 may be reordered or re-ranked based upon a consumer preference for a merchant. That is, a preferred or favorite merchant may be up-ranked, while other merchants may be down-ranked.

Figure 25:
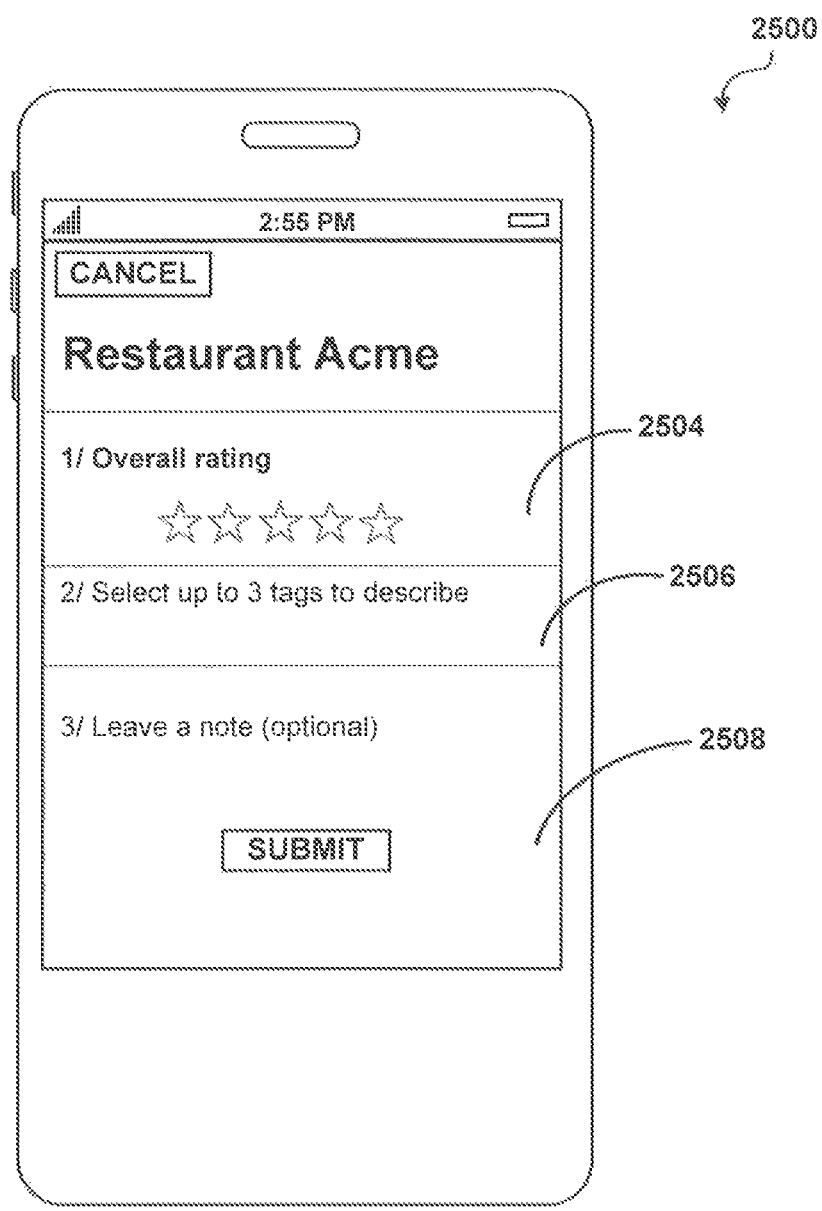
FIG. 25 shows a screenshot depicting an interface wherein a consumer may rate a merchant, in accordance with various embodiments.

Continuing, in accordance with various embodiments, and with reference now to FIG. 25, as discussed more briefly above, a consumer may receive a review of and/or review an item, such as a merchant or restaurant. For example, in operation, a consumer may be prompted to write a review based on the consumer's transaction activity at a merchant. In various embodiments, a consumer may be prompted shortly before and/or after completing (or partially completing) a transaction at a merchant. For example, a consumer may receive a delayed prompt that occurs after a transaction is authorized and/or completed, such as on a daily, weekly, monthly or other basis. A prompt may be delivered to a consumer via an interface 2500 displayed by a web client associated with the consumer. A prompt may take the form of an email, text message, a mobile application notification, and/or the like. Similarly, a consumer may make a request to review an item.

In various embodiments, system 100 may verify that a consumer is an account holder and/or that the consumer has initiated and/or completed at least one financial transaction associated with an item. Thus, a consumer review, which may be displayed variously as described herein, may include a notation that the consumer review is based on a verified transaction, which may enhance a credibility associated with the consumer review. A verified consumer review may further include a date of a financial transaction, and in the instance that a consumer has conducted multiple transactions with a merchant, the consumer may, in various embodiments, verify and include multiple transaction dates.

Figure 26:
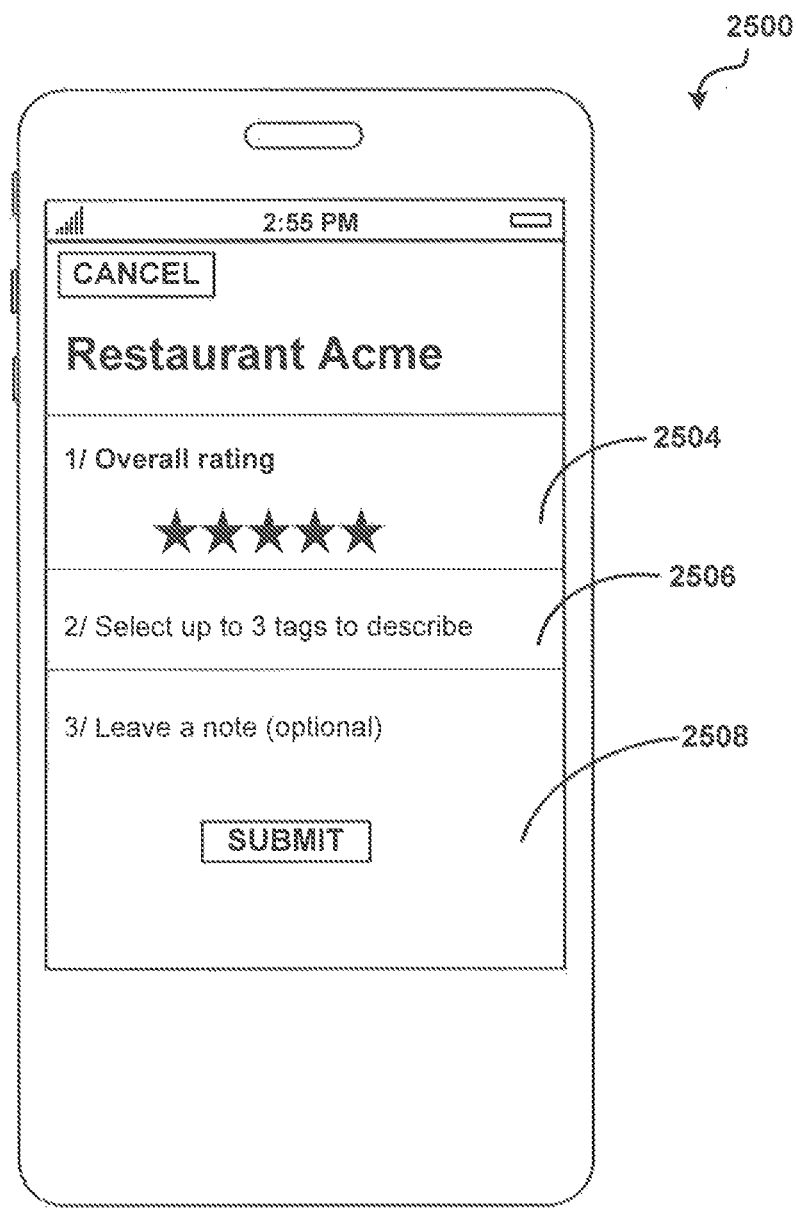
FIG. 26 shows a screenshot depicting an interface wherein a consumer has rated a merchant, in accordance with various embodiments.

In various embodiments, an interface 2500 may include a consumer rating component 2504, a word tagging component 2506, and/or a free-form text review component 2508. A rating component 2504 may comprise, as illustrated in FIG. 26, any type of rating component, such as a star rating component, a numerical rating component, etc., and a consumer may select a rating to associate with an item. As those of skill may appreciate, a rating may be assigned by a consumer based upon the consumer's experience with the item and/or the consumer's opinion of the item.

Figure 27:
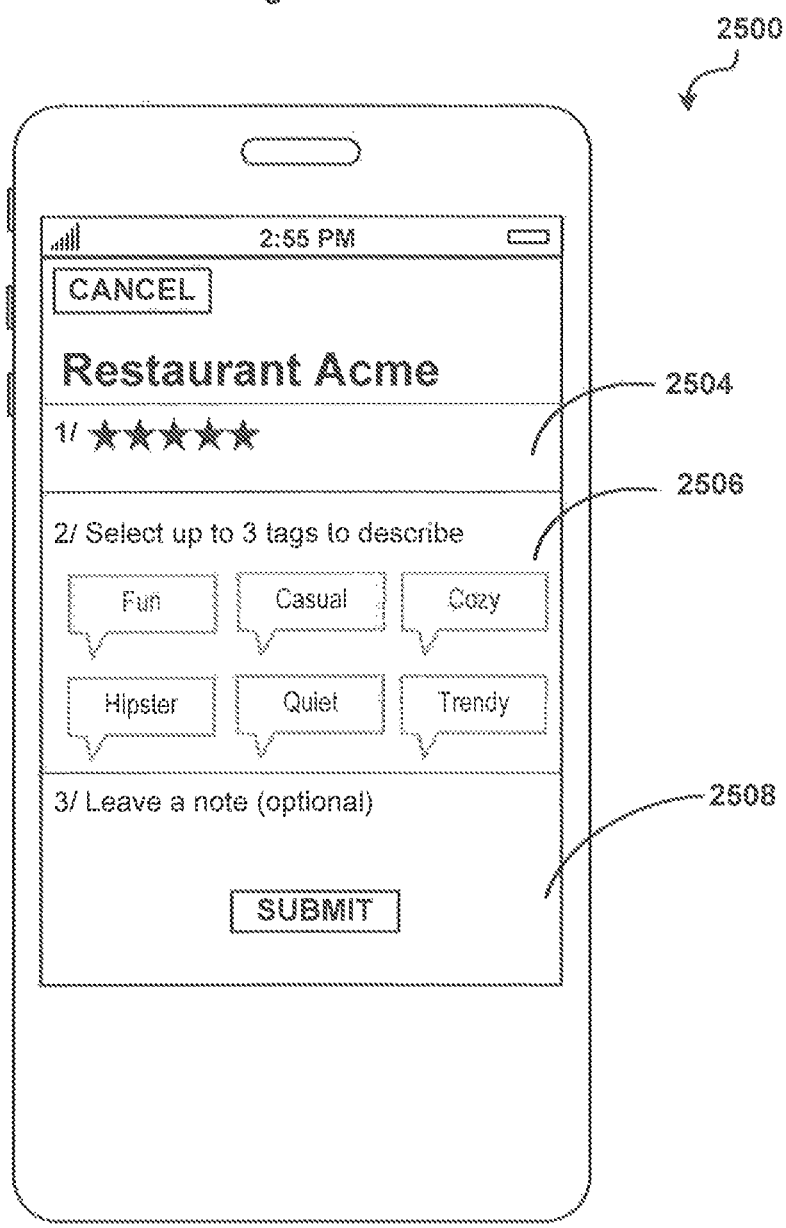
FIG. 27 shows a screenshot depicting an interface wherein a consumer may select a word tag associated with a merchant, in accordance with various embodiments.

With attention to FIGS. 27-30, a word tagging component 2506 may allow a consumer to quickly associate one or more words with an item. In various embodiments, word tagging component 2506 may comprise one or more groups and/or a dictionary of words and/or word tags. In various embodiments, and as shown in FIG. 27, one or more word tags may be presented to a consumer. Word tags may include a variety of words suitable to describe an item. Thus, where an item comprises a restaurant, exemplary word tags may include, as shown, "fun," "casual," "cozy," "hipster," "quiet," "trendy," "fresh," "damp," "roomy," "quaint," "famous," "small," and/or the like.

Certain word tags may be grouped into one or more categories and displayed in association with an item. More particularly, in various embodiments, one or more word tags may be displayed and/or grouped based on a category of an item and/or one or more item characteristics. For example, a word tag and/or a merchant may be categorized based upon a merchant type, such as whether the merchant is a restaurant, a retailer, an entertainment merchant, a service merchant, an online merchant, and/or the like. Similarly, a word tag and/or a merchant may be categorized based upon information associated with the merchant, including, for instance, a price range associated with the merchant, various merchant offerings, what type of cuisine the merchant serves (if the merchant is a restaurant), and/or the like. Thus, to illustrate, where an item comprises a Mexican restaurant, word tags that are commonly associated with one or more Mexican restaurants and/or the particular restaurant (e.g., "spicy," "hot," etc.) may be presented to the consumer via interface 2500, grouped in association with the restaurant, and/or displayed to the consumer in association with the restaurant.

Further, in various embodiments, one or more word tags presented to a consumer via interface 2500 may be adjusted and/or the order of certain word tags presented may be adjusted in response to a consumer's rating of an item (e.g., a star-rating, as described above). For example, more positive word tags may be presented via interface 2500 in response to a positive rating and/or a rating corresponding to a threshold (higher) level. Similarly, more negative word tags may be presented via interface 2500 in response to a negative rating and/or a rating corresponding to a threshold (lower) level. In addition, word tags may be presented to a consumer based upon one or more other parameters, such as, for example, one or more prior word tags associated with a restaurant, a price per person of a restaurant (e.g., an "expensive" or "fancy" tag may be presented in association with a high-end restaurant), and/or the like.

Further, in various embodiments, all of a group of word tags associated with an item may be presented to a consumer. Similarly, a truncated or limited portion of a group of word tags may be presented to a consumer. Likewise, a consumer may provide his or her own word tag. However, where a consumer provides a word tag, the word tag may be reviewed and approved before being allowed. A group of word tags may, in addition, be provided to a consumer, which includes both positive and negative word tags. Moreover, in various embodiments, one or more word tags may be prioritized based on a consumer's history of word tag selections. For example, a consumer may be presented with word tags most commonly selected by the consumer. A word tag may, in addition, be presented to a consumer based upon one or more merchant parameters. For example, a group of word tags may be associated with a category of restaurant (e.g., a 4-star category of restaurant), and a consumer who receives a 4-star restaurant recommendation, as described above, may be presented word tags from the 4-star restaurant group of word tags.

In various embodiments, a merchant may include a selected word tag in a group of word tags. A merchant may thus include certain test word tags, which, if selected by consumers, may indicate that the word tag is associated with or descriptive of the merchant. For instance, a merchant which wants to promote itself as a trendy restaurant may request that the word tag "trendy" be included within a word tag group (and/or at a certain rank or position within a word tag group), and this word tag may be presented to consumers who are customers of the merchant and/or consumers who receive the restaurant as part of a recommendation, as described more fully above. Thus, to illustrate, if the word tag "trendy" is often selected by a merchant's customers, the merchant may conclude that its customers view it as a trendy restaurant. Conversely, if the merchant's customers do not select the "trendy" word tag to describe the merchant, the merchant may conclude that its customers do not view it as a trendy place to eat.

Thus, as discussed above, a consumer may be presented with a variety of word tags, each of which may be associated with an item such as a restaurant. And, as also discussed above, a consumer may interact with interface 2500 in response to receiving a list of ranked restaurants, in response to a request by the consumer for a list of word tags associated with a restaurant, in response to a consumer entering a restaurant location, in response to a transaction with the restaurant, and/or the like.

Figure 28:
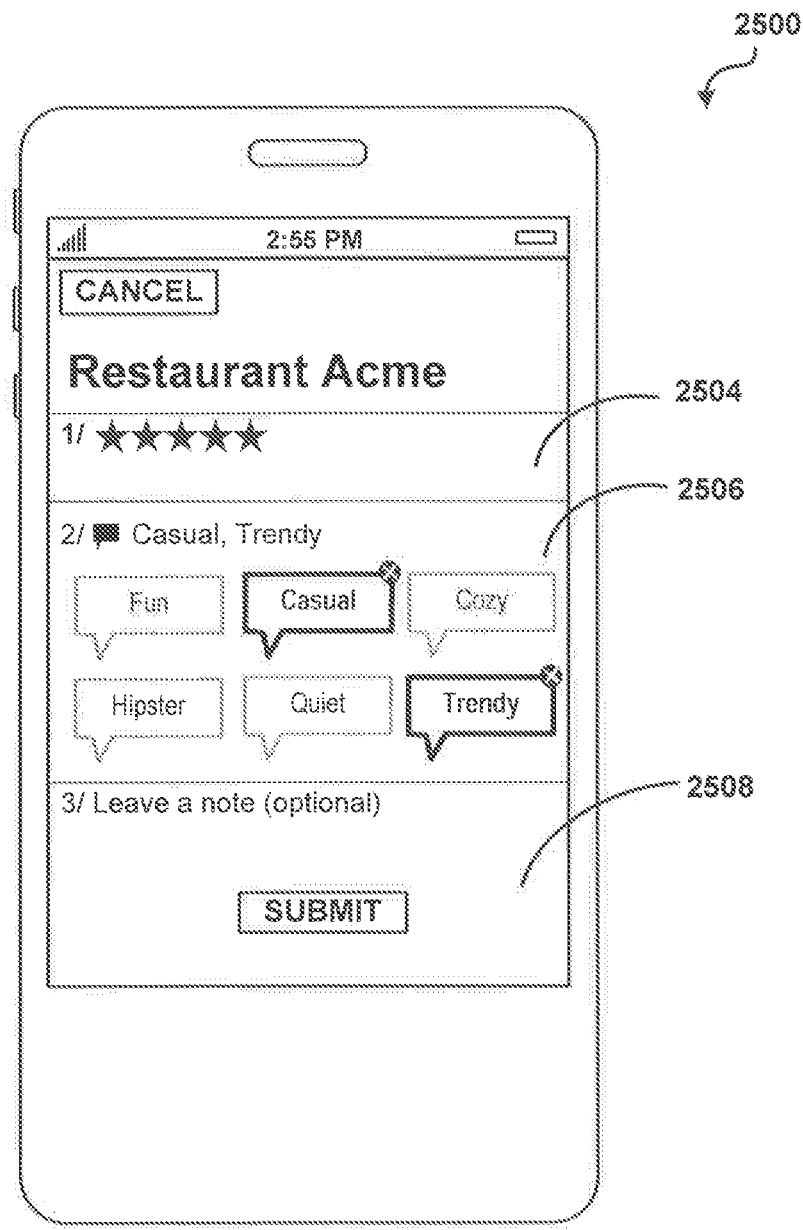
FIG. 28 shows a screenshot depicting an interface wherein a consumer has selected a word tag associated with a merchant, in accordance with various embodiments.
Figure 29:
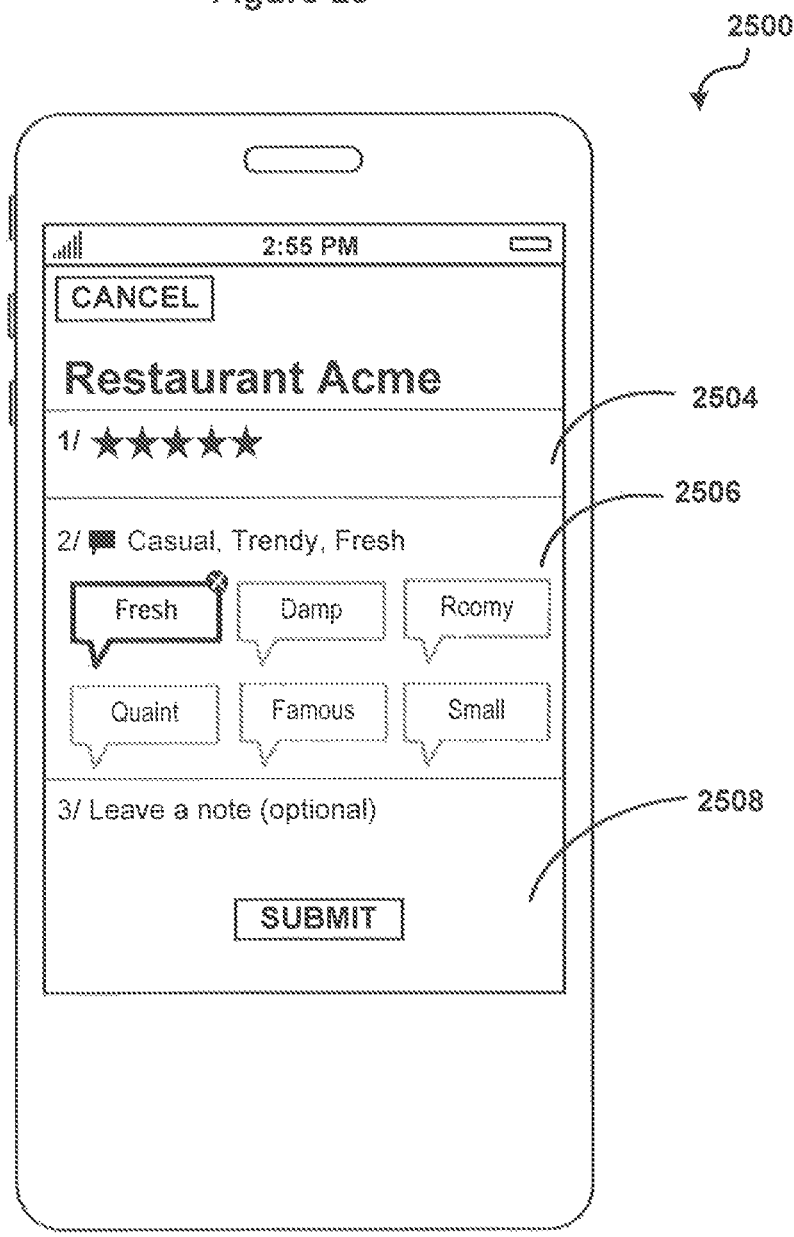
FIG. 29 shows a screenshot depicting an interface wherein a consumer has selected a word tag associated with a merchant, in accordance with various embodiments.
Figure 30:
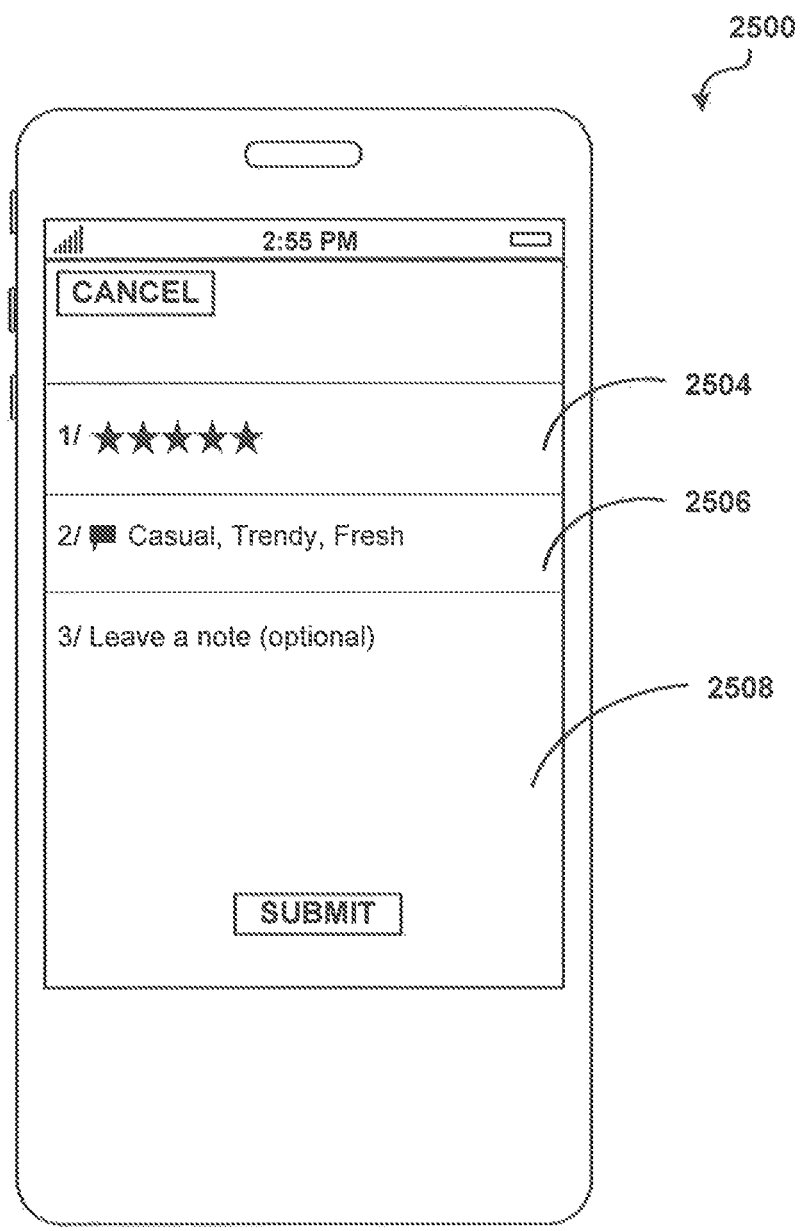
FIG. 30 shows a screenshot depicting an interface wherein a consumer has selected a word tag and a rating associated with a restaurant, in accordance with various embodiments.

Further, as particularly shown in FIGS. 28 and 30, a consumer may select one or more word tags to associate with an item (e.g., as illustrated in FIG. 28, a consumer has selected the "causal" tag and the "trendy" tag), and, as discussed, a consumer may select one or more word tags based upon the consumer's impression of an item, experience with the item, opinion of the item, and/or the like. Thus, where a consumer receives a restaurant identifier as part of a restaurant recommended by system 100, the consumer may simultaneously review one or more word tags which, as discussed above, are grouped with or associated with the restaurant and/or select one or more word tags which the consumer wishes to associate with the restaurant.

Figure 31:
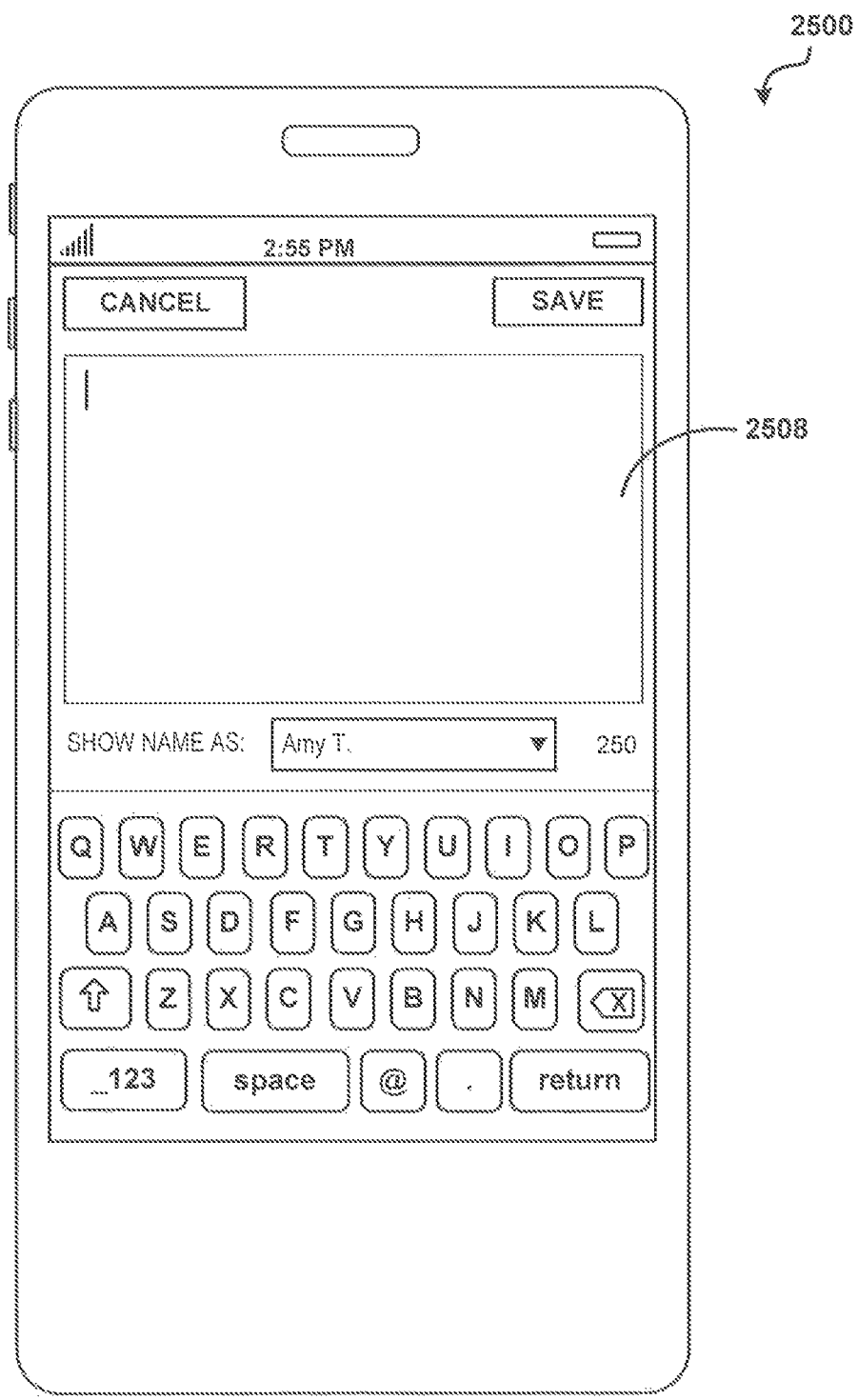
FIG. 31 shows a screenshot depicting an interface wherein a consumer may enter a description of a merchant, in accordance with various embodiments.
Figure 32:
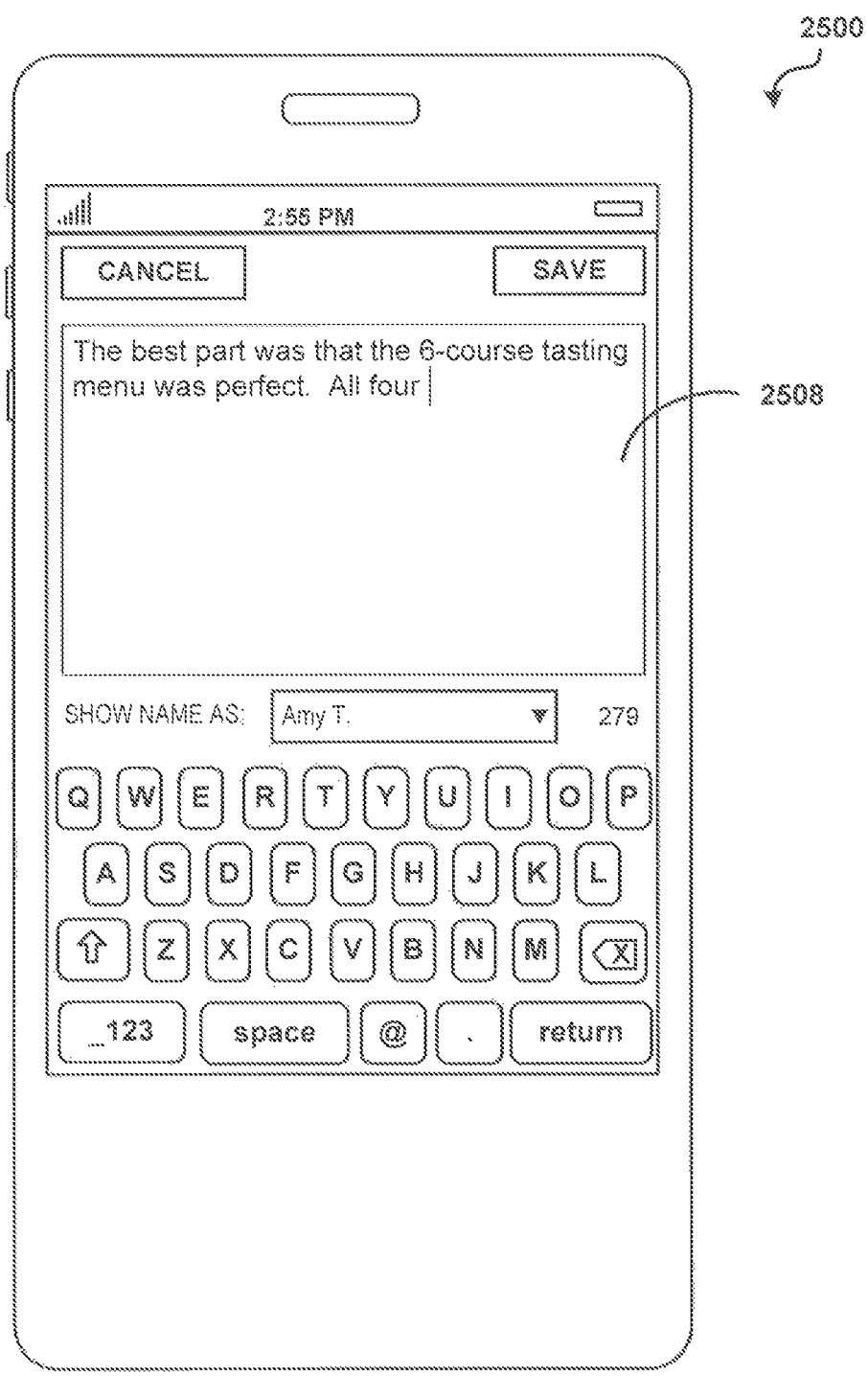
FIG. 32 shows a screenshot depicting an interface wherein a consumer is entering a description of a restaurant, in accordance with various embodiments.
Figure 33:
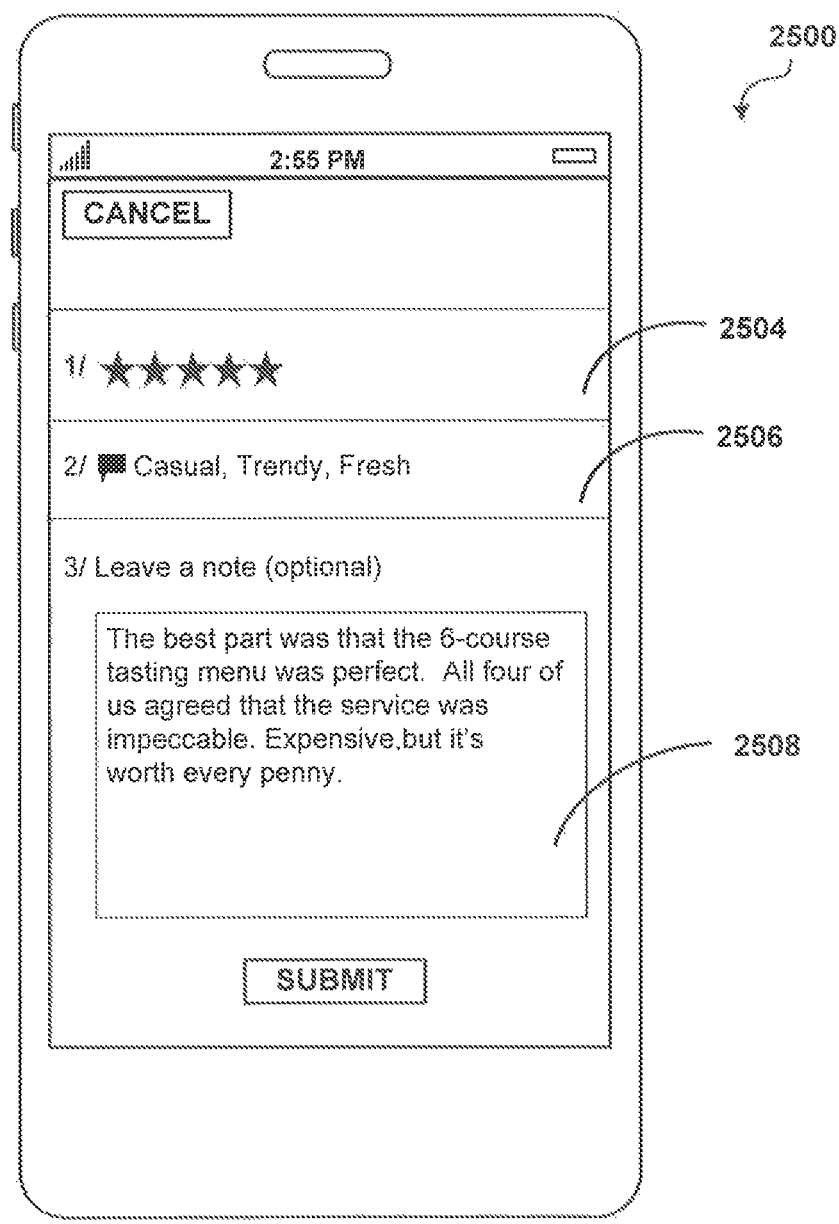
FIG. 33 shows a screenshot depicting an interface wherein a consumer has entered a rating, a word tag, and a description of a restaurant, in accordance with various embodiments.

Moreover, in various embodiments and with particular attention to FIGS. 31-33, a free-form text review component 2508 may permit a consumer to provide a description of a user's opinion of and/or experience with an item. Although a consumer may decline to enter text, this option may, as depicted, permit a user to add detailed comments, which may be made available, as described herein, to other consumers. As those of skill will appreciate, a consumer may submit or otherwise transmit a completed review comprising one or more of the consumer's selected rating, word tags, and/or written description of an item to system 100 for storage and analysis.

Figure 34:
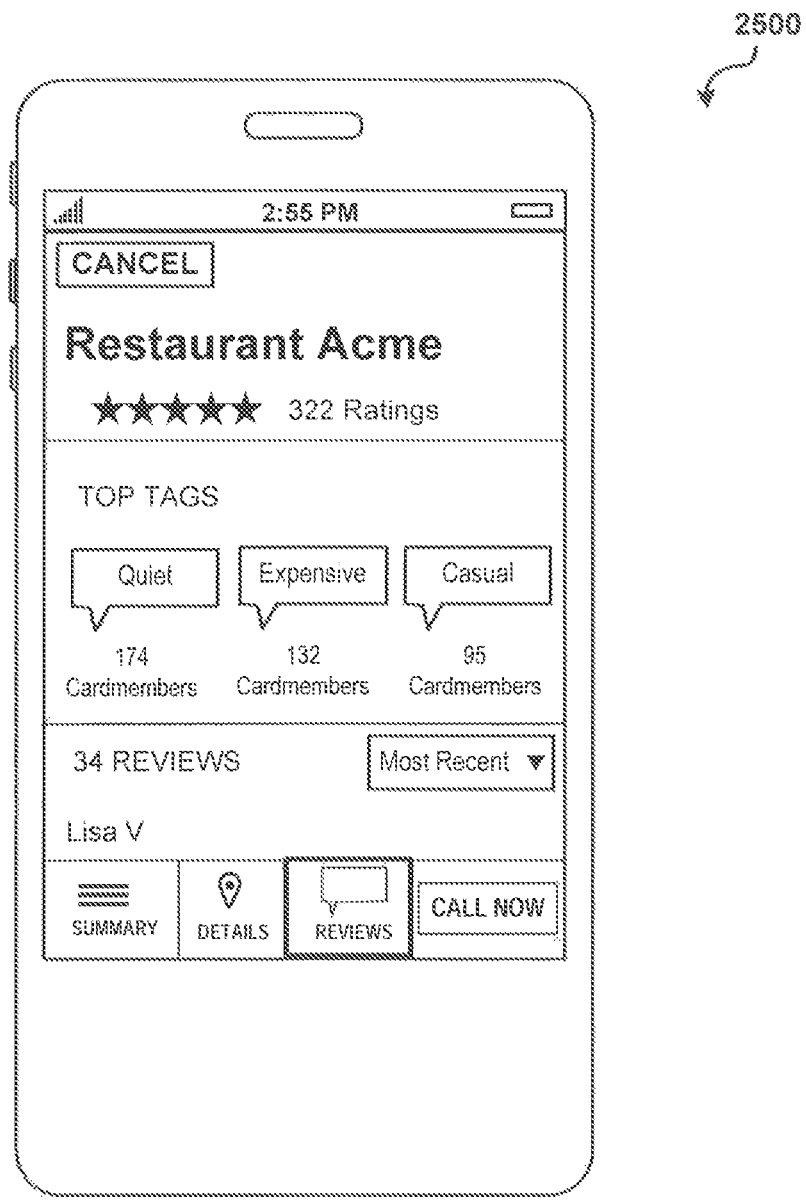
FIG. 34 shows a screenshot depicting an interface wherein a consumer may review a restaurant, in accordance with various embodiments.

In various embodiments and with reference to FIG. 34, a consumer may receive information associated with an item. For example, as depicted, a consumer may receive an overall merchant review, which may include an average rating associated with the merchant, a list of one or more most commonly selected or "top" word tags associated with the merchant, and/or one or more written descriptions of the merchant (as entered by one or more consumers). In various embodiments, one or more word tags may be displayed in association with a number of other consumers or cardmembers who have selected each word tag.

Further, as discussed, a consumer may receive an item or restaurant review in association with an item recommendation by system 100 and/or ranked list of items (e.g., restaurants) 1900 that is generated for the consumer. Thus, for example, a consumer may select a restaurant from list of ranked restaurants 1900 provided to the user by a system 100, and in response, the consumer may be provided via interface 2500 a restaurant review as shown in FIG. 34. A consumer may further receive an item review in response to a request by the consumer for the review and/or based upon a location of the consumer (e.g., the consumer may receive a review in response to entering the restaurant).

In various embodiments, a review completed by a consumer, as described above, may be more creditable than other typical consumer reviews. This may occur, for example and as discussed above, as a result of the fact that the reviews discussed herein may only be created by consumers who have conducted actual, verifiable transactions in association with a merchant. Further, although in various embodiments, a transaction may be conducted with any type of transaction card, in various embodiments, a transaction may be paid for with cash, but a consumer may check-in at a merchant for verification, which may enable the consumer to create a verifiable review. These simplified and rapid processes for creating reviews of items may further encourage a consumer to provide a review, and this may, in turn, result in a large number of reviews, which may, in its turn, result in more accurate overall item reviews.

Figure 35:
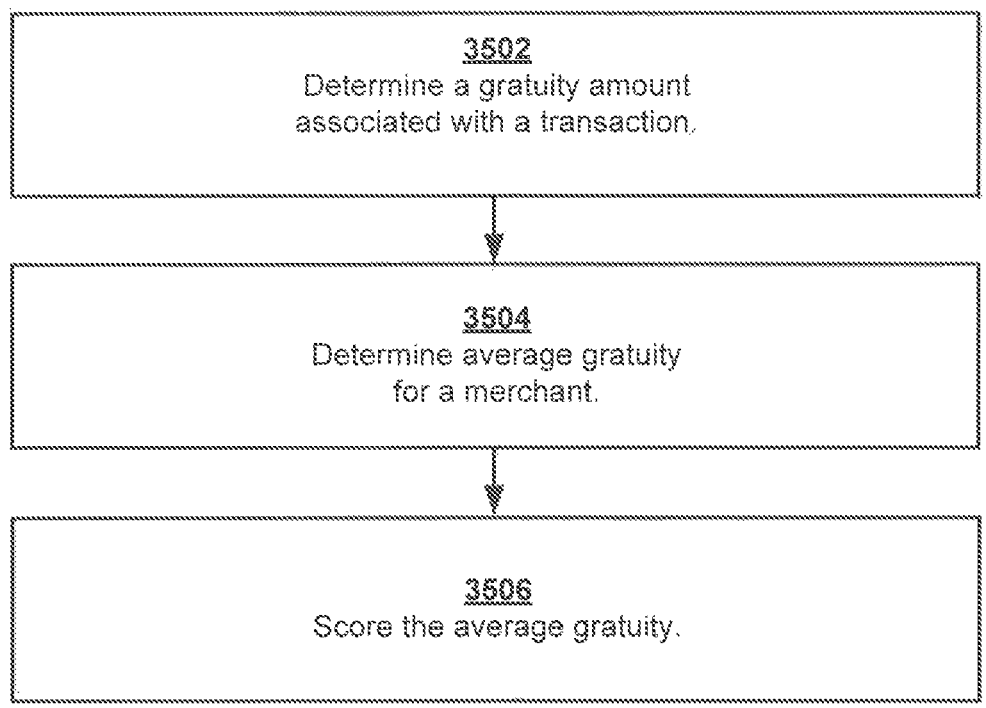
FIG. 35 shows a flowchart depicting an exemplary process for determining a service sentiment, in accordance with various embodiments.

Continuing, in various embodiments, a quality of service or service sentiment may be associated with an item, such as a restaurant and/or treated as an item or item attribute. A quality of service may, in various embodiments and as described with reference to process 3500 as shown in FIG. 35, be inferred or determined from transaction data. For example, in various embodiments, a quality of service may be determined from one or more gratuity or "tip" amounts added by consumers to one or more transactions. More particularly, a greater or larger gratuity amount may indicate consumer satisfaction (and therefore good quality of service) with a restaurant, while lesser or smaller gratuity amounts may indicate consumer dissatisfaction or reduced consumer satisfaction (and therefore reduced or poor quality of service).

In various embodiments, system 100 may determine a gratuity amount associated with a transaction based upon a variety of data (step 3502). For example, in certain embodiments, a restaurant may provide a gratuity amount to system 100 as a separate line item. In addition, in various embodiments, system 100 may determine a gratuity amount based upon a comparison of a first transaction request and authorization amount that includes a consumer's total bill to a second transaction and authorization amount that includes the consumer's total bill plus any gratuity the consumer has added to the bill. The difference between the first transaction amount and the second transaction amount may be identified as the gratuity amount.

In various embodiments, an average gratuity percentage (and/or amount) may be determined for one or more of a plurality of restaurants over a period of time (e.g., one month) (step 3504). For example, a gratuity amount may be divided by a total bill amount for a transaction to arrive at a gratuity percentage for the transaction. This calculation may be repeated for each of a plurality of transactions associated with the restaurant during the period (e.g., all purchases made from the restaurant during a month period) to arrive at a plurality of gratuity percentages. Each of this plurality of gratuity percentages may be summed and divided by the total number of transactions during the period to arrive at an average gratuity percentage for the restaurant. This average gratuity may represent an overall or average quality of service associated with the restaurant.

Further, in various embodiments, an average gratuity associated with a restaurant may be scored or evaluated to place the average gratuity in a context that a consumer may more easily incorporate into the consumer's decision making process (step 3506). For example, an average gratuity may be used to score or rate a restaurant's quality of service (e.g., as "excellent," "good," "average," "poor," and/or the like). An average gratuity may also, in various embodiments, be associated with a score, such as a number of stars, a thumbs up symbol or a thumbs down symbol, and/or the like.

Therefore, a score may be calculated based upon a variety of scoring models. However, to discuss a few, a score may be associated with a restaurant as follows. In various embodiments, a restaurant having an average gratuity of greater than a first value (e.g., 15%) may receive a first score (e.g., a score of "excellent"), while a restaurant having an average gratuity of between the first value and a second value (e.g., between 10% and 15%) may receive a second score (e.g., a score of "average"), and a restaurant having an average gratuity of less than the second value (e.g., less than 10%) may receive a third score (e.g., a score of "poor"). In various embodiments, any number of scoring values may be applied (e.g., in addition to the three values discussed above) to filter an average gratuity as finely or as granularly as desired.

Further, in various embodiments, a total average gratuity may be calculated for a group of merchants (e.g., based upon the average gratuity calculated above for each individual restaurant), and the individual average gratuities compared to the total average gratuity to formulate a score. For example, a restaurant having an average gratuity that is greater than the total average gratuity may receive a quality of service score of "excellent," while a restaurant having an average gratuity that is less than the total average gratuity may receive a score of "poor." However, in various embodiments, a variety of scoring themes may be applied, depending, again, upon a desired scoring granularity. For example, any restaurant having an average gratuity within a first margin of a total average gratuity may receive a first score, while any restaurant within a second margin may receive a second score, and so on.

Similarly, in various embodiments, a plurality of average gratuities may be expected to fit a normal or Gaussian distribution (e.g., a "bell curve"). Where such a distribution applies, a restaurant may receive a score based upon the location of the restaurant's average gratuity on the distribution. For example, a restaurant having an average gratuity located a first standard deviation away from a mean average gratuity may receive a first score, while a restaurant having a second average gratuity located a second standard deviation away from the mean may receive a second score, etc.

In operation, a quality of service score and/or an average gratuity associated with a restaurant may be associated with a restaurant as a restaurant attribute and fed into a collaborative filtering process, as described above, to develop CRVs for the restaurant, to up-rank and/or down-rank the restaurant, and/or the like. For example, a restaurant may be added to ranked list 1900 as described above and re-ranked based upon a quality of service score (where desirable scores may engender up-ranking and less desirable scores the opposite). Similarly, as described above with respect to FIG. 34, a quality of service and/or an average gratuity may be presented to a consumer as part of an overall merchant review.

Continuing, in various embodiments, a relative consumer cost associated with an item may be determined. For example, in various embodiments, a relative consumer cost associated with a merchant may be determined. A relative consumer cost may indicate a cost associated with an item or merchant. A cost may comprise, for example, an expected expenditure of a consumer with a merchant, such as an expected charge amount. In various embodiments, as described herein, a relative consumer cost may be based upon a variety of items, including transaction data. Thus, a relative consumer cost may provide a more accurate representation of an expected cost of an item to a consumer, because, for example, other estimates of cost may be based upon factors (e.g., menu data, user feedback) which may not reflect actual consumer behavior and/or which may be subject to consumer impressions of cost (as opposed to actual spending).

Moreover, in various embodiments, a relative consumer cost may be provided in relative terms. For example, a relative consumer cost may indicate a cost associated with a merchant relative to a cost associated with another merchant. Thus, in various embodiments, a relative consumer cost may segment a plurality of merchants into one or more categories or segments of cost or expected expenditure. Further, any number of segments may be used. Further still, segments may be associated with a variety of indicia. For example, segments may be associated with dollar sign symbols, such that a consumer may readily determine that a merchant associated with a single dollar sign symbol is less expensive than a merchant associated greater than one dollar sign symbol. Other indicia may include numbers (e.g., numbers from 1 to 10), stars (e.g., stars from 1 to 5), and, in general, any other symbol or index.

Figure 36:
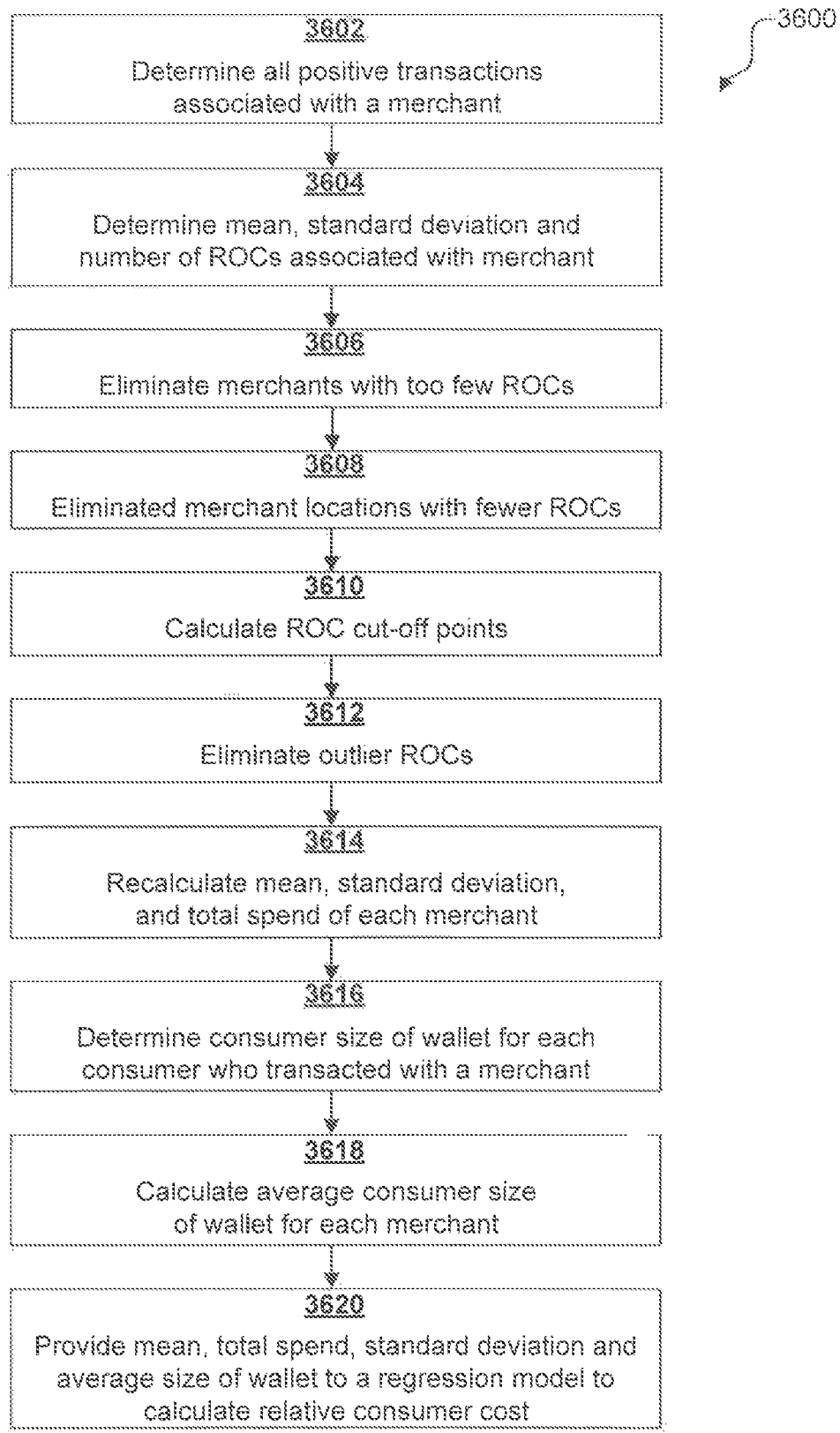
FIG. 36 shows a flowchart depicting an exemplary process for determining a relative consumer cost, in accordance with various embodiments.

Accordingly, with reference now to FIG. 36, a process 3600 for determining a relative consumer cost is described. Process 3600 is described herein with reference to a variety of tables, each of which may assist in the implementation of process 3600. However, although process 3600 is described with reference to each table, in various embodiments, a variety of data structures, data sets, and/or the like may accommodate process 3600. In other words, the tables discussed herein are included for illustrative purposes only.

Therefore, in various embodiments, and with reference to FIG. 37, all (or a subset of all) positive transactions or ROCs associated with one or more merchants during a period (e.g., one month) may be determined (e.g., by a system 100) and stored, as shown, as part of a table 3700 (step 3602). A positive transaction or ROC may comprise a transaction in which a consumer remits payment (as opposed to a transaction in which a consumer receives a credit, such as a backcharge). In general, although table 3700 may include a variety of columns, in various embodiments and for purposes of illustration, table 3700 may further comprise a merchant ID column 3702, a charge column 3704, a merchant name column 3706, a merchant zip code column 3708, a merchant address column 3710, and/or the like. Thus, each row in a table such as table 3700 may correspond to a transaction record or a ROC associated with one or more positive transactions of consumers at a merchant (e.g., as shown, consumers at the merchant "Merchant A"). In addition, each ROC may be associated with a transaction or ROC amount at, for example, column 3704, as well as a merchant id, a merchant name, a merchant zip code, a merchant address (at columns 3702, 3706, 3708, and 3710, respectively).

Figure 38:
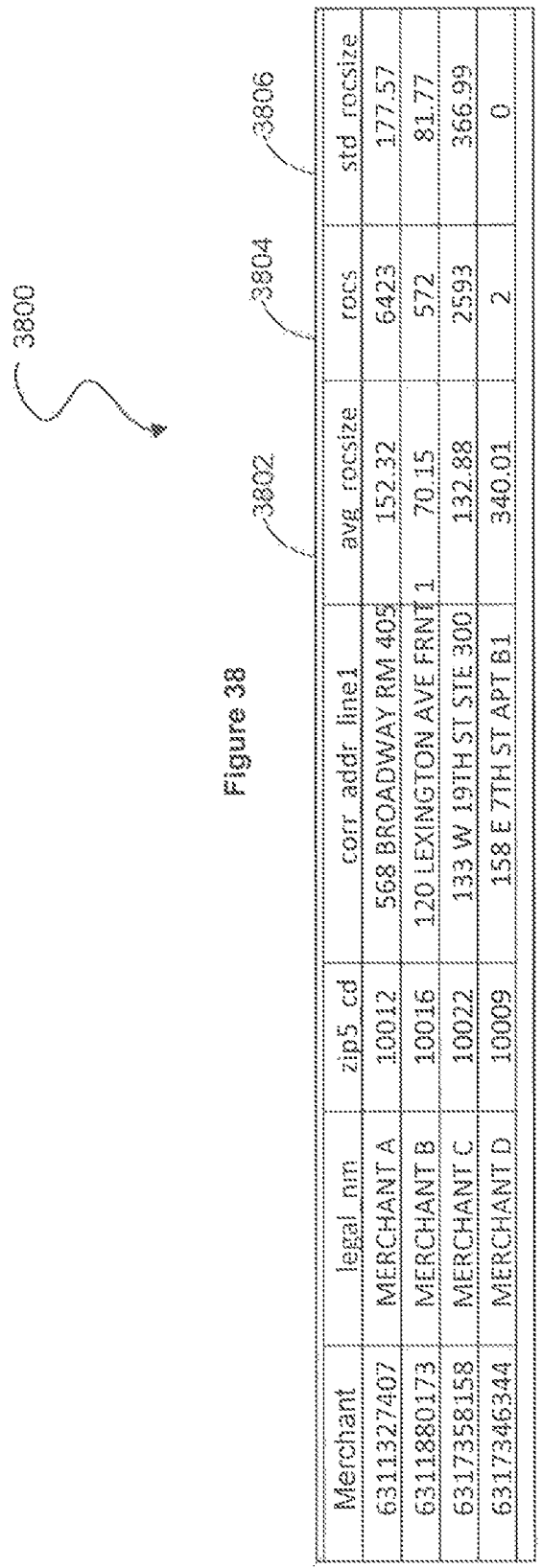
FIG. 38 shows an exemplary table including a mean ROC amount and a standard deviation ROC amount for a plurality of merchants, in accordance with various embodiments.

Turning to FIG. 38, a mean ROC amount, a standard deviation (and/or variance) ROC amount, and/or a number or count of ROCs associated with one or more merchants may be determined based upon table 3700 (step 3604). For example, as shown in a table 3800, a mean ROC amount may be calculated for a plurality of merchants in column 3804. Likewise, a number of ROCs may be determined for a plurality of merchants in column 3804, while a standard deviation ROC amount may be calculated in column 3806. As those of skill is the art will appreciate, in various embodiments, a mean ROC amount and/or a standard deviation ROC amount may be calculated according to known methods.

Further, in various embodiments, as illustrated in FIG. 39, table 3900, any merchant with fewer than a threshold number of ROCs may be deleted or eliminated from table 3800 (to produce table 3900) (step 3606). In various embodiments, a merchant may be eliminated if a merchant is associated with less than twenty ROCs during a time period (e.g., 30 days, one month, etc.)

With brief attention now to FIGS. 39 and 40, table 3900 may be modified such that a merchant may be limited to a single location (step 3608). That is, in various embodiments, a merchant may comprise one or more locations (e.g., the merchant may have greater than a single store location). Accordingly, as depicted, a merchant having multiple locations may be limited to the location associated with the greater or greatest number of ROCs. Thus, as shown at table 4000 the merchant associated with merchant id 6319018933 may be eliminated based upon its (lower) number of ROCs. In various embodiments, multiple merchant locations may be distinguished or identified based upon a merchant name column 4002, a merchant zip code column 4004 and/or a merchant address column 4006. For example, a determination may be made that a plurality of entries or records in table 4000 correspond to a plurality of merchant locations (each having its own merchant id as shown at column 4008) based upon one or more of a same merchant name column 4002, merchant zip code column 4004, and/or merchant address column 4006.

Continuing, with reference now to FIG. 41, a plurality of transaction or ROC cutoff points may be determined based upon the information contained in table 4100 (step 3610). A cutoff point may represent a maximum and/or minimum ROC amount, over or under which a transaction record or ROC entry (as depicted generally in table 3700) may be eliminated from inclusion, as described herein, in a recalculated or newly determined mean ROC amount, standard deviation ROC amount, and/or number of ROCs. In general, and in various embodiments, a ROC cutoff point (maximum or minimum) may represent a value that is two standard deviations or greater from the mean value. Thus, as discussed herein, a maximum ROC cutoff point may comprise a ROC amount that is two standard deviations or more greater than the mean ROC amount, while a minimum ROC cutoff point may comprise a ROC amount that is greater than or equal to two standard deviations less than the mean ROC amount. Therefore, a maximum ROC cutoff point and/or a minimum ROC cutoff point may be seen to eliminate outliers, or ROC amounts which are statistically much higher or much lower than the mean ROC amount.

In various embodiments, a maximum ROC cutoff point may be determined based upon the equation: maximum ROC cutoff point=mean ROC amount+2*standard deviation ROC amount. Similarly, in various embodiments, a minimum ROC cutoff point may be determined based upon the following equation: minimum ROC cutoff point=max (mean ROC amount—2*standard deviation ROC amount, 0). In other words, a minimum ROC cutoff point may be the greater of a mean ROC amount−2*standard deviation ROC amount and 0. Accordingly, with reference to table 4100, a maximum and minimum ROC cutoff point for the restaurant Merchant A may be calculated as follows:

Maximum ROC cutoff point (Merchant A)=152.32+ 2*177.57=$507.46.

Minimum ROC cutoff point (Merchant A)=max (152.32− 2*177.57, 0)=max (−202.82, 0)=0.

Having determined maximum and minimum ROC cutoff points, and with reference now to FIG. 42, in various embodiments, ROC entries appearing in table 3700 may be eliminated from table 3700 if the charge amount appearing in charge column 4702 is greater than the maximum ROC cutoff point or less than the minimum ROC cutoff point. As discussed above, this process may eliminate outliers. Thus, as depicted, the ROC entry associated with the restaurant Merchant A having a charge amount of 763.6 may be eliminated from table 4200, because the charge amount exceeds the maximum ROC cutoff point (and is therefore an outlier).

Now, having eliminated outlier data entries, as described above, a mean ROC amount, a standard deviation ROC amount, and/or a number of ROCs may be recalculated based upon the data remaining in table 4200 (step 3614). Recalculating these values in the absence of outlying data entries may serve to improve or normalize the accuracy associated with each value. With brief reference to FIG. 43, a table 4300 comprising a plurality of recalculated values is shown.

Further, in various embodiments, and with reference to FIG. 44, a size of wallet associated with a consumer may be determined for each ROC (step 3616) and appended to all or part of any of the tables described herein. Further, in various embodiments, e.g., where a consumer has transacted with a particular merchant on more than one occasion during a period of time (e.g., multiple ROCs exist for the consumer-merchant pair), duplicate pairs may be removed, such that only a single consumer-merchant pair remains. A table resembling table 4400 may result. Further, in various embodiments, any table entries including zero size of wallet values or missing size of wallet values may be removed as part of this process. Further still, as shown in table 4402, an average consumer size of wallet may be determined in association with or more merchants (step 3618). This may be accomplished, for example, by averaging individual consumer size of wallet values for each ROC associated with a merchant. Thus, a merchant may be associated with an average consumer size of wallet value.

Figure 45:
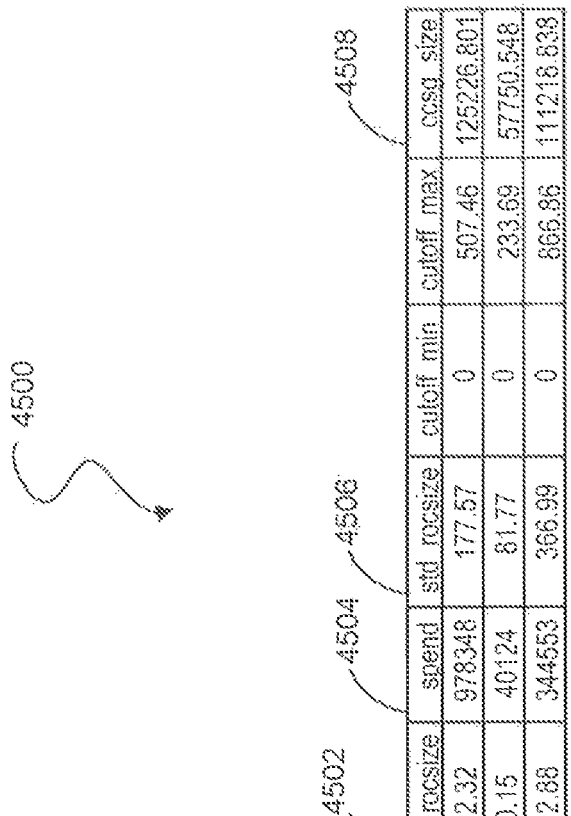
FIG. 45 shows an exemplary table including a mean ROC amount, a total spend, a standard deviation ROC amount, and a consumer size of wallet, in accordance with various embodiments.

Now, with reference to FIG. 45, a table 4500 may be produced, compiled, calculated, determined, or the like. As shown, table 4500 may include each of the values calculated as described above. For example, table 4500 may contain a recalculated mean ROC amount, as shown in column 4502, a recalculated standard deviation ROC amount, as shown in column 4506, an average consumer size of wallet, as shown in column 4508, and a total spend associated with each merchant, as shown in column 4504. In various embodiments, a total spend associated with a merchant may comprise a sum of each consumer's spend (e.g., amount charged or otherwise expended) with a merchant during a time period.

Moreover, each of the values comprising columns 4502-4508 may be input to a regression model, such as a linear regression model, and the model may calculate or output a normalized relative consumer cost associated with each merchant (step 3620). Similarly, in various embodiments, a recalculated mean ROC amount and/or a recalculated standard deviation ROC amount may not be input to a linear regression model to determine a normalized relative consumer cost. Rather, in various embodiments, each of a mean ROC amount and/or a standard deviation ROC amount (as shown in table 3800, columns 3802 and 3806) may be input to a regression model to determine a relative consumer cost. Thus, in various embodiments, a (normalized or un-normalized) relative consumer cost associated with a merchant may be based upon a mean ROC amount, a standard deviation ROC amount, an average consumer size of wallet, and/or a total spend associated with one or more merchants.

Therefore, as discussed above, a relative consumer cost may serve as a basis for segmenting a plurality of merchants into one or more categories or segments of cost or expected expenditure. In addition, as each segment may be associated with a variety of indicia, (e.g., a dollar sign symbol), a consumer may readily determine a cost of a merchant relative to one or more other merchants.

In addition, as discussed elsewhere herein, a relative consumer cost may be input to system 100 as an item and/or item attribute (e.g., as an attribute associated with a merchant). In other words, in various embodiments, a relative consumer cost may comprise an input to a collaborative filtering algorithm as part of a process (as described herein) for tailoring one or more recommendations to a consumer. Similarly, in various embodiments, a relative consumer cost and/or one or more indicia associated with the relative consumer cost may be displayed in association with an overall merchant review, as depicted generally in FIG. 34. Thus, in various embodiments, a consumer may receive and/or review a merchant (or item) recommendation, as discussed above, together with a relative consumer cost and/or one or more indicia associated with the cost, and this may help a consumer in deciding whether to purchase from a merchant, etc.

Figure 46:
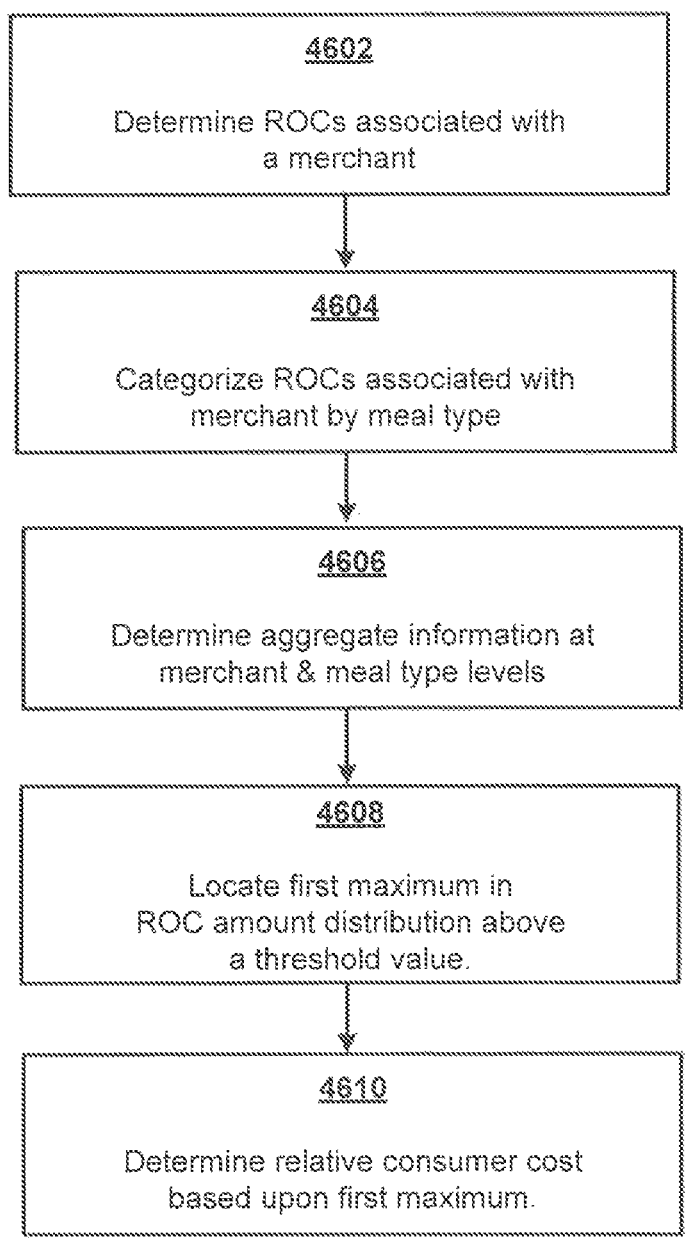
FIG. 46 shows a flowchart depicting an exemplary process for determining a relative consumer cost, in accordance with various embodiments.

In various embodiments, an estimated price per person associated with a merchant such as a restaurant, which may be quite similar to a relative consumer cost, may be determined. Accordingly, with reference to FIG. 46, a process 4600 for determining an estimated price per person is discussed. Although process 4600 is described herein with reference to a variety of tables, as discussed above with reference to process 3600, in various embodiments, a variety of data structures, data sets, and/or the like may accommodate process 4600. In other words, the tables discussed herein are included for illustrative purposes only. Similarly, although process 4600 is discussed herein with reference to a restaurant or restaurants, process 4600 may, with possibly certain alterations, be applied to any other items.

Therefore, in various embodiments and with reference to FIG. 47, all (or a subset of all) transactions or ROCs associated with one or more restaurants during a period (e.g., one month) may be determined (e.g., by a system 100) and stored, as shown, as part of a table 4700 (step 4602). In various embodiments, each ROC may comprise a positive transaction or ROC (as discussed herein). Further, as depicted, a table 4700 may comprise a variety of information, including for example, one or more consumer identifiers, as shown in column 4702, one or more restaurant identifiers, as shown in column 4704, one or more ROC amounts, as shown in column 4706, one or more ROC counts, as shown in column 4708, one or more transaction or ROC dates, as shown in column 4710, one or more transaction or ROC times, as shown in column 4712. In various embodiments, a table 4700 may be organized and/or reorganized to categorize ROCs by restaurant, so that a plurality of ROCs associated with a restaurant are grouped together. Each ROC may be further categorized or organized based upon a transaction date and/or transaction time. ROC table 4800 organized according to these guidelines is shown in FIG. 48.

With reference to FIG. 49, a plurality of ROCs associated with a restaurant may be categorized, in various embodiments, based upon a meal type (step 4604). A meal type may comprise any category with which a meal may be associated. However, to give a few examples, a meal type may comprise "breakfast," "lunch," "dinner," "late night," "weekend brunch," and/or the like.

In various embodiments, a ROC may be categorized by meal type as part of process 4600 for determining a relative consumer cost, because different meal types may be associated with different costs (e.g., breakfast may often be less costly than dinner, etc.) Thus, it may be beneficial to categorize ROCs by meal type, so that the estimated price per person associated with a restaurant that serves an inexpensive breakfast but a more expensive dinner is not unnecessarily skewed in any direction. Similarly, as discussed herein, an estimated price per person (and/or an indicia associated with the estimate) may be provided to a consumer based upon a meal type in which the consumer is likely interested (e.g., depending upon a time of day, etc.)

Accordingly, as shown in table 4900, a meal type (column 4904) may be associated with a transaction or ROC time (column 4906) and/or a probable dining time (column 4908). A ROC time may correspond to a time or a period of time during which a ROC or transaction is authorized, while a probable dining time may correspond to a time during which a consumer is actually dining within a restaurant (in various embodiments, a ROC time may succeed a probable dining time by a short period, such as an hour, because a consumer may dine for approximately the period prior to making payment). Thus, a table 4900 may comprise a cross-reference table in which a meal type is defined by its relationship to a ROC time and/or a probable dining time.

Therefore, with returning attention to table 4700, each ROC associated with table 4700 may be associated with a meal type based upon a transaction time (column 4712) associated with the ROC. This may be accomplished, for example, with reference to the table 4900, and as illustrated, the table 4902, tying each ROC to a meal type, may result.

In various embodiments, the information comprising table 4900 may be aggregated at a restaurant and/or meal type level (step 4606) to determine one or more aggregated ROCs. For example, as shown in FIG. 50, a table 5000 may, for each restaurant, comprise a total number of ROCs (column 5002) and/or a total ROC amount (column 5004) associated with a restaurant and a meal type. Thus, for example, a restaurant 12312312311 may be associated with 446 ROCs and a total ROC amount of $3,544 during a meal type of breakfast, 435 ROCs and a total ROC amount of $4,670 during a meal type of lunch, and so on. Further, as shown, an aggregated ROC (e.g., aggregated ROC 5006) may be eliminated from a data set, such as table 5000, based upon a total number of ROCs that is less than a threshold value, such as one hundred ROCs, three hundred ROCs, two hundred ROCS, four hundred ROCs, and/or the like. Likewise, in various embodiments, an aggregated ROC may be eliminated from table 5000 based upon a meal type. For instance, an aggregated ROC associated with a late night meal type may be eliminated, because ROCs occurring during the time period associated with this meal type may tend to skew a relative consumer cost in an unwanted direction and/or because there are commonly too few ROCs associated with the meal type.

Having determined an aggregated ROC, and with reference now to table 5100 in FIG. 51, a percentage or number of ROCs corresponding to a range of ROC amounts (e.g., $0-$5, $5-$10, $10-$15, $15-$20, $20-$25, etc.) may be determined. In addition, as discussed above, each percentage of ROCs may be further categorized according to a meal type. Thus, as shown, table 5100 may indicate that 0.5% of ROCs associated with a meal type of breakfast were associated with a ROC amount in the range $0-$5. Likewise, looking further into table 5100, the table may indicate that 3.8% of ROCs associated with the meal type of breakfast were associated with a ROC amount in the range $15-$20. Further, as shown, a distribution of ROCs (e.g., by ROC amount and meal type) may be tabulated for other meal types (e.g., lunch, dinner, etc.)

With continuing regard to table 5100, a first peak of maximum percentage of ROCs may be identified for each meal type (step 4608). In various embodiments, a first maximum percentage of ROCs may be identified from left to right in table 5100. In other words, a first maximum ROC percentage may be identified by reviewing ROC percentages from those percentages associated with an inexpensive range of ROC amounts (e.g., $0-$5) to those associated with a more expensive range of ROC amounts (e.g., $40-$45). Further, in various embodiments, a first maximum ROC percentage may comprise a first percentage which exceeds a threshold value, such as 3%, 3.5%, and/or the like. Thus, as shown in table 5100, a first maximum percentage of ROCs (3.8%) associated with the meal type "breakfast" may occur in the range $15-$20, while a first maximum (4.5%) associated with the meal type "lunch" may occur in the range $20-$25, and a first maximum (9.6%) associated with the meal type dinner may occur in the range $30-$35.

Figure 52:
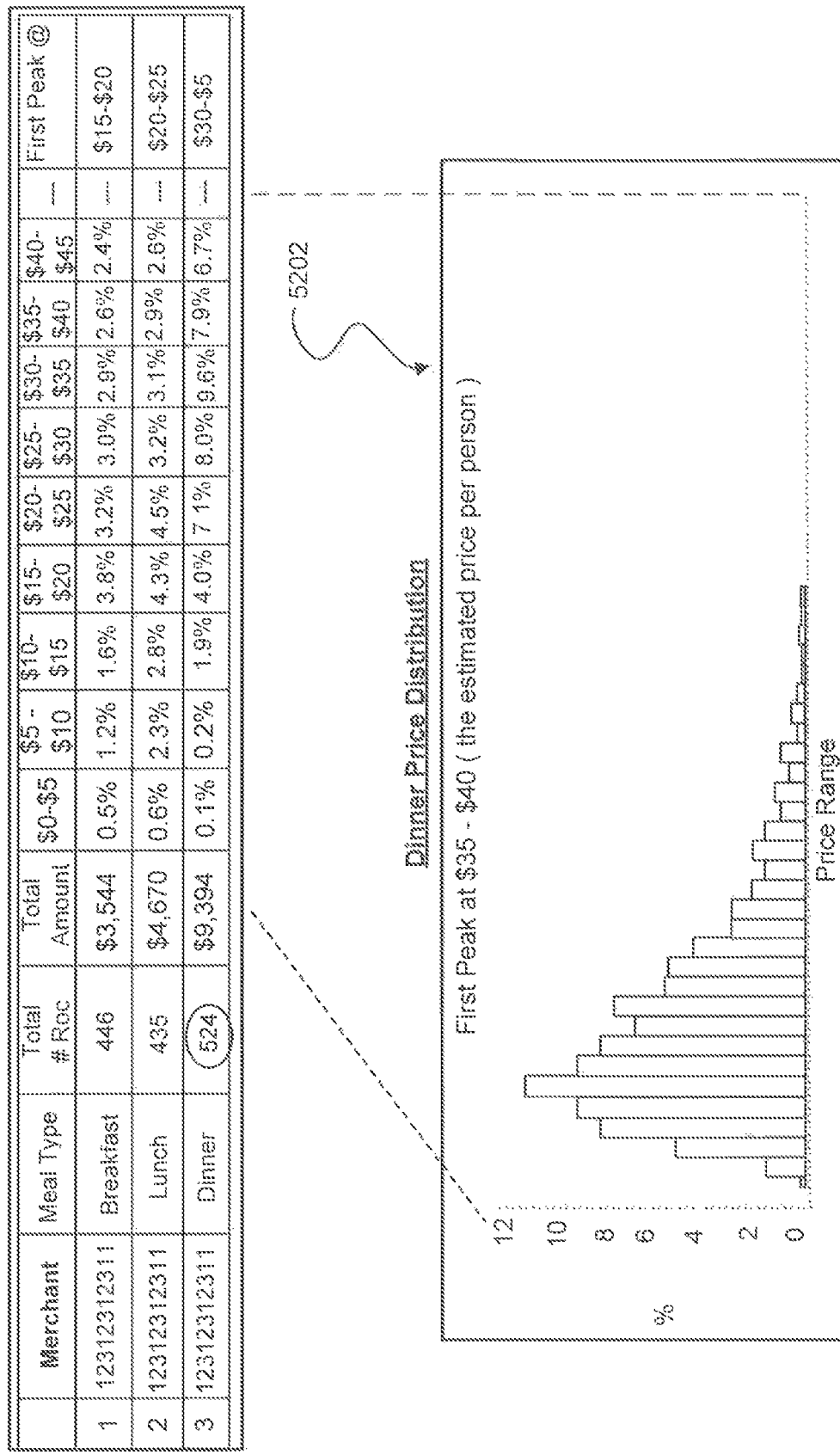
FIG. 52 shows a table including a total number of ROCs organized by meal type per merchant as well as a chart showing a price distribution associated with a meal type, in accordance with various embodiments.

Referring now to FIG. 52, having identified one or more first peaks or maxima, an estimated price per person of a restaurant may be determined (step 4610). For example, in various embodiments, an estimate may be determined for a restaurant based upon the meal type associated with the greatest number of total ROCs. As shown, a total number of ROCs are listed in column 5202, and as can be seen, in this example, a meal type of "dinner" may be associated with a greatest number of ROCs (e.g., 524 ROCs). Accordingly, an estimated price per person for the restaurant associated with these values may comprise a ROC amount (or the range of ROC amounts) corresponding to the first maximum ROC percentage in the meal type associated with the greatest number of total ROCs. Thus, as depicted, an estimated price per person for the example restaurant may comprise $35-$40 per person, since the meal type "dinner" is associated with the greatest number of total ROCs, and the first maximum associated with this meal type (9.6%) occurs in the range $35-$40. Further, in various embodiments, chart 5202 may be compiled based upon table 5200. Chart 5202 may depict a price distribution associated with a meal type. Further, table 5200 may include an estimated price per person, as discussed above.

In various embodiments, an estimated price per person may, like a relative consumer cost, be input to system 100 as an item and/or item attribute (e.g., as an attribute associated with a merchant). In other words, in various embodiments, an estimated price per person of a restaurant may comprise an input to a collaborative filtering algorithm as part of a process (as described herein) for tailoring one or more recommendations to a consumer. Similarly, in various embodiments, an estimated price per person and/or one or more indicia associated with the estimated price per person (if any) may be displayed in association with an overall merchant review, as depicted generally in FIG. 34. Thus, in various embodiments, a consumer may receive and/or review a merchant (or item) recommendation, as discussed above, together with an estimated price per person and/or one or more indicia associated with the estimate, and this may help a consumer in deciding whether to purchase from a merchant, etc.

Figure 53:
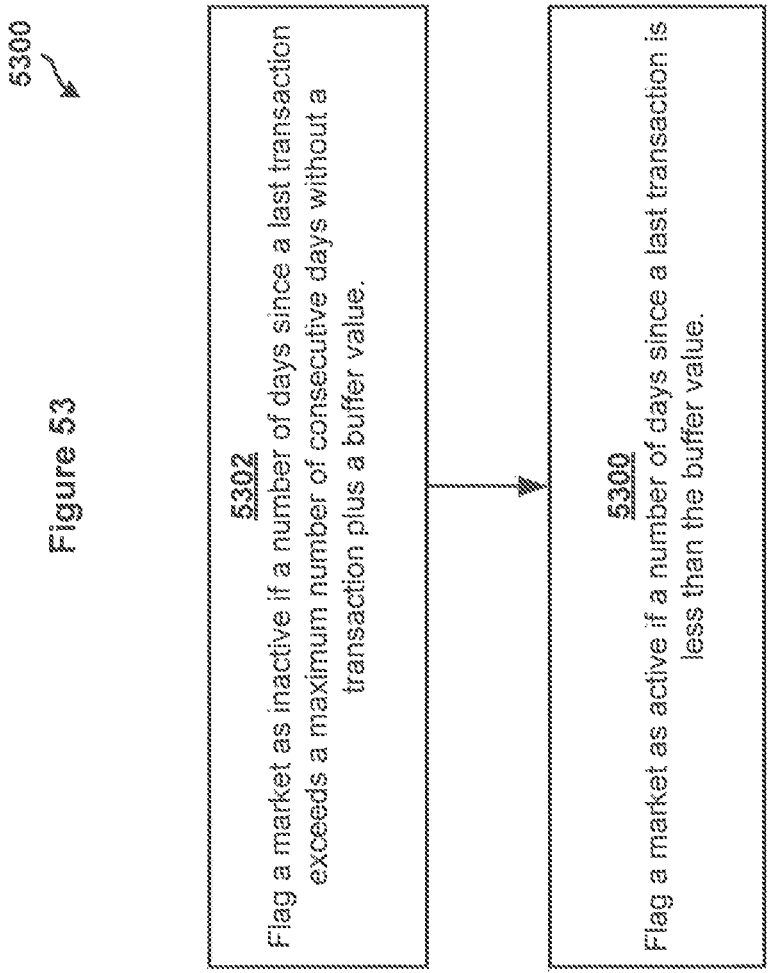
FIG. 53 shows a flowchart depicting a process for determining a merchant status, in accordance with various embodiments.

In various embodiments, a merchant may be evaluated to determine a status of the merchant. As discussed elsewhere herein, a merchant status may be input to a collaborative filtering algorithm and/or applied to the output of such an algorithm to adjust one or more recommendations supplied by the algorithm. Accordingly, with attention now to FIG. 53, process 5300 is depicted for determining a merchant status. A merchant status may, in various embodiments, comprise an active status and/or an inactive status. An active status may indicate that a merchant is open for business (or likely open for business), while an inactive status may indicate that the merchant has closed (permanently or semi permanently) for business. Likewise, in various embodiments, an active status may indicate that a merchant accepts a particular form of payment, while an inactive status may indicate that the merchant does not accept and/or no longer accepts a particular form of payment.

A merchant status may be based upon transaction or ROC data. For instance, a merchant status may be based upon one or more ROCs associated with a merchant (e.g., purchases by customers from the merchant). Further, a merchant status may be based upon ROC data during a period of time, e.g., one month, several months, one year, and/or the like. For example, in various embodiments, a merchant status may be based upon a comparison of a number of days since a last ROC associated with a merchant ("X") to a maximum number of consecutive days (e.g., in a period of time) during which a merchant was not associated with a ROC ("Y") (e.g., the merchant made no sales to customers of a transaction account provider). Specifically, a merchant status may be based upon comparison of a number of days between a ROC associated with a merchant and a current date ("X") to a number of consecutive days during which the merchant was not associated with a ROC ("Y").

More particularly, in various embodiments, a merchant may be flagged as inactive or associated with a merchant status of inactive if X is greater than Y plus a buffer value (step 5302). In various embodiments, a buffer value may comprise three days. Thus, a merchant may be flagged as inactive if X>Y+3. Other exemplary buffer values may include zero, one, two, four, five, six, seven, etc. Such a relationship may work, and a buffer value may be selected, to ensure that a merchant with a historically inconsistent transaction volume is not prematurely marked as being inactive. For example, a merchant who has five ROCs during a thirty day month may not be marked as inactive, despite having a very low transaction volume, if an adequate buffer value is selected.

Similarly, in various embodiments, an inactive merchant may be flagged as active, or associated with a merchant status of active, based upon a value of "X" (the number of days since a last ROC associated with a merchant) that is less than a buffer value (step 5304). In various embodiments, exemplary buffer values may include zero, one, two, three, four, five, six, seven, etc. Thus, to illustrate, a merchant may be flagged as active if X<3.

Thus, in various embodiments, transaction data associated with a merchant may be evaluated to determine a merchant status. A merchant may, in addition, oscillate or transition between active and inactive, depending, for example, upon the transaction data associated with a merchant. Likewise, in various embodiments and as discussed above, a buffer value may be selected to avoid premature merchant status changes.

Further, as discussed throughout this specification, a merchant status may be input to system 100 as an item and/or item attribute (e.g., as an attribute associated with a merchant). In other words, in various embodiments, a merchant status may comprise an input to a collaborative filtering algorithm as part of a process (as described herein) for tailoring one or more recommendations to a consumer. Similarly, in various embodiments, merchant status may be applied to merchant recommendation and/or a ranked list of merchants (e.g., list 1900) to eliminate an inactive merchant and/or to add a recently active merchant to a recommendation.

In various embodiments, as discussed briefly above, a consumer may "check in" or "log in" at a location, such as a merchant location. For example, a consumer may check in via web client 112, which may include a global positioning system or the like. Similarly, in various embodiments, a transaction by a consumer may automatically check a consumer into a merchant location associated with the transaction. Further, in various embodiments, one or more consumers may check into one or more locations, and the consumers may share these locations with one or more other consumers. For example, where a group of consumers are members of a social network and/or associated with one another via a social network, each consumer may be allowed to access one or more locations associated with members of the social network. That is, a consumer may review merchant locations where members of their social network have checked in. A consumer may review merchant locations associated with other members of their social network via, for example, one or more of web client 112, a social media website, a merchant website, a financial institution website, a mobile device application, and/or the like.

With more particular regard now to transaction based check in (i.e., check in based upon a location of a consumer and/or a consumer's web client), in various embodiments, system 100 may analyze transaction data to verify that a consumer has conducted a transaction at a specific merchant location. For instance, a transaction may verify a consumer's presence at a merchant location, and so may also serve to check or log the consumer in at the merchant location. In various embodiments, a zero value transaction may suffice to check a consumer in at a merchant location. A zero value transaction may comprise a transaction associated with zero monetary value, or in other words, a transaction in which a consumer is not charged. Likewise, in various embodiments, a consumer may be credited past check-ins based on the transaction history of the consumer. Thus, transaction based check in may encompass both transactions associated with a value or charge as well as transactions associated with no value or charge.

With continuing attention to transaction based check in, a consumer may be checked in based upon both of a card present and a card not present transaction. As used herein, a consumer may present a transaction instrument to a merchant as part of a card present transaction. Conversely, as used herein, a consumer may not present a transaction instrument to a merchant as part of a card not present transaction. Rather, a consumer may present a transaction account number to facilitate a card not present transaction. Card not present transactions are common types of online transactions. Further, in various embodiments, a consumer may be checked in based upon internal and/or external (e.g., third party) data.

A transaction based check in may occur in real time (e.g., at substantially the same time as a transaction), or it may occur at a later time. In various embodiments, a transaction based check in may be further confirmed by verifying a location of web client 112 associated with a consumer (e.g., via a global positioning system associated with web client 112). This may be referred to as location based check in. Thus, in certain embodiments, a transaction based check in may be utilized, while other embodiments may utilize a location based check in. Likewise, as discussed, in various embodiments, both of a transaction based check in and a location based check in may be employed.

A consumer may receive notification of a successful (or unsuccessful) check-in. This may occur, in various embodiments, in response to a transaction authorization. Similarly, a merchant may receive information related to consumers who have checked in with the merchant. In various embodiments, a merchant may receive aggregated check in information (e.g., a number of check-ins) but may not receive individual check in notifications. However, a merchant may also receive individual check-in data.

In various embodiments, and with reference to FIGS. 54-59, a consumer may be offered a reward as an incentive to visit (and/or check in with) a merchant. Likewise, in various embodiments, a consumer may keep track of one or more merchants visited or checked in with by the consumer. A reward may be monetary, status-based, reputation-based, etc. A reward may incentivize a consumer and/or other consumers to visit a merchant. For example, a reward may incentivize a consumer who receives a reward to return to the merchant. A reward may also incentivize members of a consumer's social network (who may have access to the consumer's check in data, as discussed above) to visit a merchant as well. In various embodiments, a consumer may be rewarded for checking in with a merchant a certain number of times, and/or a consumer may be rewarded for checking in with one or more merchants.

Figure 54:
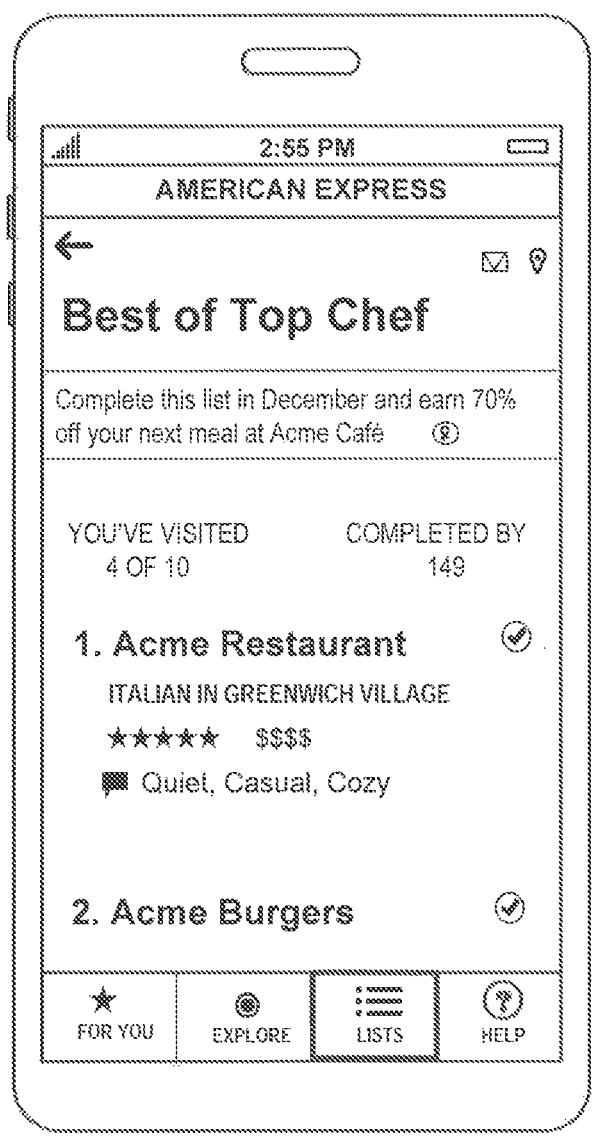
FIG. 54 shows a screenshot depicting an interface wherein a consumer may review a list of merchants associated with a reward, in accordance with various embodiments.
Figure 55:
FIG. 55 shows a screenshot depicting an interface wherein a consumer may review a list of merchants with which the consumer has checked in, in accordance with various embodiments.
Figure 56:
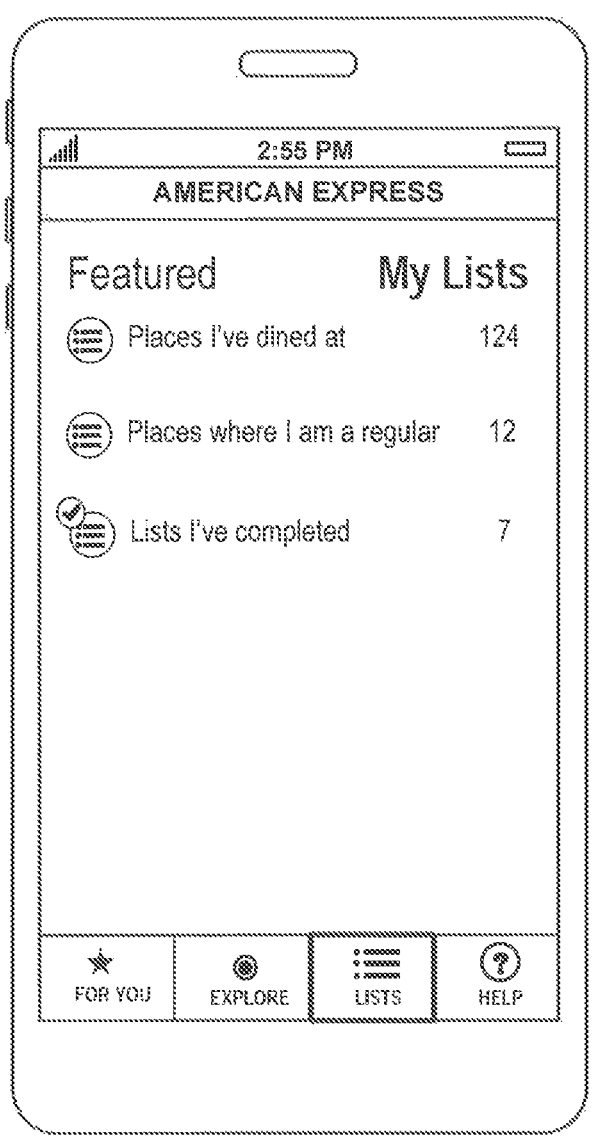
FIG. 56 shows a screenshot depicting an interface wherein a consumer may review a variety of lists, in accordance with various embodiments.
Figure 57:
FIG. 57 shows a screenshot depicting an interface wherein a consumer may review a plurality of merchants with which the consumer has dined, in accordance with various embodiments.
Figure 58:
FIG. 58 shows a screenshot depicting an interface wherein a consumer may review a plurality of completed lists, in accordance with various embodiments.

More particularly, in various embodiments, a consumer may be offered a reward in return for checking in with a list of merchants. For instance, as shown in FIG. 54 and FIG. 55, a consumer may be provided a list of merchants and offered a reward (e.g., 70% off the consumer's next meal at Acme Café) on the condition that the consumer checks in with each merchant identified by the list before a date. Further, as shown in FIG. 56 and FIG. 57, a consumer may review one or more lists, merchants checked in with, and/or the like, (e.g., by way of web client 112). Similarly, as shown in FIG. 58 and FIG. 59, a consumer may review plurality of lists completed, partially completed, and/or awaiting completion by the consumer. With further attention to FIG. 59, a consumer may select one or more lists according to the interests of the consumer. Thus, a consumer may be presented with a variety of lists for consideration.

In various embodiments, a group of merchants comprising a list may be output by system 100 as a result of a collaborative filtering algorithm (and/or one or more other processes), as described herein. Thus, in various embodiments, one or more merchants comprising a list may be tailored to a consumer as discussed herein.

In various embodiments, a reward may vary in response to a consumer's actions. For example, a consumer may complete a greater number of lists in order to receive a greater number of rewards and/or rewards of greater value. Similarly, a consumer may complete a difficult list (e.g., a list that is longer than another list) to obtain a more desirable reward. Further, a reward may vary based on a size of wallet (as discussed herein) of a consumer. For instance, a consumer associated with a particular size of wallet may have credit sufficient to check in with a list of luxury merchants. In return, such a consumer may receive a high value or luxury reward.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and/or the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and/or the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and/or the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and/or the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

With further regard to terms such as "consumer," "customer," "merchant," and/or the like, each of these participants may be equipped with a computing device in order to interact with the system and facilitate online commerce transactions. A consumer or customer may have a computing unit in the form of a personal computer, although other types of computing units may be used including laptops, notebooks, hand held computers, set-top boxes, cellular telephones, touch-tone telephones and/or the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

An electronic commerce system may be implemented at the customer and issuing bank. In an exemplary implementation, the electronic commerce system may be implemented as computer software modules loaded onto the customer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and/or the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
   determining, by a computing device, a normalized popularity score for one or more merchants by analyzing a plurality of records of charges (ROCs) associated with the one or more merchants, each ROC comprising a data set within a data entry of a data structure hosted by a provider associated with the computing device, each data set comprising information indicating a transaction with a point-of-sale (POS) device of a merchant, wherein the normalized popularity score is a quotient of an average transaction count over a maximum transaction count,
   wherein the normalized popularity score normalizes a popularity score among merchants with a larger number of transactions and merchants with a smaller number of transactions, and
   wherein a higher normalized popularity score represents a higher probability that the merchants will reach maximum capacity on any day;
   storing, by the computing device, data sets of a list of the merchants in a database as ungrouped data elements via a fixed memory offset;
   partitioning, by the computing device and using a key field, the database according to a class of objects defined by the key field;
   linking, by the computing device, data tables based on a type of data in the key field;
   obtaining, by the computing device, the list of the merchants from the database;
   generating, by the computing device, a list data structure corresponding to the list of the merchants, the list comprising data indicating an initial ranking of the merchants based on the normalized popularity score such that a merchant with the higher normalized popularity score is initially ranked within the list data structure above a merchant with a lower normalized popularity score;
   receiving, by the computing device from a merchant client device associated with one of the merchants, merchant criteria indicating a predetermined distance;

detecting, by the computing device, location information comprising global positioning system (GPS) information associated with a mobile communications device of a consumer;

analyzing, via the computing device, the list data structure based on the location information and the predetermined distance, and based on said analysis, determining that the one of the merchants from the list is currently outside the predetermined distance from the location of the mobile communications device of the consumer;

modifying, by the computing device, the list data structure based on said determination, said modification comprising removing data from the list data structure associated with the merchant that was determined to be currently outside the predetermined distance from the mobile communications device of the consumer, said modification further comprising re-structuring the list data structure by re-ranking merchants within the list data structure based on the removal of the merchant data from the list data structure; and automatically generating, by the computing device, a user interface (UI) based on the modified list data structure, the UI comprising functionality for displaying the re-ranked merchants within the list in accordance with the detected GPS information of the mobile communications device of the consumer.

2. The method of claim 1, further comprising associating with each of the transactions at least one of social data, time of each of the transactions, date of each of the transactions, information about the consumer involved in each of the transactions or merchant feedback from each of the transactions.

3. The method of claim 1, further comprising adjusting, based upon the normalized popularity score, the list of the merchants that is output by a recommender system based upon a communication channel through which the consumer receives the list.

4. The method of claim 1, further comprising adjusting the list of the merchants based on the normalized popularity score of the merchants on the list to adjust for a popularity bias based on greater capacity of the merchants on the list with the larger number of the transactions.

5. The method of claim 1, further comprising including the normalized popularity score for each merchant on the list of the merchants provided to the consumer.

6. The method of claim 1, further comprising transmitting the list of the merchants to a web client associated with the consumer, wherein the list is based on the normalized popularity score.

7. The method of claim 1, further comprising adjusting, based upon the normalized popularity score, the list of the merchants that is output by a recommender system based upon the consumer receiving the list via the mobile communications device, wherein the merchants that are within a certain distance of the location of the mobile communications device are ranked higher.

8. The method of claim 1, further comprising:
annotating the data sets to include security information establishing access levels.

9. The method of claim 1, further comprising counting all transactions by all consumers with each merchant of the merchants during a number of days.

10. The method of claim 1, further comprising determining the average transaction count for each merchant of the merchants for a single day.

11. The method of claim 1, further comprising determining the maximum transaction count of each merchant of the merchants during any one of a number of days.

12. The method of claim 1, further comprising adjusting, based on the ranking, an order of the list of the merchants in response to collaborative filtering.

13. The method of claim 1, further comprising removing the merchants from the list that have previously transacted with the consumer.

14. The method of claim 1, further comprising removing the merchants from the list that have a relationship with the computing device.

15. A system comprising:
a processor of a computing device; and
a tangible, non-transitory memory configured to communicate with the processor, the tangible, non-transitory memory having instructions stored thereon that, in response to execution by the processor, cause the processor to be capable of performing operations comprising:

determining, by the processor, a normalized popularity score for one or more merchants by analyzing a plurality of records of charges (ROCs) associated with the one or more merchants, each ROC comprising a data set within a data entry of a data structure hosted by a provider associated with the computing device, each data set comprising information indicating a transaction with a point-of-sale (POS) device of a merchant, wherein the normalized popularity score is a quotient of an average transaction count over a maximum transaction count, wherein the normalized popularity score normalizes a popularity score among merchants with a larger number of transactions and merchants with a smaller number of transactions, and wherein a higher normalized popularity score represents a higher probability that the merchants will reach maximum capacity on any day;

storing, by the processor, data sets of a list of the merchants in a database as ungrouped data elements via a fixed memory offset;

partitioning, by the processor and using a key field, the database according to a class of objects defined by the key field;

linking, by the processor, data tables based on a type of data in the key field;

obtaining, by the processor, the list of the merchants from the database;

generating, by the processor, a list data structure corresponding to the list of the merchants, the list comprising data indicating an initial ranking of the merchants based on the normalized popularity score such that a merchant with the higher normalized popularity score is initially ranked within the list data structure above a merchant with a lower normalized popularity score;

receiving, by the processor from a merchant client device associated with one of the merchants, merchant criteria indicating a predetermined distance;

detecting, by the processor, location information comprising global positioning system (GPS) information associated with a mobile communications device of a consumer;

analyzing, via the processor, said list data structure based on the location information and the predetermined distance, and based on said analysis, determining that the one of the merchants from the list is currently outside the predetermined distance from the location of the mobile communications device of the consumer;

modifying, by the processor, the list data structure based on said determination, said modification comprising removing data from the list data structure associated with the merchant that was determined to be currently outside the predetermined distance from the mobile communications device of the consumer, said modification further comprising re-structuring the list data structure by re-ranking merchants within the list data structure based on the removal of the merchant data from the list data structure; and automatically generating, by the processor, in a user interface (UI) based on the modified list data structure, the UI comprising functionality for displaying the re-ranked merchants within the list in accordance with the detected GPS information of the mobile communications device of the consumer.

16. The system of claim 15, further comprising removing, by the processor, the merchants from the list that have previously transacted with the consumer.

17. The system of claim 15, further comprising removing, by the processor, the merchants from the list that have a relationship with a host.

18. An article of manufacture including a non-transitory, tangible computer readable storage medium having instructions stored thereon that, in response to execution by a computing device, cause the computing device to perform operations comprising:

determining, by the computing device, a normalized popularity score for one or more merchants by analyzing a plurality of records of charges (ROCs) associated with the one or more merchants, each ROC comprising a data set within a data entry of a data structure hosted by a provider associated with the computing device, each data set comprising information indicating a transaction with a point-of-sale (POS) device of a merchant, wherein the normalized popularity score is a quotient of an average transaction count over a maximum transaction count, wherein the normalized popularity score normalizes a popularity score among merchants with a larger number of transactions and merchants with a smaller number of transactions, and wherein a higher normalized popularity score represents a higher probability that the merchants will reach maximum capacity on any day;

storing, by the computing device, data sets of a list of the merchants in a database as ungrouped data elements via a fixed memory offset;

partitioning, by the computing device and using a key field, the database according to a class of objects defined by the key field;

linking, by the computing device, data tables based on a type of data in the key field;

obtaining, by the computing device, the list of the merchants from the database;

generating, by the computing device, a list data structure corresponding to a list of merchants, the list comprising data indicating an initial ranking of the merchants based on the normalized popularity score such that a merchant with the higher normalized popularity score is initially ranked within the list data structure above a merchant with a lower normalized popularity score;

receiving, by the computing device from a merchant client device associated with one of the merchants, merchant criteria indicating a predetermined distance;

detecting, by the computing device, location information comprising global positioning system (GPS) information associated with a mobile communications device of a consumer;

analyzing, via the computing device, the list data structure based on the location information and the predetermined distance, and based on said analysis, determining that the one of the merchants from the list is currently outside the predetermined distance from the location of the mobile communications device of the consumer;

modifying, by the computing device, the list data structure based on said determination, said modification comprising removing data from the list data structure associated with the merchant that was determined to be currently outside the predetermined distance from the mobile communications device of the consumer, said modification further comprising re-structuring the list data structure by re-ranking merchants within the list data structure based on the removal of the merchant data from the data structure; and automatically generating, by the computing device, a user interface (UI) based on the modified list data structure, the UI comprising functionality for displaying the re-ranked merchants within the list in accordance with the detected GPS information of the mobile communications device of the consumer.

19. The article of claim 18, wherein the operations further comprise annotating, by the computing device, the data sets to include security information establishing access levels.

20. The article of claim 18, wherein the operations further comprise removing, by the computing device, the merchants from the list that have previously transacted with the consumer.

* * * * *